US007266363B2

(12) United States Patent
Johnson et al.

(10) Patent No.: US 7,266,363 B2
(45) Date of Patent: *Sep. 4, 2007

(54) APPARATUS AND METHOD FOR CREDIT BASED MANAGEMENT OF TELECOMMUNICATION ACTIVITY

(75) Inventors: Eric A. Johnson, Longmont, CO (US); Mark J. Handzel, Encinitas, CA (US)

(73) Assignee: Authorize.Net Holdings, Inc., Marlborough, MA (US)

( * ) Notice: Subject to any disclaimer, the term of this patent is extended or adjusted under 35 U.S.C. 154(b) by 759 days.

This patent is subject to a terminal disclaimer.

(21) Appl. No.: 10/459,770

(22) Filed: Jun. 12, 2003

(65) Prior Publication Data

US 2004/0023637 A1 Feb. 5, 2004

Related U.S. Application Data

(63) Continuation of application No. 08/367,972, filed on Dec. 30, 1994, now Pat. No. 6,594,481, which is a continuation of application No. 08/138,866, filed on Oct. 19, 1993, now Pat. No. 5,615,408, which is a continuation-in-part of application No. 07/975,512, filed on Nov. 12, 1992, now Pat. No. 5,345,595.

(51) Int. Cl.
*H04M 11/00* (2006.01)
*H04M 1/66* (2006.01)

(52) U.S. Cl. ...................... 455/408; 455/411
(58) Field of Classification Search .............. 455/405, 455/406, 407, 408, 409, 410
See application file for complete search history.

(56) References Cited

U.S. PATENT DOCUMENTS 4,182,934 A 1/1980 Keys et al.
4,634,283 A 1/1987 Mark et al.
4,829,554 A 5/1989 Barnes et al.
4,893,330 A 1/1990 Franco
4,953,198 A 8/1990 Daly et al.
4,955,049 A 9/1990 Ghisler (Continued)

OTHER PUBLICATIONS

Subscriber Computing, Inc. news release entitled Subscriber Computing, Inc. Unveils Advanced Version of Fraudwatch™, Mar. 1, 1993, Irvine, California, 3 pages, (no author.

(Continued)

*Primary Examiner*—Philip J. Sobutka
(74) *Attorney, Agent, or Firm*—Foley Hoag LLP

(57) ABSTRACT

The present invention provides an apparatus for credit based management of a telecommunication system. One embodiment of the apparatus includes an interface for communicating credit information on a particular subscriber and for receiving call records for the particular subscriber that are derived from a switch which establishes connections between telecommunication devices. A credit limit device then utilizes the credit information to establish a credit limit for the subscriber. The apparatus also includes a device for comparing the particular subscriber's call usage to a credit limit established for the subscriber based on information obtained from the credit bureau. An output device is used to provide an indication that the subscriber has exceeded their credit limit. Another embodiment of the apparatus, includes a device for, upon expiration of a predetermined time period, contacting the credit bureau to obtain a new credit score for a subscriber and use this score to update the subscriber's credit limit.

4 Claims, 49 Drawing Sheets

U.S. PATENT DOCUMENTS

| | | | |
|---|---|---|---|
| 4,958,368 A | | 9/1990 | Parker |
| 5,091,942 A | | 2/1992 | Dent |
| 5,109,408 A | | 4/1992 | Greenspan et al. |
| 5,142,654 A | | 8/1992 | Sonberg et al. |
| 5,144,649 A | | 9/1992 | Zicker et al. |
| 5,220,593 A | | 6/1993 | Zicker et al. |
| 5,237,612 A | | 8/1993 | Raith |
| 5,309,501 A | | 5/1994 | Kozik et al. |
| 5,335,265 A | | 8/1994 | Cooper et al. |
| 5,335,278 A | | 8/1994 | Matchett et al. |
| 5,345,595 A | | 9/1994 | Johnson et al. |
| 5,517,555 A | * | 5/1996 | Amadon et al. ............ 455/408 |
| 5,579,376 A | | 11/1996 | Kennedy et al. |
| 5,615,408 A | * | 3/1997 | Johnson et al. ............ 455/405 |
| 5,615,508 A | | 4/1997 | Miller |
| 6,185,415 B1 | | 2/2001 | Boatwright |
| 6,594,481 B1 | * | 7/2003 | Johnson et al. ............ 455/410 |

OTHER PUBLICATIONS

Cellular Technical Services Company (CTS) product literature on the Clonerwatch™ product, (no author, relevant pages, date or place of publication given).

EDS Personal Communication Corp. News Release, "EDS Personal Communications Corporation Announces Comprehensive Fraud Solutions and Capabilities," Mar. 2, 1993, Waltham, Massachusetts, 3 pages (no author given).

EDS Personal Communications Corp. News Release entitled, "EDS Personal Communications Corporation Tackles Fraud with new 'Strategic Partnership' Plan." Waltham, Massachusetts, 4 pages (no author or date given).

"Telemate Fraud Software Ready," Jul. 13, 1992, Communications Week, p. 24.

"Halon System Self-Activates," Computer Fraud & Security Bulletin, Nov. 1992, Elsevier Advanced Technology Publications.

Lewyn, Mark, "Phone sleuths are cutting off the hackers; corporations and phone companies join to end long-distance fraud," Jul. 13, 1992, Business Week, p. 134.

Complementary Solutions, Inc. advertising brochure, "Emate With Fraud Fighter," 4 pages (no author, date of publication given).

Subscriber Computing, Inc. news release entitled Subscriber Computing, Inc. Unveils Advanced Version of FraudWatch, Mar. 1, 1993, Irvine, California, 3 pages (no author given).

Cellular Technical Services Company (CTS) product literature on the Clonerwatch product, (no author, relevant pages, date or place of publication given).

EDS Personal Communications Corp. News Release, "EDS Personal Communications Corporation Announces Comprehensive Fraud Solutions and Capabilities", Mar. 2, 1993, Waltham, Massachusetts, 3 pages (no author given).

Tackless Fraud with new 'Strategic Partnership' Plan Waltham, Massachusetts, 4 pages (no author or date of publication given).

"Telemate Fraud Software Ready", Jul. 13, 1992, Communications Week, p. 24.

Halon System Self-Activates, Computer Fraud & Security Bulletin, Nov. 1992, Elsevier Advanced Technology Publications.

Leswyn, Mark, "Phone sleuths are cutting off the hackers; corporations and phone companies join to end long-distance fraud" Jul. 13, 1992, Business Week, p. 134.

Complementary Solutions, Inc. advertising Brochure, "Emate With Fraud Fighter," 4 pages (no author, date of publication given).

* cited by examiner

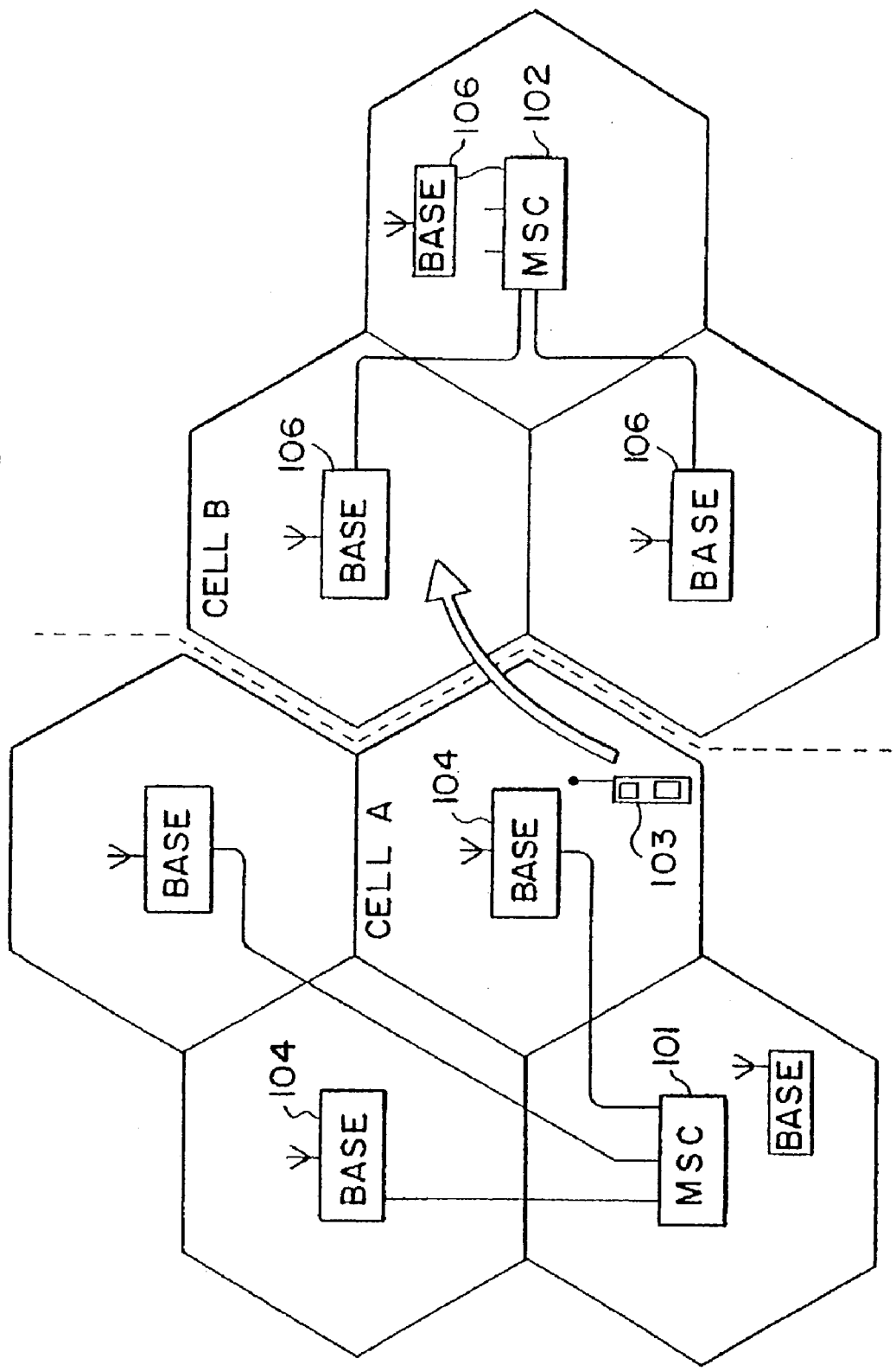

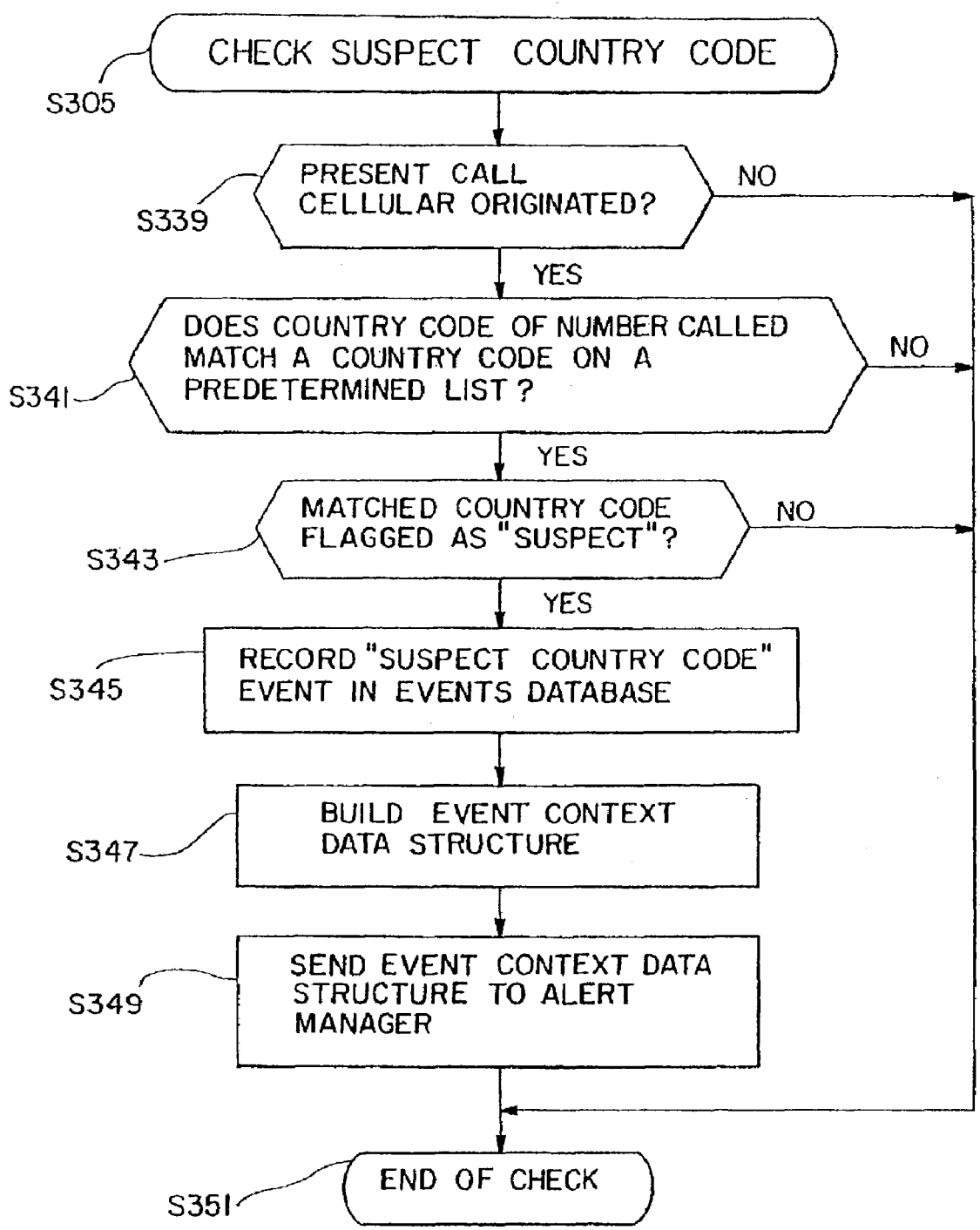

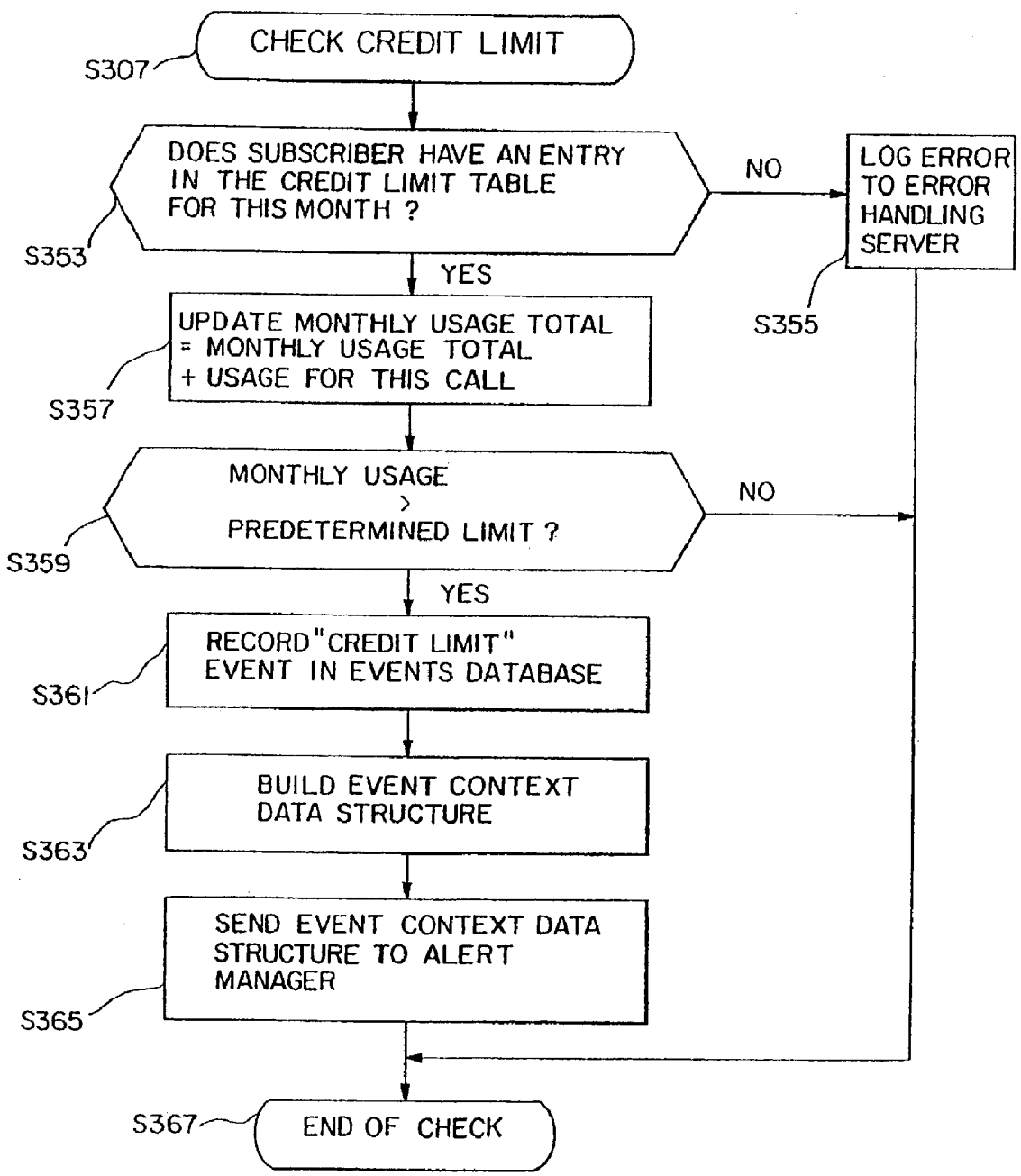

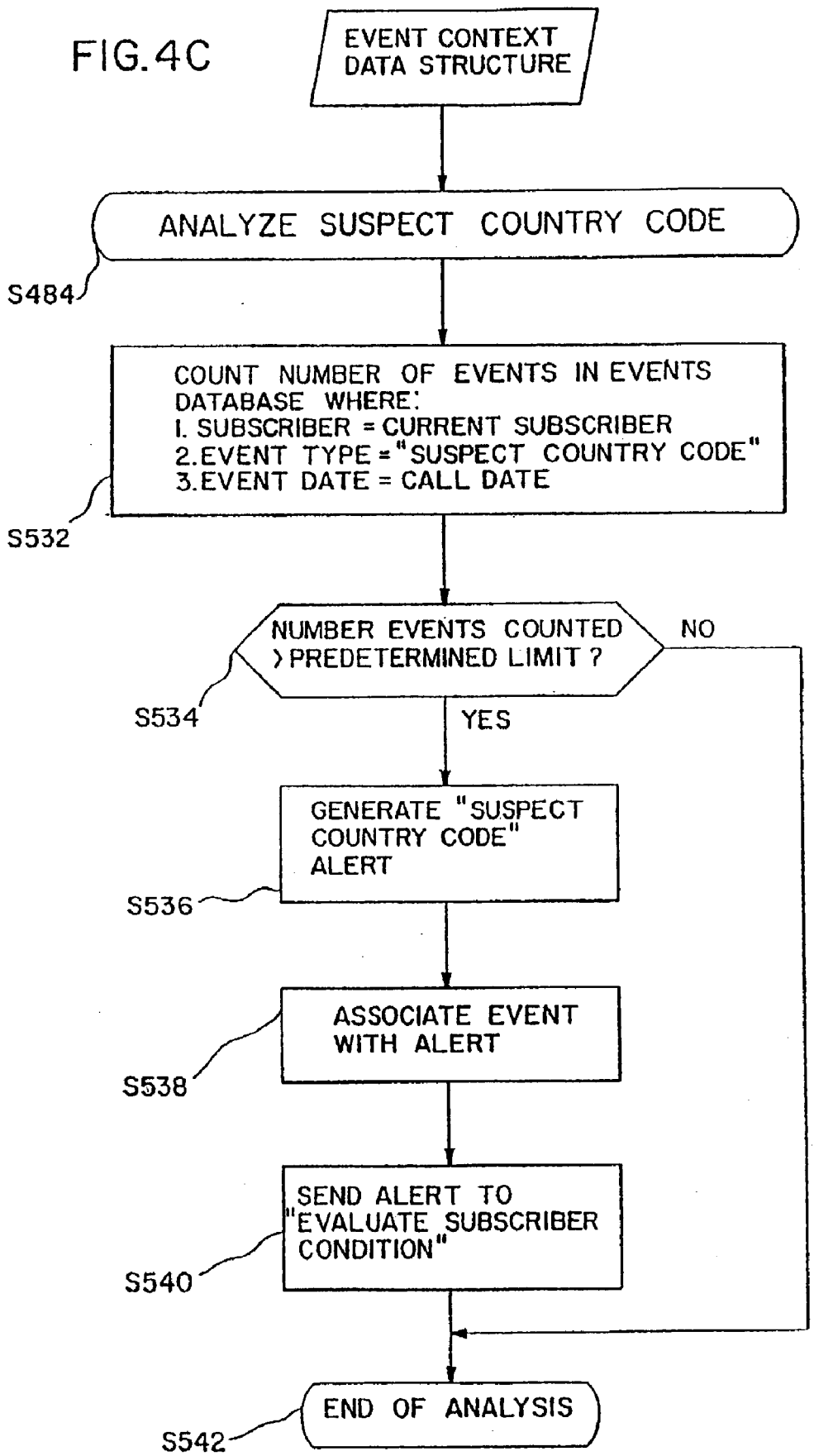

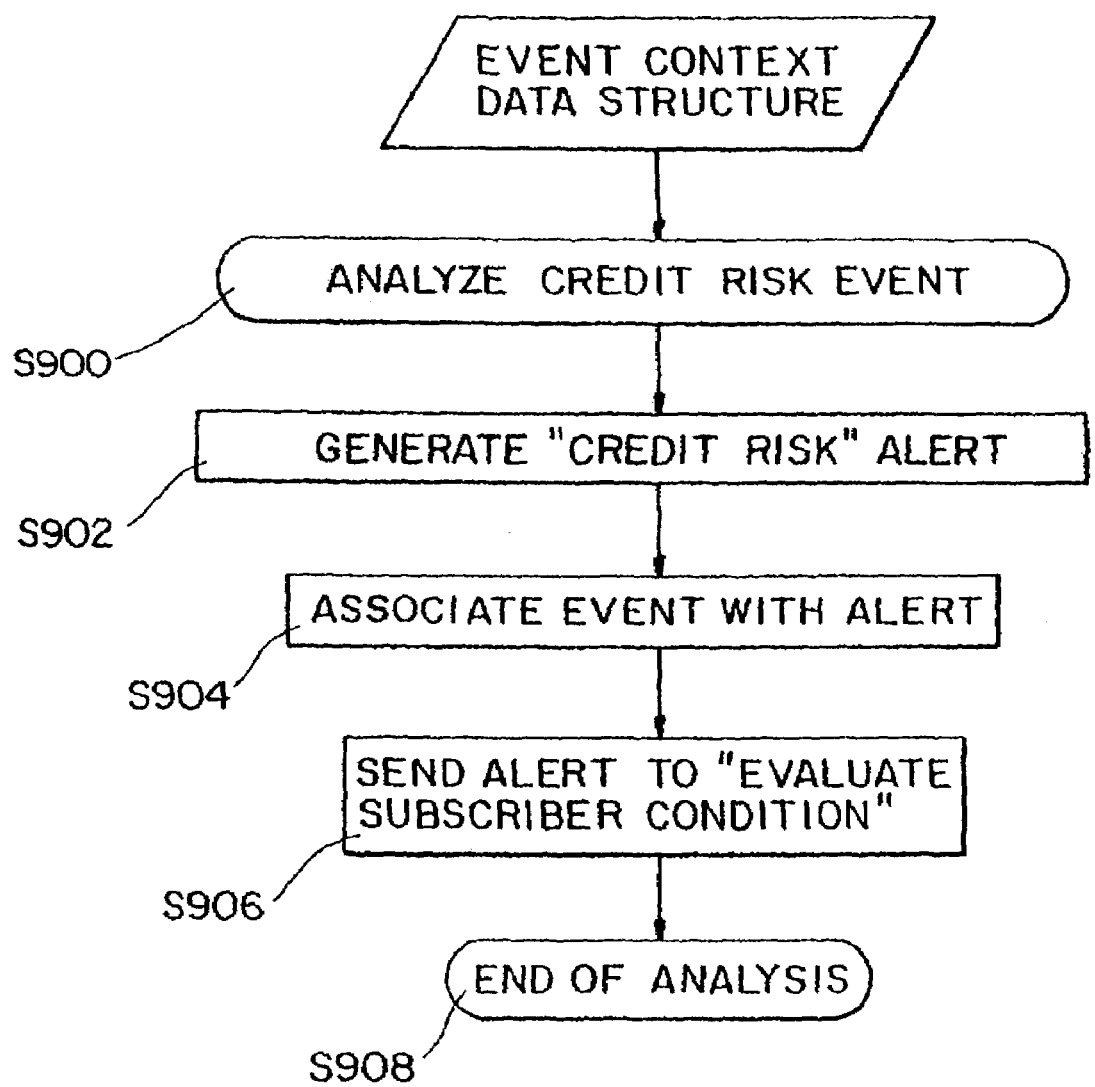

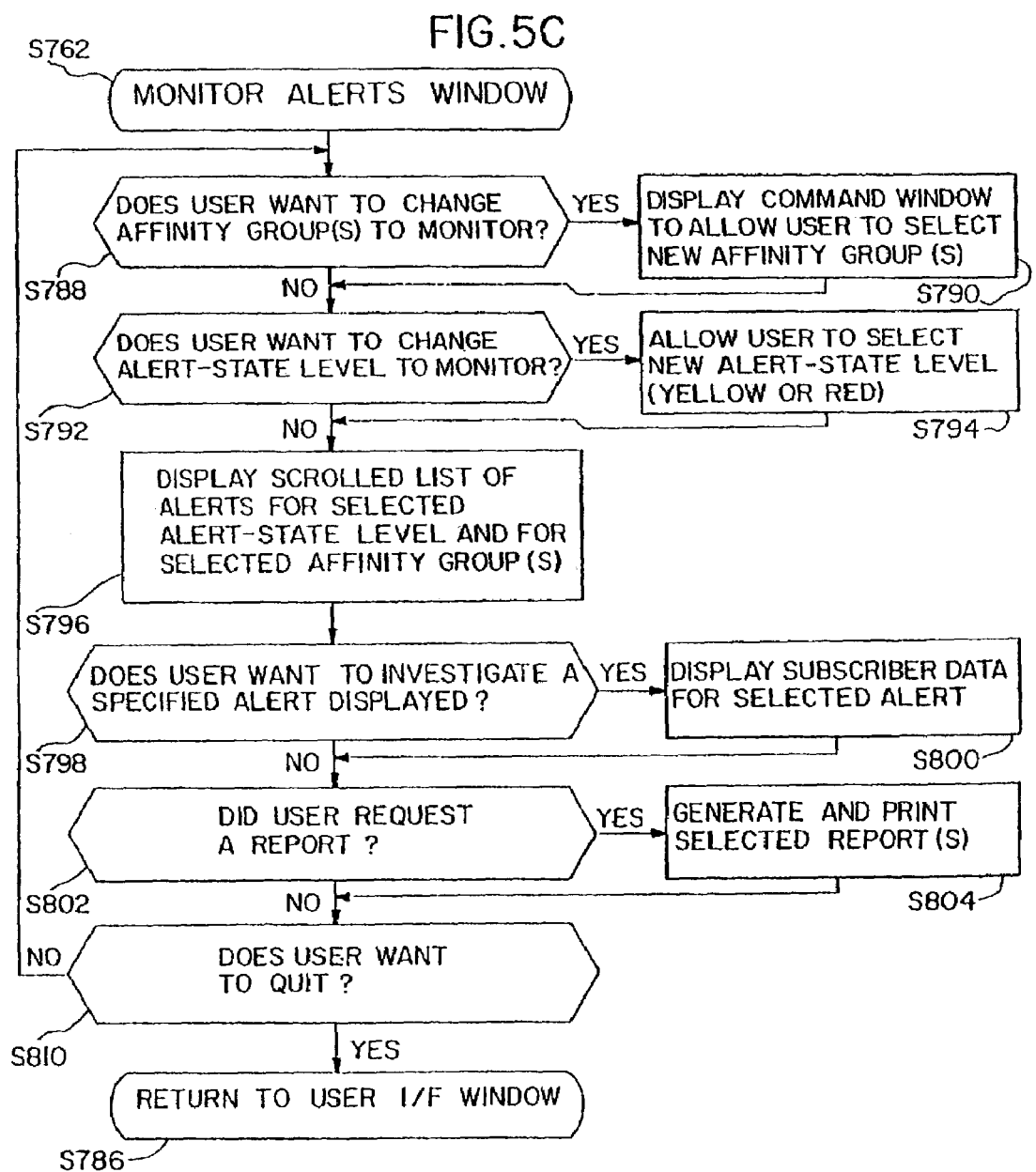

FIG. 8

Investigate by NPA NXX: ☑ 303772 XXXX: 22    MSN: 2248468109
  82a    82c Investigate    82d Name: Gene Ric    Started: 09/14/92
Contact Phone: Home: 789-1234    Work: 799-2322
82b — Address: Line1: 1234 MAIN    Line2: Number 302
City: _____    State: AL    Zip: 23022

Alert States: Description:
  83a    Uncleared

Date Triggered: 1992-09-24 11:45:44    Cleared: _____
Associated Alerts: Type:
  83b    Suspect Termination Alert
        Suspect Country Alert
        Credit Limit Alert
Alert Date: 09/24/92
Associated Events: Type:
  83c    Overlap Event-Simultaneous Call 84 — The first call began 1992-09-25 12:21:42 and ended 1992-09-25 12:23:02
     Sid/Bid  24  to  8929283
The second call began 1992-09-25 12:22:00 and ended 1992-09-25 12:23:40
     Sid/Bid  22  to  8922287

List of Comments:
85    1992-09-24 10:23:50 SYSTEM: log subscriber 1
Subscriber Comment: 1992-09-24 10:23:50 SYSTEM: log subscriber 1
Enter New Comment: _____

86 (Graphs...)    87a,b (Clear Alert State)(Comment) 88

APPARATUS AND METHOD FOR CREDIT BASED MANAGEMENT OF TELECOMMUNICATION ACTIVITY

CLAIM OF PRIORITY

This application is a continuation of U.S. Ser. No. 08/367,972 filed Dec. 30, 1994 now U.S. Pat. No. 6,594,481, entitled "Apparatus and Method for Credit Based Management of Telecommunication Activity," now allowed, which is a continuation of U.S. Ser. No. 08/138,866 filed Oct. 19, 1993, entitled "Apparatus and Method for Credit Based Management of Telephone Activity." now U.S. Pat. No. 5,615,408, which is a continuation-in-part of U.S. Ser. No. 07/975,512 filed Nov. 12, 1992, entitled "Apparatus and Method for Detecting Potentially Fraudulent Telecommunication Activity," now U.S. Pat. No. 5,345,595, the contents of all of which are incorporated herein by reference in their entirety.

BACKGROUND OF THE INVENTION

1. Field of the Invention

This invention relates to monitoring telecommunication systems, and-more specifically, to an apparatus and method for detecting potentially fraudulent telecommunication system usage. Telecommunication systems include both wireless systems (e.g., cellular telephones, satellite transmission, etc.) and systems utilizing transmission lines (e.g., common telephone systems). Fraudulent telecommunication activity is unauthorized usage for which the telecommunication system owner is not paid for its services. The invention also relates to credit based management of telecommunication systems.

2. Description of the Related Art

Because immediate access to information has become a necessity in virtually all fields of endeavor—including business, finance and science—telecommunication systems usage, particularly for wireless telecommunication systems, is increasing at a substantial rate. With the increase in overall usage, however, the incidence of fraudulent usage has experienced a corresponding increase. It is estimated, for example, that fraudulent wireless telecommunication system usage is responsible for losses to the wireless telecommunication industry of $600 million each year. Clearly, a system for detecting and preventing such fraudulent activity would be highly desirable.

Fraudulent telecommunication activity, which may occur both in wireless and common telephone systems, has several different varieties. Among these varieties are cloning fraud, tumbling fraud, tumbling-clone fraud, calling card fraud, and subscriber fraud.

Cloning fraud, which occurs in cellular telephone systems, involves the misappropriation of a valid set of subscriber identification numbers (ID), programming the ID into one or more cellular telephones, and then using the "cloned" cellular telephones to place calls which are billed to the subscriber whose ID was misappropriated.

Tumbling fraud involves placing cellular telephone calls using a different randomly generated subscriber ID for each telephone call placed. Under certain circumstances no pre-call verification of the ID number is performed before the call is connected. Therefore, a fraudulent user may place calls even without possession of a valid subscriber ID. In this way, for example, 50 fraudulent calls placed by a single fraudulent user will be billed to 50 different subscriber IDs, most of which will be unassigned and unbillable, rather than to a single subscriber as in the case of cloning fraud.

Tumbling-Clone fraud, as the name suggests, is a hybrid of tumbling fraud and cloning fraud which involves placing cellular telephone calls using a plurality of cloned subscriber IDs. For example, a tumbling-clone cellular telephone may have a sequence of 10 different cloned subscriber IDs programmed into it. With each successive call placed by the fraudulent user, the cellular telephone would use the cloned subscriber ID next in sequence to initiate the call. In this way, the fraudulent calls would equally be dispersed over 10 different subscriber IDs, consequently making the fraudulent activity more difficult to detect.

Calling card fraud involves the misappropriation of a valid calling card number and then using the misappropriated number to place toll calls which are billed to an unsuspecting subscriber.

Subscriber fraud, which may occur in either cellular telephone or common telephone systems, involves fraudulent usage by an otherwise legitimate subscriber. Typically, this type of fraud is experienced when a subscriber signs up for telecommunication services, either cellular or calling card, and proceeds to use the telecommunication services with no intent of ever paying for the services provided. A user practicing subscriber fraud would continue to use the services without paying until system access was blocked by the service provider.

Although a number of prior fraud detection and prevention systems have been suggested, all have proved inadequate for various reasons. One proposed solution involves setting a predetermined number as a system-wide threshold for the number of cellular calls that may be placed by an individual subscriber in one day; when the predetermined number is exceeded, the method indicates that fraud has occurred. The system-wide threshold method, however, has several drawbacks. For example, this method applies the same threshold to every user. Typically, a high-volume subscriber such as a stockbroker may regularly place a large volume of calls each day in the normal course of business, whereas a low-volume subscriber who maintains a cellular telephone primarily for emergency usage may only place a few calls each week. The system-wide threshold method would be inadequate for each of these users, because it would generate a false alert for the high-volume subscriber who happens to legitimately exceed the threshold on a given day, while, incorrectly, no alert would be generated for the fraudulent use of the low-volume subscriber ID, as long as the threshold was not exceeded. Moreover, the system-wide threshold method is easily defeated by a fraudulent user who is aware of the predetermined threshold and takes care to limit the number of fraudulent calls placed to a number less than the threshold.

Another method, referred to as "call numbering," has been proposed to detect fraudulent cellular telephone calls, wherein a predetermined sequence of numbers is assigned to each cellular telephone unit within the network and, with each successive call placed, the next number in sequence is transmitted by the cellular telephone unit to the service provider station and recorded in the order received. When the call records are processed, if any call sequence number occurs more than once, or if the call sequence numbers are out of order, fraud or malfunction is indicated and the cause must be investigated. This method, however, has the disadvantage, inter alia, of requiring that the cellular telephone unit be modified to include additional equipment to generate and transmit the predetermined sequence of numbers. Consequently, the "call numbering" method is incompatible with the large majority of existing telecommunication equipment that has not been modified.

Moreover, the call numbering method is unreliable. It has been found that the call number sequence may become disordered through normal legitimate use, by events such as early termination of the call or power failure, thereby resulting in false alerts.

Also of concern in telecommunication systems is the ability to effectively control or limit the risk of non-payment by a subscriber, whether or not associated with fraudulent activity, and the encouragement of system usage by subscribers who are able to pay for the service.

Therefore, a system which reliably and accurately indicates the possibility of fraudulent telecommunication activity, but which is flexible enough to permit legitimate use by a wide variety of subscribers, and which is compatible with all types of existing telecommunication equipment is needed.

SUMMARY OF THE INVENTION

It is an object of the present invention to provide a method and apparatus for detecting potentially fraudulent telecommunication activity by comparing current usage for a particular subscriber ID or calling card number with the particular subscriber's historical pattern of usage. If current usage for that ID or calling card number indicates a deviation in the historical pattern of usage by the subscriber, a potential fraud is indicated.

In one embodiment of the invention, the particular subscriber's usage is analyzed to determine parameters such as call duration (the average length in time of a call), call velocity (the number of calls placed within a specified time period), and call thresholds (the highest number of calls placed by the subscriber within a specified time period). One or more of these parameters is then compared to the particular subscriber's historical pattern of usage. If there is abnormal usage relative to the subscriber's historical pattern of usage, a potential fraud is indicated.

In one embodiment a particular subscriber's usage is characterized as a plurality of moving averages, each calculated over a different specified number of days, which are then compared to each other to determine if a significant deviation in usage has occurred. When a significant deviation in usage is detected, a potential fraud is indicated.

In another embodiment, a significant deviation in usage is indicated when both of the following two conditions are satisfied: (1) a moving average calculated over a shorter number of days is greater than a moving average calculated over a longer number of days; and (2) the percentage increase between a moving average calculated on day (t) and the same moving average calculated on the prior day (t−1) exceeds a predetermined amount.

It is a further object of the present invention to provide a method and apparatus for detecting potentially fraudulent telecommunication activity by detecting an occurrence of overlapping calls. Overlapping calls are two or more calls which either (1) occur concurrently, or (2) are placed from different geographic regions and occur within a sufficiently short time interval such that it would be improbable that a single subscriber could place the first call and then travel to the location of the second call within the given time interval to place the second call. Because each unique subscriber ID or calling card number may typically only be used by a single subscriber from a single location at one time, fraud is indicated upon occurrence of either or both of these two conditions.

In one embodiment, the fraud detection apparatus looks at each call made by a particular subscriber to determine whether any two calls using the same subscriber ID or calling card number occurred substantially concurrently.

In another embodiment, the fraud detection apparatus adjusts each call for geographic dispersion to determine if two or more calls were placed using the same subscriber ID or calling card number from different geographic locations within a sufficiently short time interval such that travel between the two geographic locations within the given time interval is improbable.

It is a further object of the present invention to provide a method and apparatus for detecting potentially fraudulent telecommunication activity by comparing the particular subscriber's present telecommunication usage with a predetermined call destination. If the predetermined subscriber-specific condition is satisfied, fraud is indicated.

In one embodiment, each number called using a particular subscriber ID or calling card number is compared to a predetermined list of numbers suspected of frequently being called by fraudulent users.

In a further embodiment, each country called using a particular subscriber ID or calling card number is compared to a predetermined list of countries suspected of frequently being called by fraudulent users.

Several of the above-mentioned objects are achieved by an apparatus comprising a digital computer; interface means for receiving a call information record for each call involving a particular subscriber; comparison means for comparing the particular subscriber's current usage with a subscriber-specific historical pattern of usage; and output means for outputting an alert-state to signal a potentially fraudulent call based upon a result of the comparison performed by the comparison means.

It is also an object of the present invention to provide a method and apparatus to control or limit the risk of non-payment by a subscriber, whether such non-payment is associated with fraudulent activity or not. It is a further object to encourage subscribers that are able to pay to use the system. One embodiment of the invention includes an interface for communicating credit information on a particular subscriber with a credit bureau, which could be a traditional credit bureau or the carrier. Based upon the credit information, a credit limit for the subscriber is established by the apparatus. The interface also receives call records that are associated with the particular subscriber and are derived from a telecommunication switch, i.e., a device for establishing connections between telecommunication devices. An analysis device is also provided to compare the subscriber's call usage to a credit limit established for the subscriber based upon the credit information obtained from the credit bureau. If the subscriber has exceeded their credit limit the apparatus utilizes an output device to indicate so to an operator or another device. Consequently, the carrier can limit risk of non-payment on a per subscriber basis and, conversely, encourage system usage and, as a consequence, revenue on a per subscriber basis with respect to those subscribers that are more able or likely to pay for the service.

In another embodiment, the apparatus updates the subscriber's credit limit by obtaining an updated credit report or score for the subscriber from the credit bureau. Consequently, the subscriber's credit limit can be lowered or the subscriber's deposit requirement can be increased if the subscriber is becoming a greater credit risk, thereby limiting or reducing the risk of non-payment to the carrier. Conversely, the subscriber's credit limit can be increased or the deposit requirement decreased if the subscriber is becoming a lower credit risk, thereby encouraging the subscriber to further utilize the system.

In yet a further embodiment, the apparatus is capable of adjusting the predetermined time interval for updating a subscriber's credit limit. Consequently, the apparatus attempts to optimize or reduce the costs associated with obtaining credit reports or scores on subscribers. This is especially important in systems with large numbers of subscribers.

These and other features of the present invention will become evident from the detailed description set forth hereafter with reference to the accompanying drawings.

BRIEF DESCRIPTION OF DRAWINGS

A more complete understanding of the invention can be had by referring to the detailed description of the invention and the drawings in which:

FIG. 1A is a diagram illustrating a typical cellular telecommunications network.

FIGS. 3A-3L are flowcharts of the Event Manager procedure.

FIGS. 4A-4M are flowcharts of the Alert Manager procedure.

FIGS. 5A-5C are flowcharts of the User Interface procedure.

FIG. 8 is a screen display of the Investigate Subscriber Window of the User Interface in one embodiment of the present invention.

DETAILED DESCRIPTION OF THE INVENTION

Figure 1B:
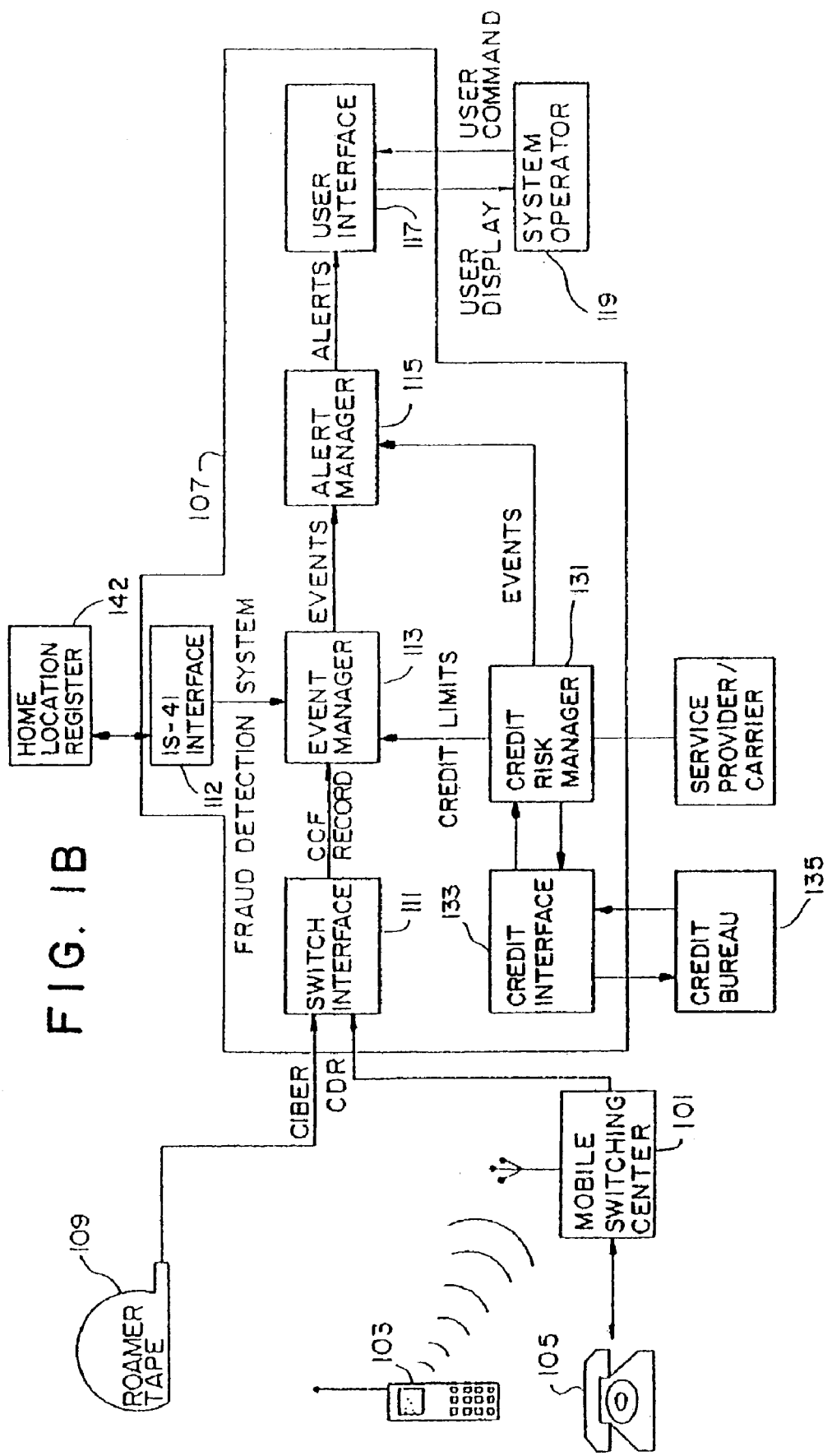
FIG. 1B is a block diagram of a telecommunications fraud detection system according to one embodiment of the present invention that includes a credit risk manager.

A detailed description of an apparatus and method for detecting potentially fraudulent and performing credit based management of telecommunications activity, is set forth below with reference to the figures.

A diagram illustrating a typical cellular telecommunications network is illustrated in FIG. 1A. Referring to FIG. 1A, each predetermined fixed geographic region is served by a separate Mobile Switching Center (MSC). Additionally, each MSC region may comprise one or more cells, wherein each cell is served by its own base station connected to the MSC for that region. In FIG. 1A, Region I is served by a first MSC 101 while Region II is served by a second MSC 102. Region I comprises four cells each having its own base station 104 connected to the first MSC 101. Region II comprises three cells each having its own base station 106 connected to the second MSC 102.

When a subscriber originates a call, the cellular telephone 103 communicates via a base station with the particular MSC serving that geographic region by means of wireless radiofrequency transmission. The subscriber may either remain within the particular cell from which the call was originated or the subscriber may roam across cell and MSC region boundaries. For example, a cellular call may be originated by a subscriber in Cell A and the call would be handled initially by the first MSC 101. However, because cellular telephones are mobile, the subscriber could travel from Cell A into Cell B during the course of the call. Upon crossing from Cell A into Cell B, the call would cease being handled by the first MSC 101 and may be picked up mid-call and handled by the second MSC 102.

Multiple MSCs are dispersed throughout the United States, and much of the world, so that a subscriber may call from any geographic region served by a MSC. All of the various MSCs around the world are interconnected by a global telecommunications network, so that telecommunications may occur between two cellular telephones, or between a cellular telephone and a physical line telephone, even if they are in different geographic regions.

The function of a MSC is to receive and route both cellular originated calls and cellular terminated calls. A cellular originated call is one placed by a cellular telephone located within the MSC serving area to either another cellular telephone or a physical line telephone. A cellular terminated call is one received by a cellular telephone located within the MSC serving area, regardless if placed by a cellular or physical line telephone.

Each subscriber's cellular telephone has its own unique ID corresponding to a set of identification numbers. The identification numbers comprise two individual identifiers—a Mobile Identification Number (MIN), and (2) a Mobile Serial Number (MSN). The MIN is a ten-digit number, corresponding to the ten-digit telephone number used in North America, having the format npa-nxx-xxxx, where npa is a three-digit area code, nxx is a three-digit prefix which identifies the serving switch, and xxxx is a four-digit suffix which identifies the individual subscriber or physical line number. The combination of the npa and nxx components form a number which identifies a subscriber's "home" MSC. At the initiation of each call, the cellular telephone transmits to the MSC its unique combination of MIN and MSN. For each call, whether cellular originated or cellular terminated, each MSC handling the call creates a separate Call Detail Record (CDR) which contains several items of information describing the call and the subscriber. For example, the CDR contains the following call information items: MIN, MSN, number called, call duration, call origination date and time, country called, information identifying the MSC, etc. The format of the CDR, however, is not consistent among the several different providers of cellular telephone service. At present, for example, at least five different CDR formats exist.

As mentioned above, each individual subscriber has a single home MSC corresponding to the npa and nxx components of the subscriber's MIN. Unless a cellular subscriber has previously notified the home MSC of his or her whereabouts, the subscriber may only receive a cellular terminated call when that subscriber is within his or her home MSC region. In most cases, a subscriber may initiate a cellular originated call, however, from any MSC region without any special proactive requirements. A subscriber who originates a cellular call from a region other than his or her home MSC region is referred to as a "roamer." Because only the subscriber's home MSC maintains a database of that subscriber's identity and status, a MSC handling a roamer call is unable to verify whether or not the subscriber MIN and MSN received for a call are valid. Accordingly, for each roamer call handled by a MSC, the MSC records CDR information for that call and sends the information to a clearing house. The clearing house collects all CDRs pertaining to a particular MSC, creates a magnetic tape—a roamer tape—containing multiple CDRs, and sends the tape to the appropriate home carrier.

FIG. 1B is a block diagram of a telecommunications fraud detection system according to one embodiment of the present invention. Initially, a general description of the fraud detection system 107 is provided as follows.

The fraud detection system 107 of the present invention, comprising the switch interface 111, the event manager 113, the alert manager 115, the credit risk manager 131, the credit interface 133, and the user interface 117, is implemented, in one embodiment, as software running on a digital computer, for example, a Sun Microsystems workstation. The digital computer includes memory means for storing computer programs and data; processing means for running computer programs and manipulating data; and input/output means for communicating with a MSC, a system operator, a magnetic tape drive (not shown), or another computer (not shown).

CDR records for both cellular originated and cellular terminated calls fed into a switch interface 111 both from the MSC 101 directly and from a roamer tape 109. After the switch interface 111 translates a CDR record into a format understandable to the fraud detection system 107—the CCF format—a CCF record is passed to the event manager 113. The function of the event manager 113 is to perform a number of checks to compare the present CCF record both with past subscriber-specific usage information and with certain predetermined conditions to determine whether this particular CCF record should trigger the event manager 113 to generate an "event." If an event is generated by the event manager 113 it is logged to a database—the "events database"—containing past events specific to each subscriber and passed to the alert manager 115. Depending on the nature and quantity of past events for a particular subscriber, a newly received event may cause the alert manager 115 to generate an "alert" for the particular subscriber ID in question. Each of the alerts generated is stored in a database—the "alerts database"—specific to each subscriber. Depending upon a predetermined set of rules, either a single alert or a specific combination of alerts may generate an "alert-state" which is passed to the user interface 117 to signal the system operator 119 that the particular subscriber ID for which the alert-state was generated is suspected of being used fraudulently. Each of the alert-states generated is stored in a database—the "alert-states database"—specific to each subscriber. The system operator 119 may then investigate a subscriber ID for which an alert-state was generated by looking at subscriber-specific data, a graph of the particular subscriber's call velocity for a given time period, and the history of alerts and events which eventually triggered the alert-state in question. Once the system operator "clears" an alert it will no longer be considered in determining whether an alert-state should be generated for a particular subscriber ID.

Referring to FIG. 1B, a more detailed description of the fraud detection system 107 is provided as follows. A cellular telephone 103 communicates with a MSC 101 to place a call either to a physical line telephone 105 or to another cellular telephone. Additionally, the cellular telephone 103 may receive a call originated by either a physical line telephone 105 or another cellular telephone. The MSC 101 creates a separate CDR record for each call that it handles, whether cellular originated or cellular terminated. Each individual MSC 101 is connected to a fraud detection system 107 which receives CDR records as input from the MSC. The CDR input read directly from the MSC 101 into the fraud detection system 107 corresponds to calls handled by that MSC for its home subscribers. CDR records not involving the MSC's home subscribers are sent to a clearing house to generate roamer tapes to be sent to the appropriate home MSC, as discussed above.

Alternatively, if the fraud detection system 107 was interconnected to one or more "peer" fraud detection systems, i.e., a separate system serving a different MSC, after the switch interface 111 had converted the CDR records into CCF format, the fraud detection system 107 would send those CCF records corresponding to roamer calls to the appropriate peer fraud detection system corresponding to the respective home MSC of each roamer call.

Additionally, the fraud detection system 107 receives input from a roamer tape 109 by means of a magnetic tape reader (not shown) in a format referred to as the CIBER format. The combination of the home MSC 101 input and the roamer tape 109 input represents all of the call activity for a MSC's home subscribers, regardless of the geographic region in which the calls were originated or terminated.

The call information input, whether from the roamer tape 109 or from the home MSC 101, is fed into the switch interface 111 of the fraud detection system 107. The function of the switch interface 111 is to translate the various CIBER and CDR input formats into a consistent format—the Common Call Format (CCF). The switch interface 111 is capable of accepting CDR input in any of the existing formats, and is easily adaptable to new CDR formats created in the future. Typically, a CCF record contains only a subset of the total information contained in a CDR. This subset of information corresponds to those information items used during operation of the fraud detection system 107.

The credit risk manager 131 allows a carrier to manage the amount of credit which is extended to a particular subscriber in the form of available calling time and to identify credit trends with respect to the particular subscriber. A credit interface 133 is interposed between a credit bureau 135 and the credit risk manager 131 to translate requests to the credit bureau 135 for credit information into a format understandable to the credit bureau 135 and to translate credit information from the credit bureau 135 into an understandable format. The credit bureau can be any source of credit information. For example, the credit bureau 135 can be a dedicated credit bureau, a billing system or the carrier with which the subscriber is associated. Credit information in the form of "credit scores" is available from a variety of providers. A single credit score may comprise a single element, such as a number representing credit risk, or may be comprised of a plurality of elements, such as credit risk, probability of delinquency, and probability of bankruptcy. After a credit score is obtained, it is stored in a credit scores database which is maintained by the fraud detection system.

While the credit interface 133 is shown as being directly connected to the credit bureau 135, it should be appreciated that other communication paths are possible. For example, the credit interface 133 could communicate with the credit bureau via the mobile switching center 101 or another switching center. With respect to each subscriber, identification information is initially provided by the carrier and a record created in a credit scores database. If known by the telecommunications service provider or carrier, an initial credit score for the customer is entered in the credit scores database. If the initial credit score is not known, an initial credit score may be obtained from the credit bureau and stored in the credit scores database. Other initial parameters which are set are the initial credit limit and the time period for credit update.

In operation, the credit risk manager 131 periodically obtains updated credit scores from a credit bureau for each subscriber and determines whether the credit risk associated with each subscriber has changed. If the risk has changed, the credit risk manager may adjust the credit limit being provided to the subscriber accordingly and/or initiate other activity, such as causing an alert to be generated, notifying the telecommunications services provider or carrier of the change, or adjusting the time period for updating the credit scores of a subscriber.

Figure 1C:
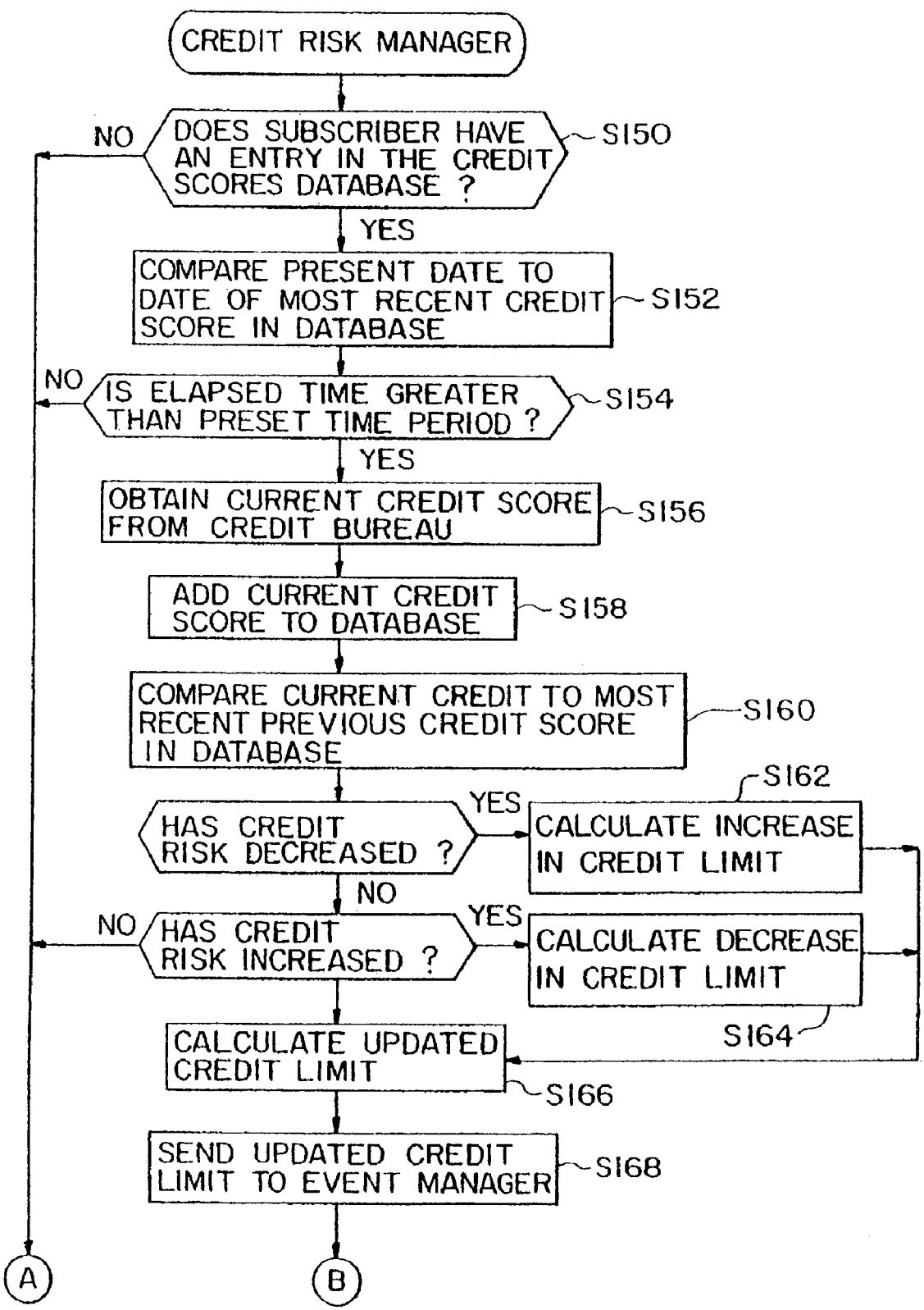
FIG. 1C is a flowchart that illustrates the operation of the credit risk manager shown in FIG. 1B.
Figures 1, 1C:
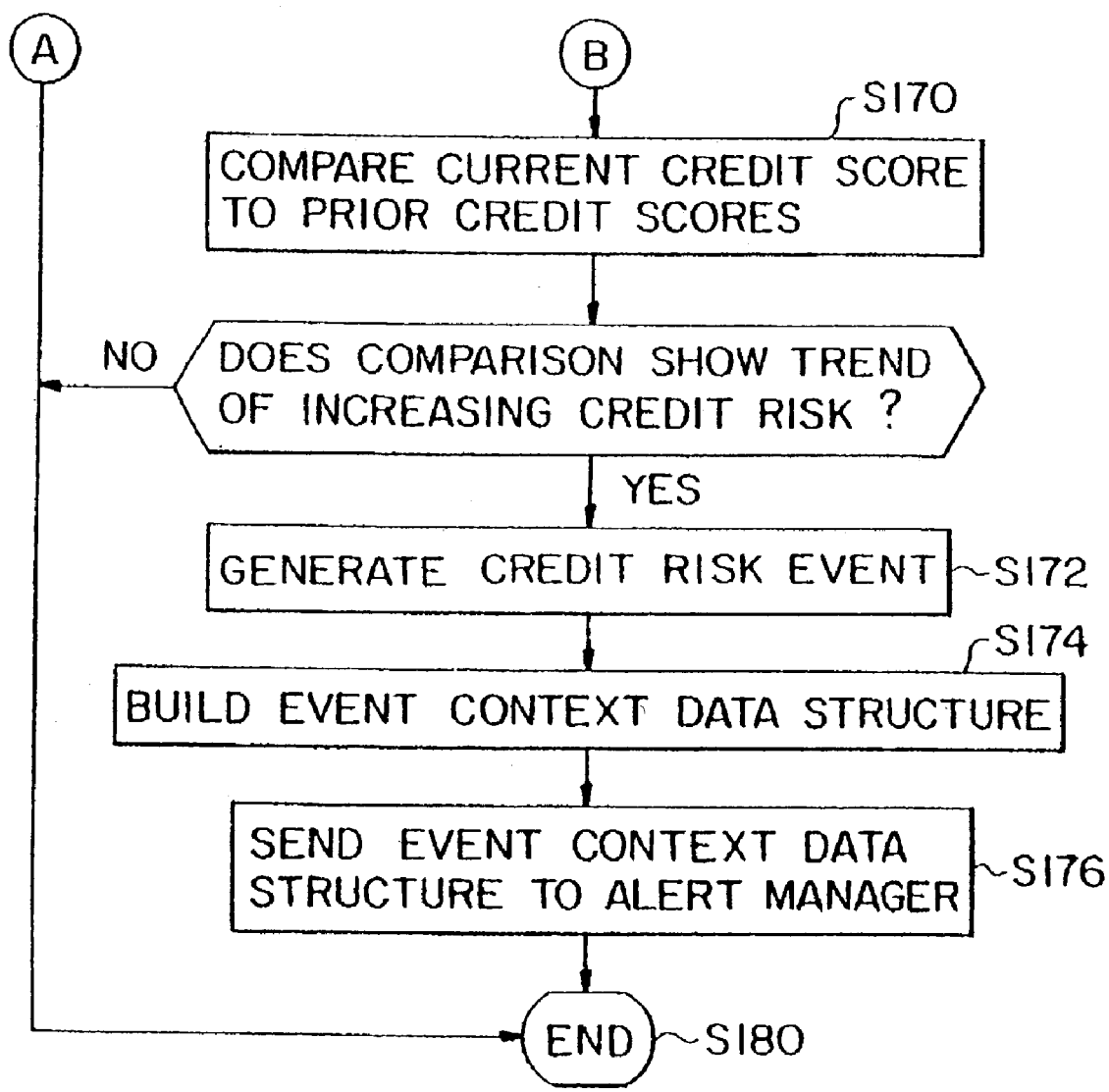

FIG. 1C illustrates one embodiment of the present invention wherein the credit risk manager 131 checks each day (or some other predetermined period) whether the time period for updating a subscriber's credit scores has elapsed and performs a credit update if the previously established time period has passed. First, at step S150, the service tests whether this particular subscriber has an entry in the credit scores database. If a credit score is not found, an inconsistency in the system has been encountered; an error is logged to an error handling server and the service flows to step S180 which marks the completion of the credit risk check.

If a credit score entry is found for this particular subscriber, the date of the entry is compared to the present date at step S152. Next, at step S154, the service tests whether the time period between the date of the entry and the present date exceeds a previously established time period for updating the subscriber's credit score. If the period has not been exceeded, the service flows to step S180 which marks the completion of the credit risk check. If the period has been exceeded, the service flows to step S156 where a current credit score for the subscriber is obtained from the credit bureau. Next, at step S158, the current credit score is added to the credit scores database.

Next, at Step 160, the current credit score is compared to the most recent previous credit score entry in the credit scores database. If the comparison shows a decrease in the credit risk, the service flows to step S162 where an increase in the credit limit reflecting the decreased risk is calculated. By increasing the subscriber's credit limit, the subscriber is encouraged to make further use of the system, which increases carrier revenues if an increase does occur while at the same time limiting or managing the risk associated with the increased credit limit. If the comparison shows an increase in the credit risk, the service flows to step S164 where a decrease in the credit limit reflecting the increased risk is calculated. By decreasing the subscriber's credit limit, the risk of non-payment to the carrier is reduced. If there is no difference in the current and previous credit scores, the service flows to step S180 which marks the completion of the credit risk check. Next, the service flows to step S166 where the updated credit limit is calculated. Next, at step S168, the updated credit limit is sent to the event manager 113, where it is used in the Check Credit Limit service, as discussed below.

Next, the service flows to step S170, where the current credit score is compared to the prior credit score entries in the credit risk database to determine if a trend of increasing risk is present. (It should be appreciated that other credit score trends may be of value, such as those that indicate the subscriber is a relatively constant or decreasing credit risk.) If a trend of increasing risk is present, the service flows to step S172 where a "credit risk event" is generated by recording the event type, "credit risk event," along with specific information particular to this subscriber in the events database for this particular subscriber ID.

Next, at step S174, the "event context" data structure is built with information specific to this event. The event context data structure contains information including (1) the event type ("credit risk event"); (2) the subscriber identification information; (3) the event date and (4) the current alert-state (either normal, yellow, or red depending on the nature and quantity of alerts outstanding for this particular subscriber as determined by the alert manager, discussed below).

Next, at step S176, the service sends the event context data structure previously built at step S174 to the alert manager 115 to signal the alert manager that a new event has been generated and to provide a reference for locating the newly generated event in the events database.

Lastly, the service flows to step S180, where the credit risk check is completed.

The determination of whether the credit risk has increased or decreased may take a variety of forms. The determination may involve comparison of a single element of each credit score, or may involve comparison of some or all of several elements comprising a credit score. Similarly, the calculation of an updated credit limit in steps S162 and S164 may take a variety of forms. By way of illustration, the updated credit limit may be calculated as a percentage increase upon the previous credit limit, or the calculation steps may simply generate a number of units to be added to or subtracted from the previous credit limit to create the updated credit limit.

Although one embodiment of the above-described credit risk check performs the check at fixed intervals established by a predetermined time period, in another embodiment, the time period between checks may be modified in response to changes in the credit score. For example, the time period may be shortened to generate more frequent checks if the credit risk has increased. Conversely, the time period may be lengthened if the credit risk has decreased. Further, if the time period for updating the credit scores associated with a number of subscribers is substantially the same, the dates from which the time period extends so as to spread out the costs associated with obtaining credit scores.

Additional information relating to the credit status of the customer may also be used by the credit risk manager to adjust credit extended to the customer and in evaluating the credit risk. In another embodiment of the invention, data concerning the customer's billing and payment history may be obtained through an interface between a billing and payment records database and the credit risk manager. This data may be used in conjunction with, or as a replacement for, the credit score data used in the embodiment illustrated in FIG. 1C.

Alternatively, in another embodiment of the present invention, the fraud detection system 107 may receive input from a telecommunications system other than a cellular telephone MSC. For example, the fraud detection system may receive input from a calling card system to detect calling card fraud merely by modifying the switch interface 111 to accept the data format specific to the calling card system used.

Figure 2:
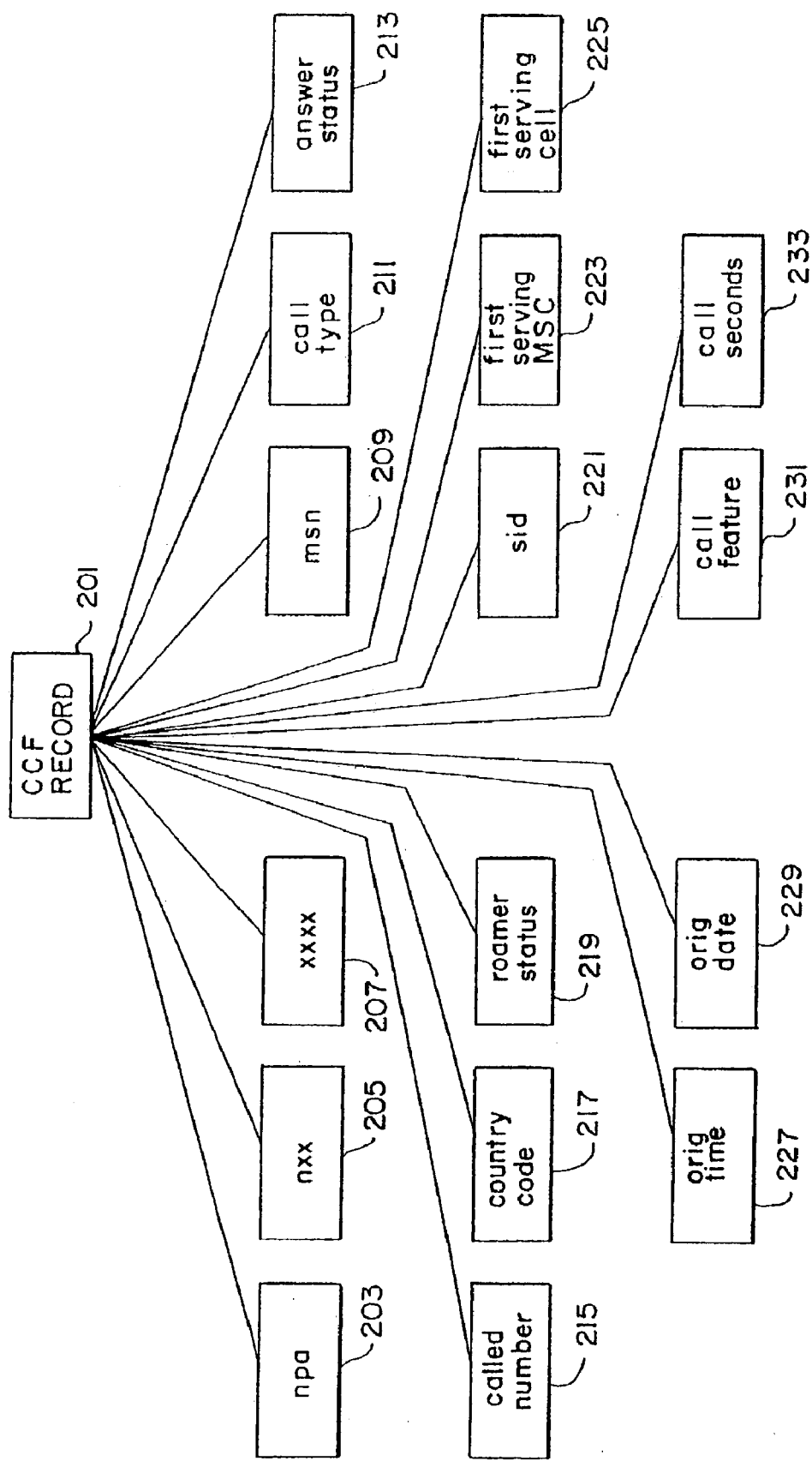
FIG. 2 is a block diagram showing the components of a Common Call Format (CCF) record according to one embodiment of the present invention.

FIG. 2 illustrates one embodiment of the present invention wherein the CCF Record 201 comprises sixteen separate fields, numbered 203 through 233. The combination of the npa field 203, the nxx field 205, and the xxxx field 207 comprise the subscriber's ten-digit telephone number, or MIN, as discussed above. The switch interface ill separates the MIN into three components so that each may be separately accessed with ease.

The MSN field 209 holds the subscriber Mobile Serial Number (MSN) which, as discussed above, is transmitted along with the MIN by the cellular telephone 103 to the MSC 101 with each cellular originated call.

The call type field 211 holds a value of "0" if this call was cellular originated or a value of "1" if this call was cellular terminated.

The answer status field 213 holds a value of "0" if this call was not answered by the party called or a value of "1" if the call was answered.

The called number field 215 holds the number dialed by the cellular subscriber for this call.

The country code field 217 holds a number corresponding to a unique code for the particular country called by the cellular subscriber for this call.

The roamer status field 219 holds a "TRUE" state if the subscriber was a "roamer" when the call was originated, that is, the subscriber placed the call through a MSC other than his or her home MSC, or a "FALSE" state if the subscriber placed the call from his or her home MSC.

The sid field 221 holds a switch identifier number identifying the serving MSC that generated the present CDR record for this call. Because a subscriber may move between different MSC regions during the course of a single cellular call, multiple MSCs may handle a single call in successive fashion as the subscriber roams between MSC regions. Accordingly, multiple CDR records may be generated for a single call—one for each MSC that handled the call. The sid field 221 identifies the MSC that generated this particular CDR, even if it was not the MSC on which the call originated.

The first serving MSC field 223 and the first serving cell field 225 identify the specific MSC and cell, respectively, on which the call originated. As discussed above, both the cell and the MSC which handle a call may change as the subscriber roams across cell and MSC region boundaries. Although each MSC which handles a call will generate a separate CDR having its own switch number in the sid field 221, the first serving MSC field 223 and the first serving cell field 225 will remain constant for all CDR records pertaining to a single call.

The orig time field 227 and the orig date field 229 hold the time and date, respectively, at which the present call was originated.

The call feature field 231 holds information indicating whether this call utilized a call feature, such as call waiting, call forwarding, or three-way calling.

Lastly, the call seconds field 233 holds the duration of the present call in seconds.

Referring again to FIG. 1B, once the switch interface 111 has translated the CDR or CIBER format input into a CCF record, it passes the CCF record to the event manager 113. The event manager 113 procedure is illustrated by a flowchart in FIG. 3A. The function of the event manager is to perform a number of checks to compare the present CCF record both with past subscriber-specific usage information and with certain predetermined conditions to determine whether this particular CCF record should trigger an "event."

Figure 3A:
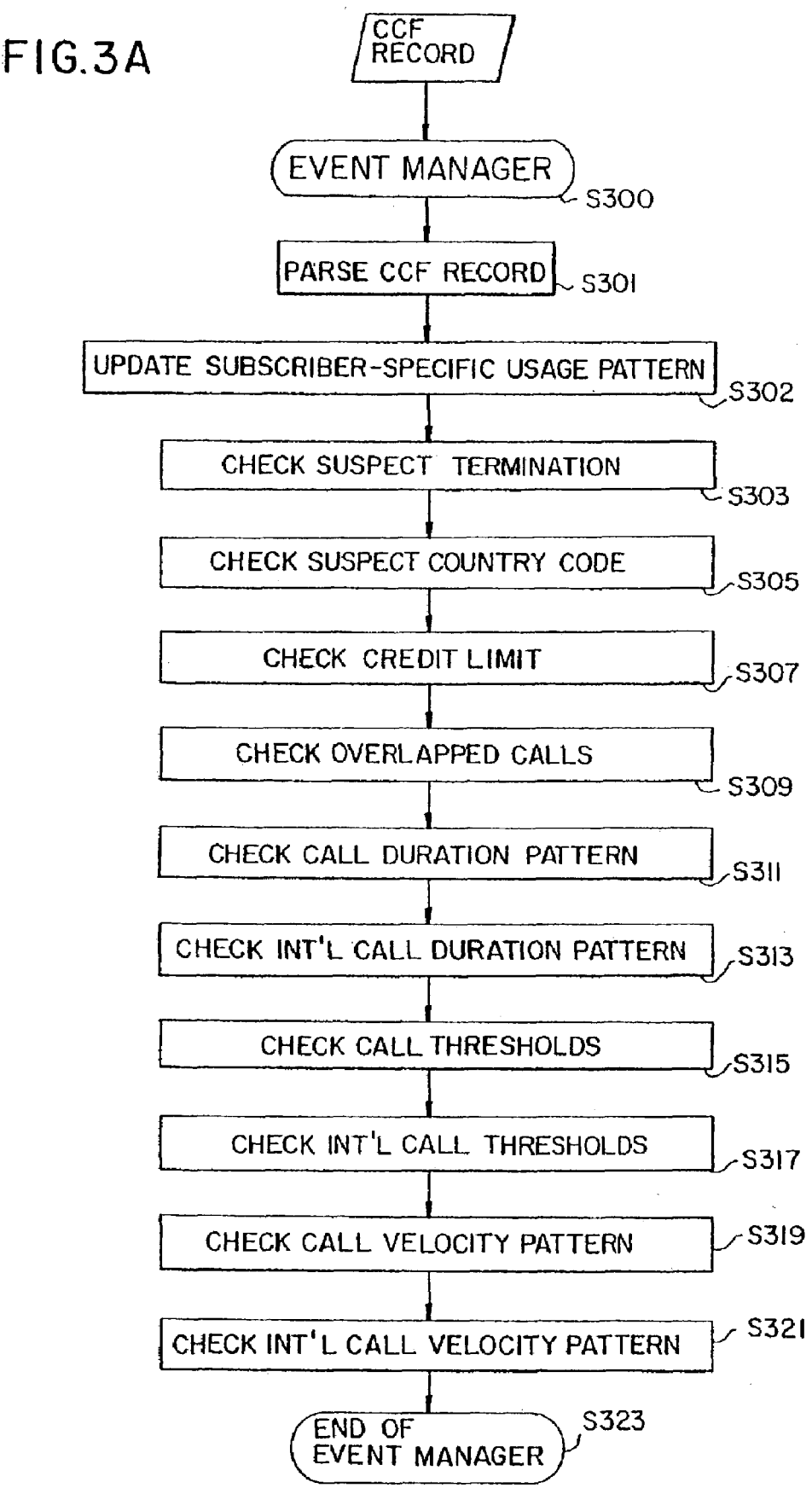

Referring to FIG. 3A, the services indicated by steps S303 through S309 are referred to as "call event" checks. In the call event checks the CCF record is compared to a set of predetermined conditions to determine whether or not an event should be generated for this CCF record. Call events are further broken down into the following event types: number events, country events, credit events, and overlap events. Additionally, overlap events have two event subtypes: geographic dispersion and simultaneous calls.

The services indicated by steps S311 through S321 are referred to as "pattern event" checks. In the pattern event checks the CCF record is used to update a plurality of previously compiled subscriber-specific usage patterns which define a particular subscriber's typical usage. Each CCF record received by the event manager is used to update and maintain an individual usage pattern for the particular subscriber to which the CCF record pertains. In pattern event checks, the event manager will generate an event when the present CCF record, when used to update the subscriber-specific usage pattern, causes the subscriber's usage pattern to indicate a trend of abnormal usage suggestive of fraudulent telecommunications activity. Pattern events are further broken down into the following event types: average events and threshold events. Additionally, average events have the following four subtypes: velocity, international velocity, duration, and international duration. Threshold events have the following six subtypes: daily velocity, daily international velocity, five-day average velocity, five-day average international velocity, ten-day average velocity, and ten-day average international velocity.

The event manager procedure initiates at step S300 when the event manager 113 receives a CCF record from the switch interface 111. At step S301 the event manager parses the CCF record to place the CCF component fields into appropriate variables and data structures to be easily accessible by the event manager services. It should be noted that due to delays in creating and forwarding roamer tapes to the appropriate home MSC, a CCF record being processed by the fraud detection system on a particular day may actually correspond to a call placed several days earlier. Therefore, for each of the steps performed by the fraud detection system, as discussed below, the CCF record is analyzed based on the day the call was originated, rather than on the date on which the CCF record is processed by the fraud detection system. For the sake of convenience, the date on which a call originated will be referred to as the "call date," while the date on which the CCF record is processed by the fraud detection system will be referred to as "today." The date on which a call originated is determined by the value held by the orig date field 229 of the CCF record 201. Additionally, the fraud detection system maintains a database of all CCF records received over the past predetermined number of days so that a delayed CCF record can be analyzed in connection with other calls placed on the same day. This database is referred to as the "calls database."

At step S302 the event manager uses the present CCF record to update the subscriber-specific usage patterns. Specifically, the event manager calculates new five-day and ten-day moving averages for each of the call velocity pattern, the international call velocity pattern, the call duration pattern, and the international call duration pattern. A moving average is a technique used in time-series analysis to smooth a series or to determine a trend in a series, calculated by the equation:

$$m_n = \frac{\sum_{k=n+1-d}^{n} u_k}{d}$$

where $m_n$ is the moving average on day n; k is an index counter; d is the number of days over which the average is calculated and u, $u_2$, ..., $u_n$ are a series of values to be averaged. For example, assume a series of values over day 21 to day 25 where $u_{21}$=16, $u_{22}$=9, $u_{23}$=12, $u_{24}$=8, and $u_{25}$=15. To calculate a five-day moving average on the 25th day, $m_2$., n is equal to 25, d is equal to 5, and k takes the successive values 21, 22, 23, 24, and 25.
Therefore:

$$m_{25} = \frac{u_{21} + u_{22} + u_{23} + u_{24} + u_{25}}{5}$$
$$= \frac{16 + 9 + 12 + 8 + 15}{5}$$
$$= 12.$$

Five and ten-day moving averages are calculated for each of the above-listed four patterns in similar fashion. For example, the five-day moving average call velocity is calculated by summing the number of calls originated within the past five days using a particular subscriber ID and dividing the total by five. Of course, the ten-day averages are calculated by summing over ten days and dividing by ten, rather than five. In order to calculate the ten-day moving average, the fraud detection system saves CCF records for each particular subscriber for the past eleven days.

Although this embodiment of the present invention characterizes subscriber-specific usage patterns by utilizing two moving averages calculated over five days and ten days, respectively, it should be noted that an alternative embodiment may utilize other types of characterizing schemes, for example a weighted moving average. Additionally, even if moving averages are utilized, a different number of moving averages, for example one, three or more, may be used as deemed effective. Moreover, the moving averages may be calculated over a number of days different than five and ten, as desired.

Next, the event manager runs the CCF record through a series of call event checks and pattern event checks, represented by steps S303 through S321. Although one embodiment of the present invention arranges these checks in a specific order as illustrated in FIG. 3A, the checks are substantially order independent and may proceed in any convenient order.

In the embodiment of the present invention depicted in FIG. 3A, the event manager performs the checks in the following order: (1) check suspect termination, (2) check suspect country code, (3) check credit limit, (4) check overlap calls, (5) check call duration pattern, (6) check international call duration pattern, (7) check call thresholds, (8) check international call thresholds, (9) check call velocity pattern, and (10) check international call velocity pattern. Each of these checks will be described in further detail below with reference to FIGS. 3B-3L.

Figure 3B:
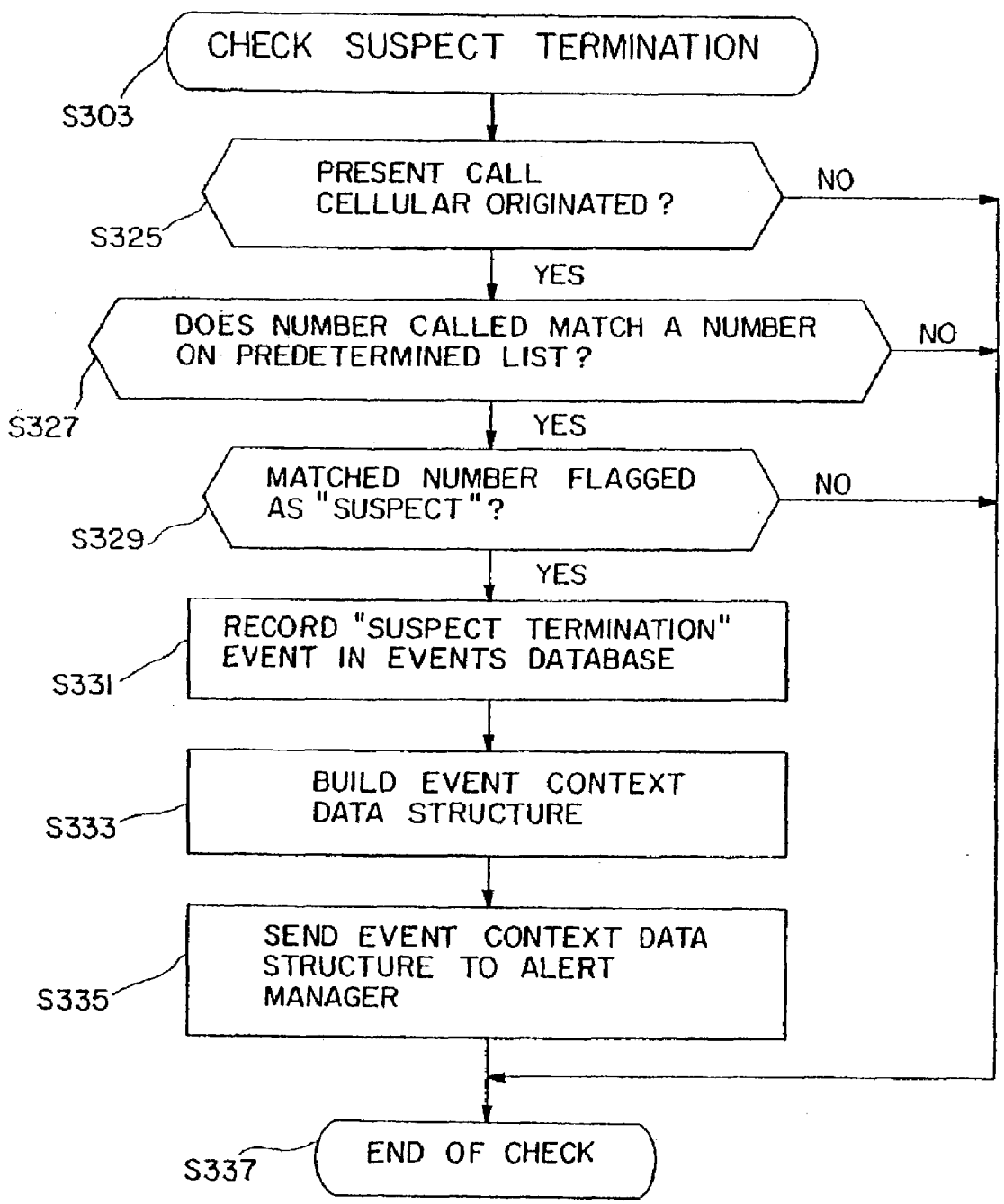

Referring to FIG. 3B, the Check Suspect Termination service S303 is responsible for determining whether the number called by the cellular subscriber is suspected of being called by other fraudulent cellular telephone users. This service receives the called number field 215 of the CCF Record 201 as an argument.

First, at step S325, the service determines whether the present call was cellular originated by examining the call type field 211 of the CCF Record 201. Because this event check is only relevant for cellular originated calls, if the present call was not cellular originated the service flows to step S337, which marks the completion of the Check Suspect Termination service.

If the present call was cellular originated as determined from the call type field 211, the service, at step S327, tests whether the number called, held in the called number field 215, matches a number on a predetermined list of numbers set by the telecommunication service provider and maintained in a database by the fraud detection system 107. If no number on the list is matched the service flows to step S337 and this check is completed.

If a matching number is found the service, at step S329, tests whether the matched number from the database has been flagged as "suspect." If a specified field in the database of numbers is marked "TRUE," then the matched number will be determined to be suspect and the service will flow to step S331. Otherwise, if the specified database field is not marked "TRUE," then the service flows to step S337 and the check is completed.

At step S331, it has been determined that a number called using the particular subscriber ID for this CCF Record is a number suspected of being called by other fraudulent users. Accordingly, the service generates a "suspect termination event" by recording the event type, "number event," along with specific information particular to this call in the events database for this particular subscriber ID.

Next, at step S333, the "event context" data structure is built with information specific to this event. The event context data structure contains information including (1) the event type ("number event"); (2) the event subtype (none for this event type); (3) the subscriber ID number (corresponding to the three MIN fields 203, 205, 207 and the MSN field 209); (4) the call date (from the orig date field 229); and (5) the current alert-state (either normal, yellow, or red depending on the nature and quantity of alerts outstanding for this particular subscriber as determined by the alert manger, discussed below).

Next, at step S335, the service sends the event context data structure previously built at step S333 to the alert manager 115 to signal the alert manager that a new event has been generated and to provide a reference for locating the newly generated event in the events database.

Lastly, the service flows to step S337, where the suspect termination check is completed and the next check in the event manager procedure is initiated.

Referring to FIG. 3C, the Check Suspect Country Code service S305 is responsible for determining whether the country called by the cellular subscriber, as indicated by the country code, is suspected of being called by other fraudulent cellular telephone users. This service receives the called number field 215 of the CCF Record 201 and its related country code as arguments.

First, at step S339, the service determines whether the present call was cellular originated by examining the call type field 211 of the CCF Record 201. Because this event check is only relevant for cellular originated calls, if the present call was not cellular originated the service flows to step S351, and the Check Suspect Country Code service is completed.

If the present call was cellular originated as determined from the call type field 211, the service, at step S341, tests whether the country code called matches a country code on a predetermined list of numbers set by the telecommunication service provider and maintained in a database by the fraud detection system 107. If no country code on the list is matched the service flows to step S351 and this check is completed.

If a matching country code is found the service, at step S343, tests whether the matched country code from the database has been flagged as "suspect." If a specified field in the database of country codes is marked "TRUE," then the country code will be determined to be suspect and the service will flow to step S345. Otherwise, if the specified database field is not marked "TRUE," then the service flows to step S351 and the check is completed.

At step S345, it has been determined that a country called using the particular subscriber ID for this CCF Record is a country suspected of being called by other fraudulent users. Accordingly, the service generates a "suspect country code event" by recording the event type, "country event," along with specific information particular to this call in the events database for this particular subscriber ID.

Next, at step S347, the event context data structure is built with information specific to this event, as discussed above. The event context data structure for this service has the event type, "country event," and no event subtype.

Next, at step S349, the service sends the event context data structure previously built at step S347 to the alert manager 115 to signal the alert manager that a new event has been generated and to provide a reference for locating the newly generated event in the events database.

Lastly, the service flows to step S351, where the suspect country code check is completed and the next check in the event manager procedure is initiated.

Referring to FIG. 3D, the Check Credit Limit service S307 is responsible for determining whether a particular subscriber has exceeded his or her specified usage limit by maintaining a running cumulative total usage duration for each subscriber and comparing the running total to a predetermined value set by the telecommunication service provider. This service receives the call seconds field 233 from the CCF Record 201 as an argument.

First, at step S353, the service tests whether this particular subscriber has an entry for the present month in the credit limit database maintained by the fraud detection system. If a credit limit entry is not found an inconsistency in the system has been encountered; an error is logged to an error handling server and the service flows to step S367 which marks the completion of the credit limit check.

If a credit limit entry is found for this particular subscriber for the present month, the service flows to step S357 where the running monthly usage total for this particular subscriber is updated by adding the usage for the present call, represented by the value held in the call seconds field 233, to the previous monthly usage total for this particular subscriber.

Next, at step S359, the service tests whether the newly calculated monthly usage total exceeds the predetermined usage limit set by the credit risk manager 131 for this particular subscriber. If the usage limit has not been exceeded, the service flows to step S367 which marks the completion of the credit limit check.

If the predetermined usage limit has been exceeded, the service flows to step S361 where a "credit limit event" is generated by recording the event type, "credit event," along with specific information particular to this call in the events database for this particular subscriber ID.

Next, at step S363, the event context data structure is built with information specific to this event, as discussed above. The event context data structure for this service has the event type, "credit event," and no event subtype.

Next, at step S365, the service sends the event context data structure previously built at step S365 to the alert manager 115 to signal the alert manager that a new event has been generated and to provide a reference for locating the newly generated event in the events database.

Lastly, the service flows to step S367, where the credit limit check is completed and the next check in the event manager procedure is initiated.

Although one embodiment of the above-described credit limit check performs the check on the basis of cumulative call duration in units of time, as an alternative, the credit limit check may be performed on the basis of cumulative money charges, by multiplying the particular service provider's rate times the cumulative call duration. It has been determined, however, that using time units rather than money units to perform the credit limit check provides several advantages, including enhanced simplicity, flexibility, and accuracy.

Figure 3E:
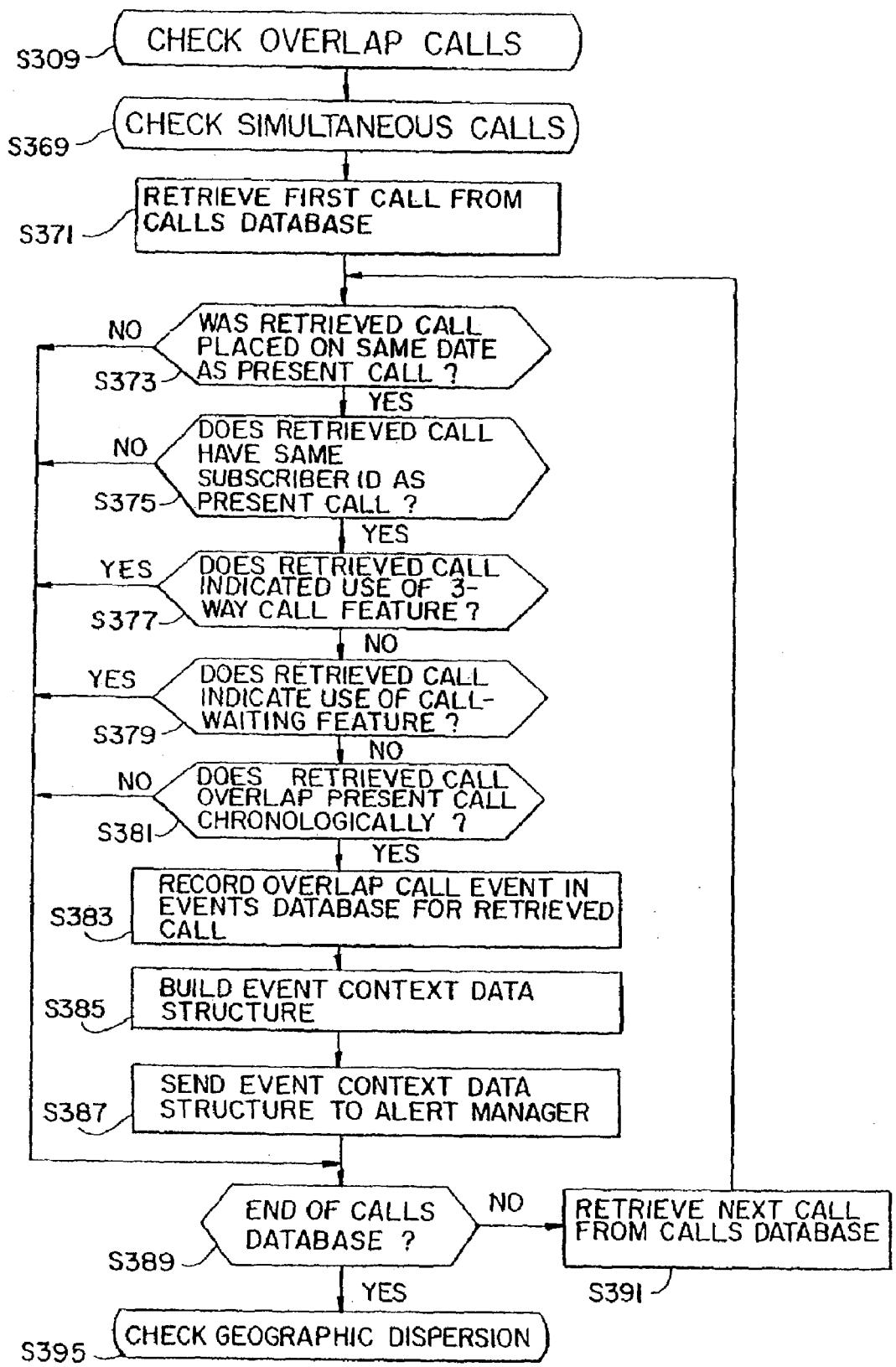
Figure 3F:
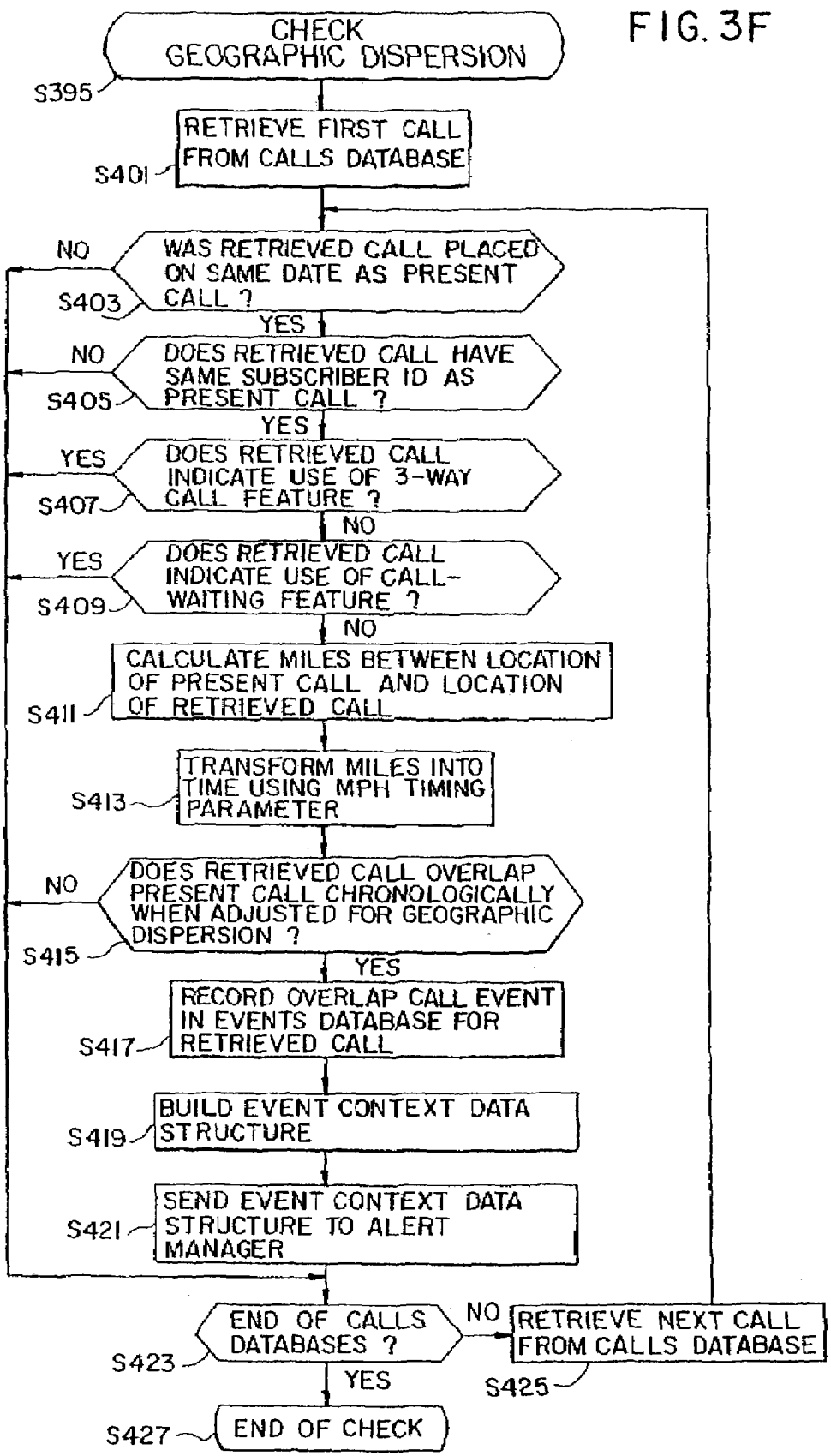

Referring to FIGS. 3E-3F, the Check Overlap Calls service S309 is responsible for determining whether a call made by a particular subscriber overlaps any other calls made using that same subscriber ID. Overlapping calls are two or more calls which either (1) occur concurrently, or (2) are placed from different geographic regions and occur within a sufficiently short time interval such that it would be improbable that a single subscriber could place the first call and then travel to the location of the second call within the given time interval to place the second call. Because each unique subscriber ID or calling card number may typically only be used by a single subscriber from a single location at any one time, fraud is indicated upon occurrence of either or both of these two conditions. The Check Overlap Calls service is comprised of two separate checks: Check Simultaneous Calls and Check Geographic Dispersion.

Referring to FIG. 3E, the Check Overlap Calls service first performs the Simultaneous Calls check at step S369. After retrieving the first call stored in the calls database at step S371, the check simultaneous calls service, at step S373, tests whether the retrieved call was placed on the same date as the call presently under consideration as determined from the orig date field 229 of the CCF Record 201. If the retrieved call was not placed on the same date, the retrieved call cannot overlap the present call and the service flows to step S389 to check the next call in the calls database, if any.

If the retrieved call was placed on the same date as the present call, the service, at step S375, tests whether the retrieved call has the same subscriber ID as the present call, as determined by the three MIN fields 203, 205, 207 and the MSN field 207. If the subscriber IDs do not match, the retrieved call cannot overlap the present call and the service flows to step S389 to check the next call in the calls database, if any.

If the subscriber IDs match, the service, at steps S377 and S379, tests whether the retrieved call used either the three-way call or the call-waiting features, respectively, as determined from the call feature field 231 of the retrieved call CCF record. Calls utilizing these call features are presently ignored when checking for overlap calls because calls that utilize these features, while appearing to overlap, may be legitimate. Accordingly, when these call features are present the service flows to step S389 to check the next call in the calls database, if any.

If neither of these call features were utilized, the service, at step S381, tests whether any portion of the retrieved call chronologically overlaps the present call. Overlap is determined by satisfying either of the following two conditions: (1) the origination time of the present call (as determined from the value held by the orig time field 227 of the present call CCF record) is chronologically between the origination time of the retrieved call (as determined from value held by the orig time field 227 of the retrieved call CCF record) and the termination time of the retrieved call (as determined by adding the value held by the call seconds field 233 of the retrieved call CCF record to the value held by the orig time field 227 of the retrieved call CCF record); or (2) the termination time of the present call (as determined by adding the value held by the call seconds field 233 of the present call CCF record to the value held by the orig time field 227 of the present call CCF record) is chronologically between the origination time of the retrieved call and the termination time of the retrieved call. If neither of these two conditions are met, the retrieved call and the present call do not overlap chronologically, and the service flows to step S389 to check the next call in the calls database, if any.

If either of the two conditions are met, however, the present call and the retrieved call overlap chronologically and the service flows to step S383 where an "overlap call event" is generated by recording the event subtype, "simultaneous calls," along with specific information particular to this call in the events database for this particular subscriber ID.

Next, at step S385, the event context data structure is built with information specific to this event, as discussed above. The event context data structure for this service has the event type, "overlap event," and event subtype, "simultaneous calls."

Next, at step S387, the service sends the event context data structure previously built at step S385 to the alert manager 115 to signal the alert manager that a new event has been generated and to provide a reference for locating the newly generated event in the events database. It should be noted that the service performs steps S383 through S387—that is, another event is generated—for each call retrieved from the calls database which overlaps the present call. Therefore, the single CCF record under consideration may generate multiple "overlap call" events.

Next, at step S389, the service tests whether any calls remain in the calls database to be compared for overlap with the present call. If additional calls remain in the calls database which have not yet been checked for overlap with the present call, the service flows to step S391 where the next call is retrieved from the calls database and the service returns to step S373 to check for call overlap. It should be noted that steps S373 through S391 are performed as many times as the number of calls in the calls database.

If no more calls remain to be compared, the service, at step S395, performs a Geographic Dispersion Check, a flow chart for which is shown in FIG. 3F. Referring to FIG. 3F, at step S401, the check Geographic Dispersion service retrieves the first call stored in the calls database.

Next, at step S403, the service tests whether the retrieved call was originated on the same date as the call presently under consideration as determined from the orig date field 229 of the CCF Record 201. If the retrieved call was not placed on the same date, the retrieved call cannot overlap the present call and the service flows to step S423 to check the next call in the calls database, if any.

If, however, the retrieved call was placed on the same date as the present call, the service, at step S405, tests whether the retrieved call has the same subscriber ID as the present call, as determined by the three MIN fields 203, 205; 207 and the MSN field 207. If the subscriber IDs do not match, the retrieved call cannot overlap the present call and the service flows to step S423 to check the next call in the calls database, if any.

If the subscriber IDs match, the service, at steps S407 and S409, tests whether the retrieved call used either the three-way call or the call-waiting features, respectively, as determined from the call feature field 231 of the retrieved call CCF record. Calls utilizing these call features are presently ignored when checking for overlap calls because calls that utilize these features, while appearing to have a geographical dispersion problem, may be legitimate. Accordingly, when these call features are present the service flows to step S423 to check the next call in the calls database, if any.

If neither of these call features were utilized, the service, at step S411, calculates the mileage between the location of the present call and the location of the retrieved call using, for example, the "airline formula." The airline formula is taught by the following publication, AT&T Tariff F.C.C., No. 264 (effective date: Apr. 2, 1979), a copy of which is included as Appendix B. The locations of the retrieved and present calls are determined from the values held by the sid field 221, the first serving field 223 and the first serving cell field 225 of the each of the CCF records for the present and retrieved calls. Because each MSC has a unique identifying number, and because the exact geographic location of each MSC is known, the service can approximate the location of each call by using the MSC identifier to index a database of MSC geographic coordinates.

Next, at step S413, the mileage between the location of the present call and the location of the retrieved call is transformed into a time value using a predetermined Miles-Per-Hour (MPH) tuning parameter. The time value calculated is the geographic dispersion adjustment which will be applied to the calls under comparison to determine if call overlap occurred.

Next, at step S415, the service tests whether any portion of the present call chronologically overlaps the retrieved call when adjusted for geographic dispersion. Overlap is determined by satisfying either of the following two conditions: (1) the origination time of the present call (as determined from the value held by the orig time field 227 of the present call CCF record) is chronologically between the origination time of the retrieved call (as determined from value held by the orig time field 227 of the retrieved call CCF record) minus the geographic dispersion adjustment time and the termination time of the retrieved call (as determined by adding the value held by the call seconds field 233 of the retrieved call CCF record to the value held by the orig time field 227 of the retrieved call CCF record) plus the geographic dispersion adjustment time; or (2) the termination time of the present call (as determined by adding the value held by the call seconds field 233 of the present call CCF record to the value held by the orig time field 227 of the present call CCF record) is chronologically between the origination time of the retrieved call minus the geographic dispersion adjustment time and the termination time of the retrieved call plus the geographic dispersion adjustment time. If neither of these two conditions are met, the retrieved call and the present call do not overlap chronologically when adjusted for geographic dispersion, and the service flows to step S423 to check the next call in the calls database, if any.

If either of the two conditions are met, however, the present call and the retrieved call overlap chronologically when adjusted for geographic dispersion and the service, at step S417, generates a "overlap call event" by recording the event subtype, "geographic dispersion," along with specific information particular to this call in the events database for this particular subscriber ID.

Next, the service flows to step S419 where the event context data structure is built with information specific to this event, as discussed above. The event context data structure for this service has the event type, "overlap event," and event subtype, "geographic dispersion."

Next, at step S421, the service sends the event context data structure previously built at step S419 to the alert manager 115 to signal the alert manager that a new event has been generated and to provide a reference for locating the newly generated event in the events database. It should be noted that the service performs steps S417 through S421—that is, another event is generated—for each call retrieved from the calls database which overlaps the present call when adjusted for geographic dispersion. Therefore, the single CCF record under consideration may generate multiple "overlap call" events.

Next, at step S423, the service tests whether any calls remain in the calls database to be compared for geographic dispersion overlap with the present call. If additional calls remain in the calls database which have not yet been checked for geographic dispersion overlap with the present call, the service flows to step S425 where the next call is retrieved from the calls database and the service returns to step S403 to check for geographic dispersion call overlap. It should be noted that steps S403 through S425 are performed as many times as the number of calls in the calls database.

If no more calls remain to be compared, the service flows to step S427 where the Overlap Calls Check is completed and the next check in the event manager procedure is initiated.

Figure 3G:
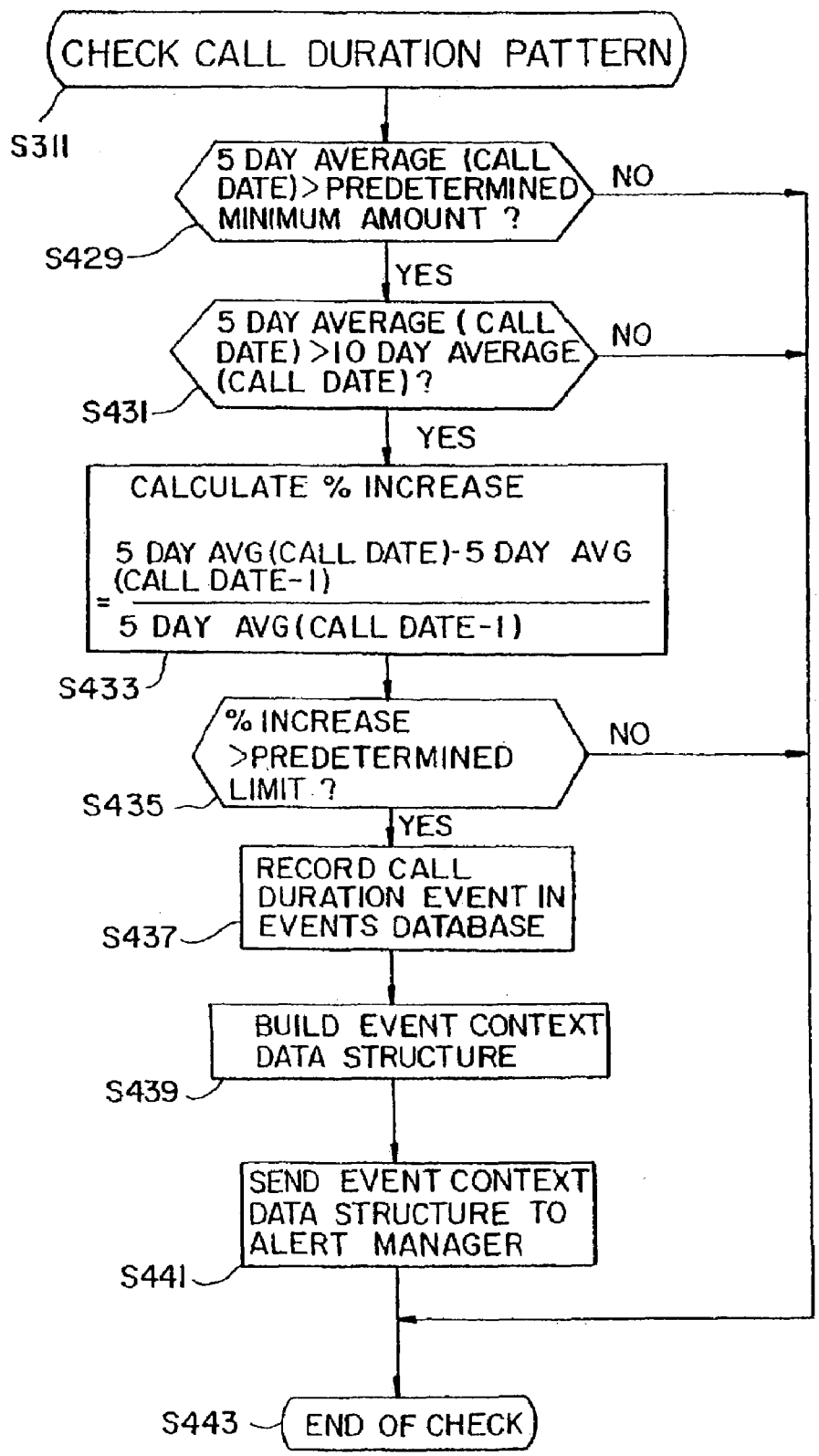

Referring to FIG. 3G, the Check Call Duration Pattern service S311 is responsible for determining if a particular subscriber's call duration is increasing at a rate which makes it suspect for fraudulent activity. The trend being examined is a five-day moving average increasing over a ten-day moving average for a prolonged period of time. This trend shows a marked increase in the amount of time a subscriber is willing to stay on the telephone. The theory is that users who do not intend to pay for their telephone services (for example, cloning fraud users) will not be concerned with the length of their calls. This service expects the previously calculated five-day and ten-day call duration moving averages as arguments.

First, at step S429, the service tests whether the five-day moving average call duration calculated for the call date is greater than a predetermined minimum amount. This step ensures that fluctuations in usage for low volume users do not generate an abnormal number of events. For example, if a subscriber whose five-day moving average call duration was 130 seconds on the day before the call date based on a single call within the past five days, increased to 195 seconds on the call date based on one additional call, a 50% increase would be calculated, even though the actual usage change is represented by one long call. If the five-day moving average call duration calculated for the call date is less than the predetermined amount, therefore, a call duration pattern check would not be performed and false alerts would be avoided. This would be the case, continuing with the example, if the predetermined minimum amount were 200 seconds. Accordingly, the service flows to step S443 which marks the completion of the check.

If, however, the five-day moving average call duration is greater than the predetermined minimum amount, the service, at step S431, tests whether the five-day moving average call duration for the call date is greater than the ten-day moving average call duration for the same date. If it is not greater, the service flows to step S443 which marks the completion of the check.

If the five-day moving average call duration for the call date is greater than the ten-day moving average call duration for the same date, the service, at step S433, calculates the percentage increase between the five-day moving average call duration for the call date and the five-day moving average call duration for the day before the call date.

Next, at step S435, the service tests whether the percentage increase calculated at step S433 is greater than a predetermined limit. If the predetermined limit is not exceeded it indicates that the average call duration for the particular subscriber ID under consideration is not increasing at an abnormal rate and there is no reason to suspect fraud on the basis of the call duration trend. Accordingly, the service flows to step S443 which marks the completion of the check.

If, however, the percentage increase exceeds the predetermined limit, it indicates that call duration for the particular subscriber ID under consideration is increasing at an abnormal rate. Accordingly, at step S437, the service generates a "call duration pattern event" by recording the event type, "average event," and the event subtype, "duration," along with specific information particular to this call in the events database for this particular subscriber ID.

Next, the service flows to step S439 where the event context data structure is built with information specific to this event, as discussed above. The event context data structure for this service has the event type, "average event," and event subtype, "duration."

Next, at step S441, the service sends the event context data structure previously built at step S439 to the alert manager 115 to signal the alert manager that a new event has been generated and to provide a reference for locating the newly generated event in the events database.

Lastly, the service flows to step S443, where the call duration pattern check is completed and the next check in the event manager procedure is initiated.

Figure 3H:
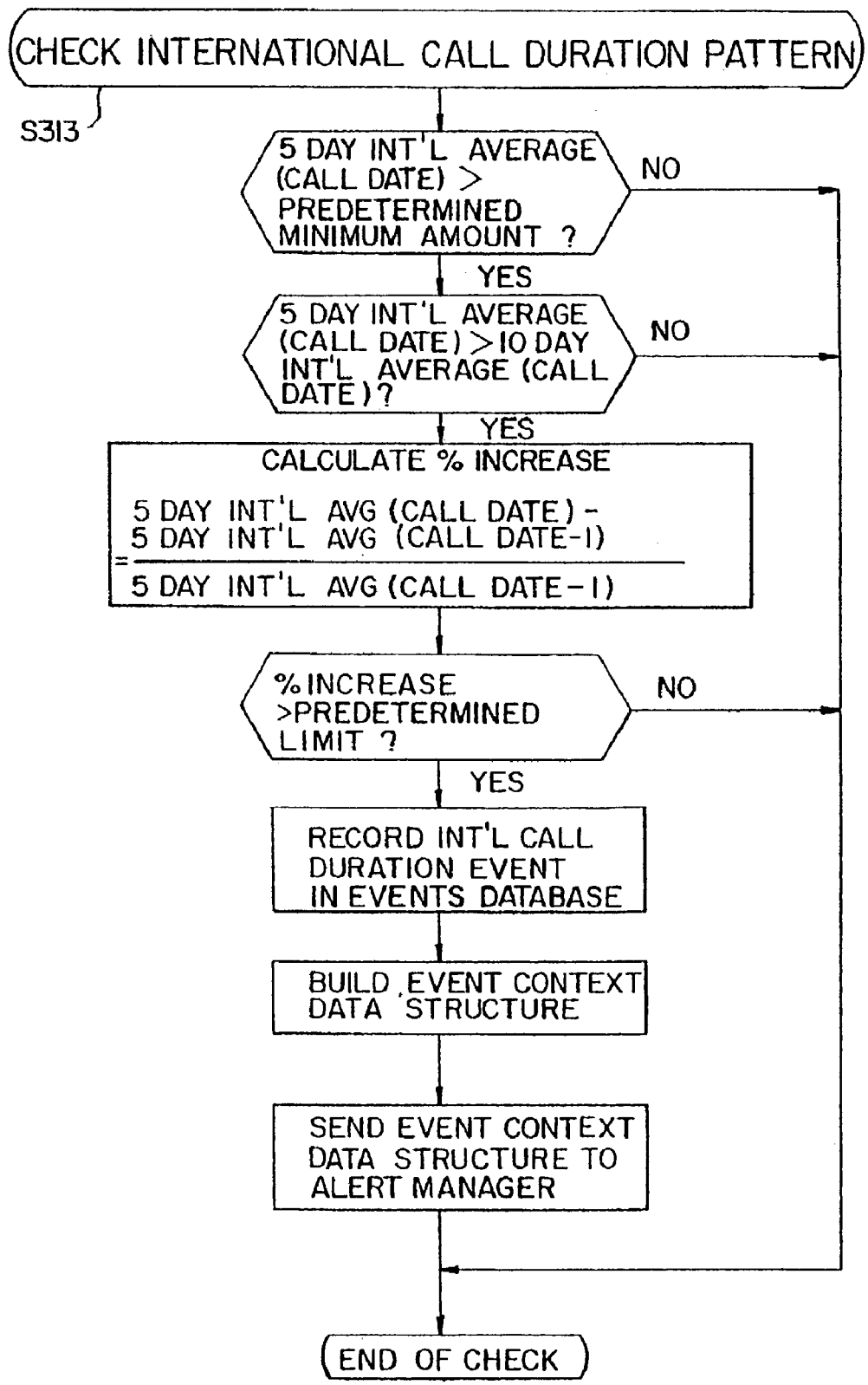

As illustrated in FIG. 3H, the service for Check International Call Duration Pattern is nearly identical to the service for Check Call Duration Pattern, except the event manager maintains a separate subscriber-specific pattern for international call duration against which the CCF record is checked, and the event subtype is "international duration." Due to the near identity of this service with the Check Call Duration Pattern service, no further discussion is necessary.

Figures 1, 3I:
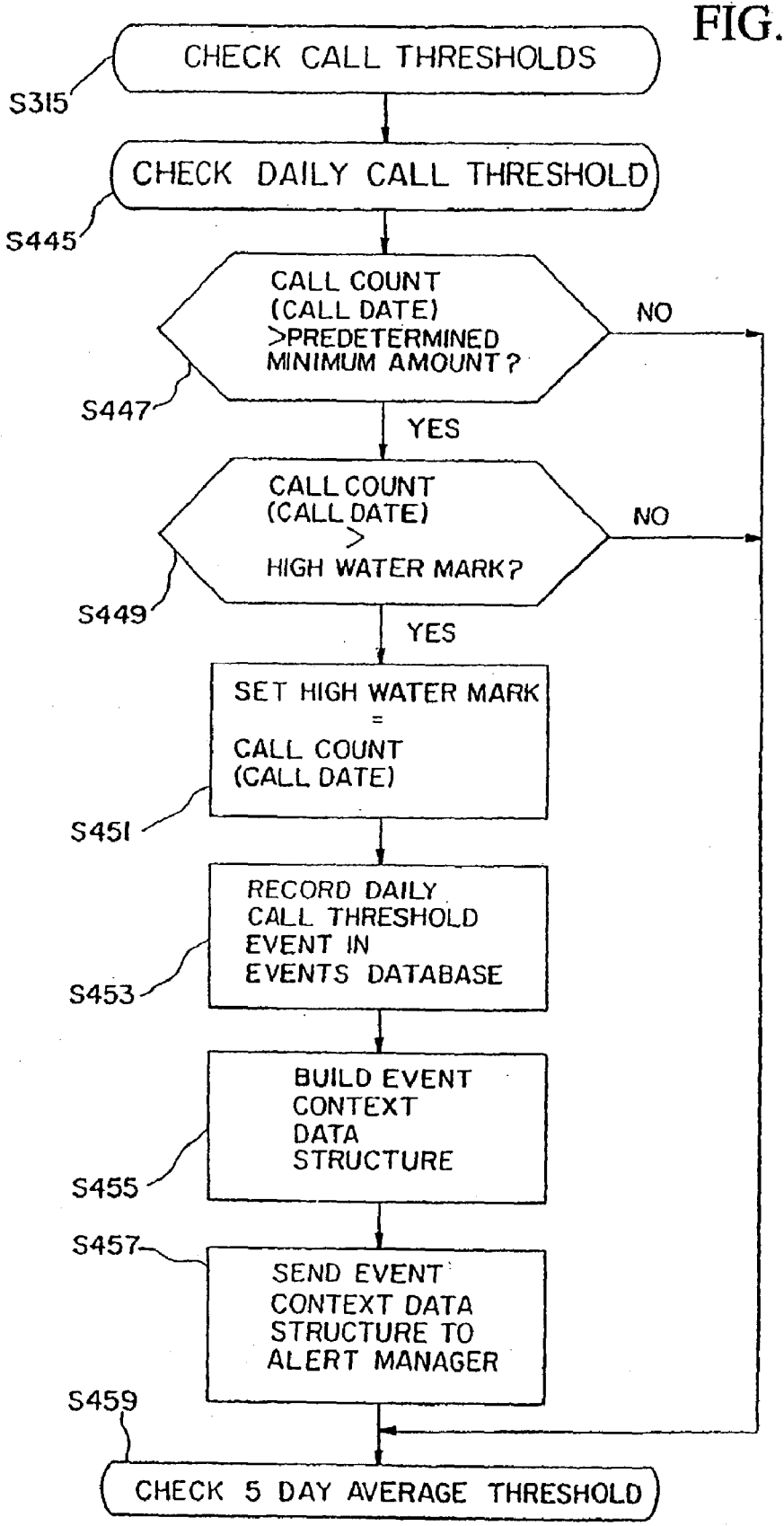
Figures 2, 3I:
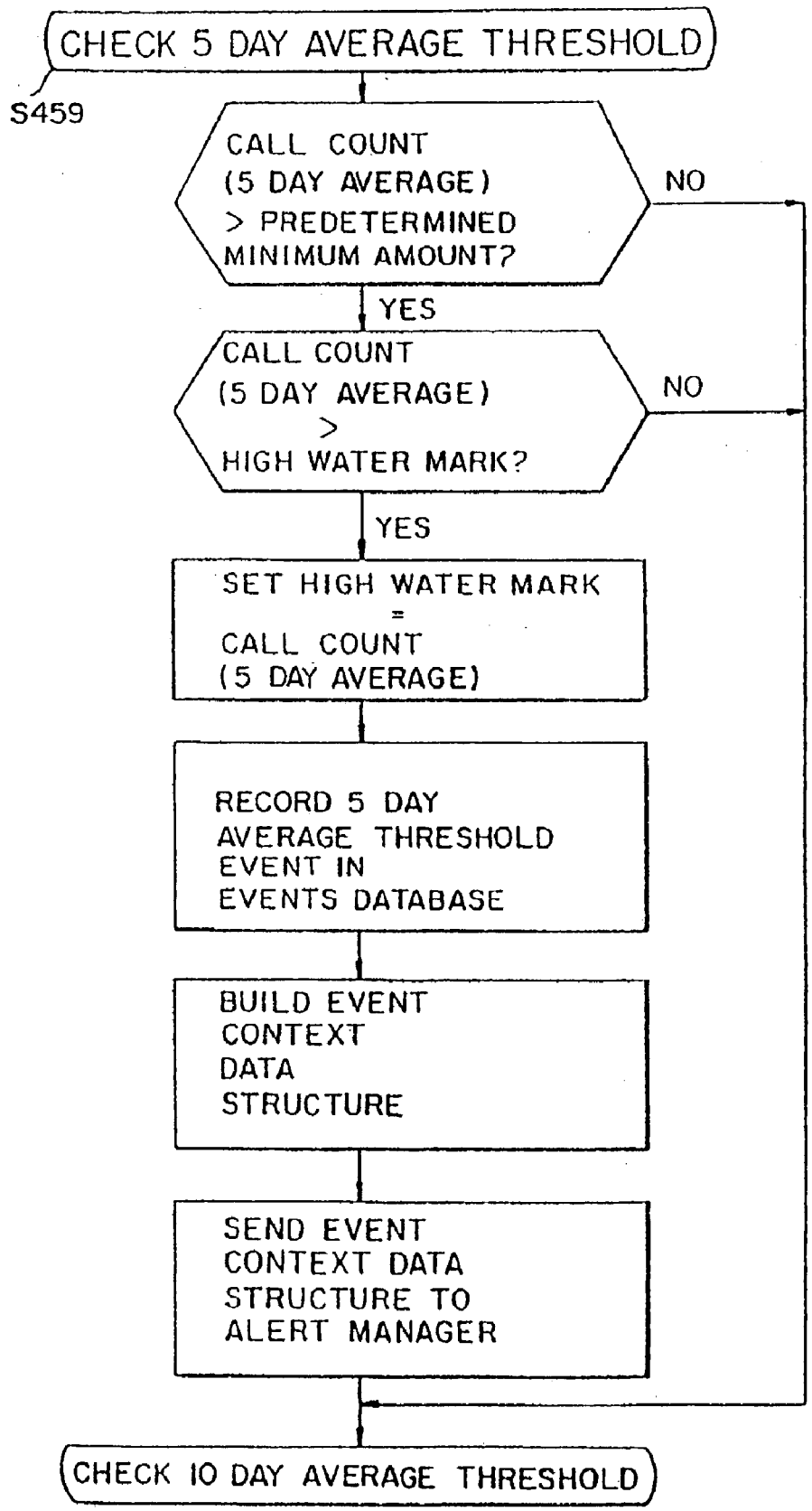
Figures 3, 3I:
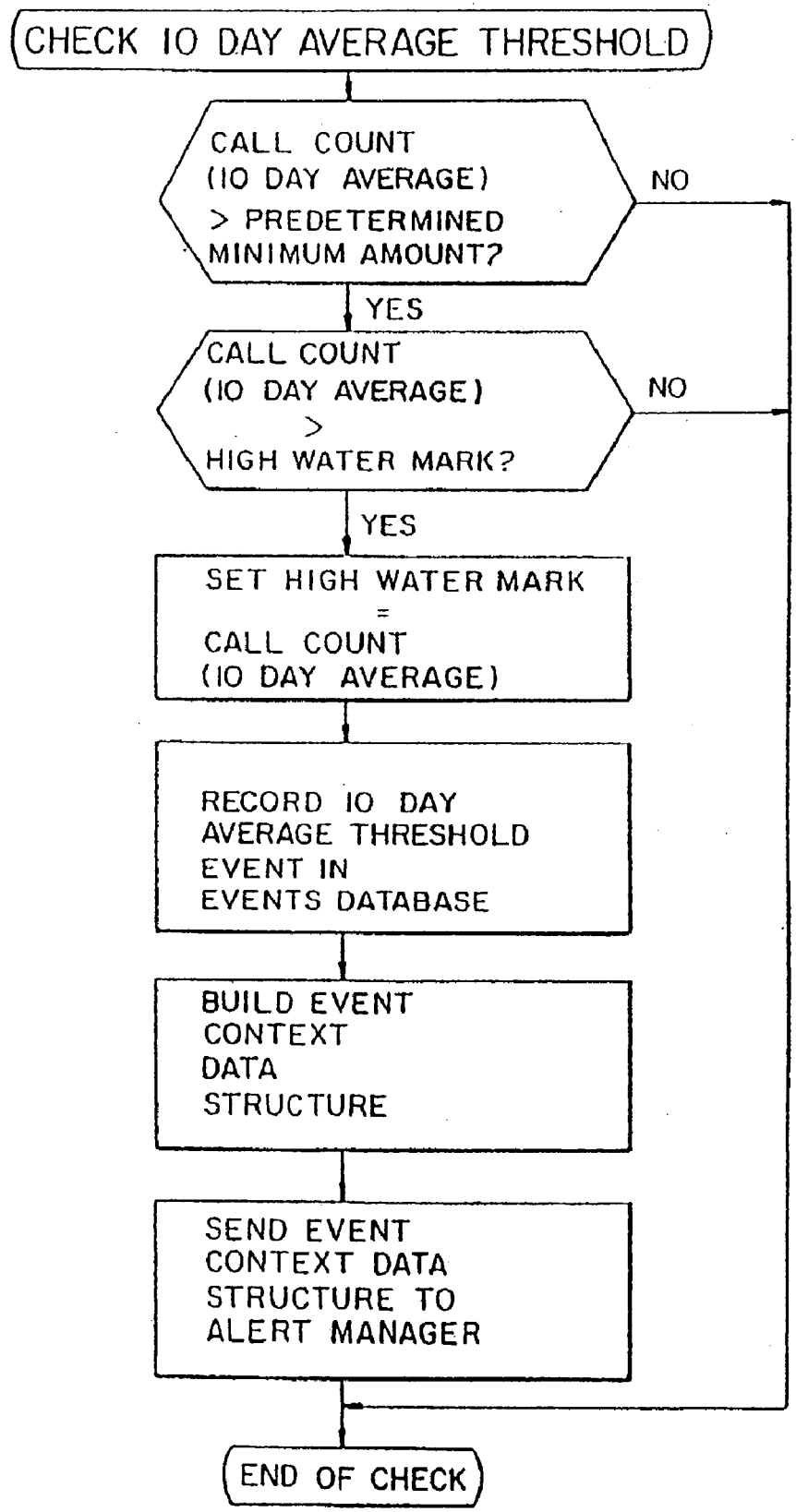

Referring to FIG. 3I, the Check Call Thresholds service S315 is responsible for determining whether a particular subscriber has exceeded one or more of his or her previous high water marks. A high water mark is the highest number of calls placed within a given time period. The Check Call Thresholds service S315 comprises three separate checks: a one-day high water mark check, a five-day moving average high water mark check, and a ten-day moving average high water mark check. The fraud detection system 107 keeps track of the highest number of calls ever made by a particular subscriber for each the three different time periods. With each additional CCF record processed, the Check Call Thresholds service S315 checks to see if the addition of the present call to the present total number of calls placed for each of the three separate time periods exceeds one of the high water marks for a particular subscriber. Because the three checks are nearly identical, with only a difference in the time period to be used in performing the check, only the daily call threshold check will be explained in detail.

As shown in FIG. 3I, the Daily Call Threshold Check S445 is performed first. At step S447 the service tests whether the present daily call count—that is, the total number of calls made for the call date—exceeds a predetermined minimum amount. This step ensures that an excess number of daily threshold events are not generated for low volume subscribers. For example, it would be undesirable to generate a daily threshold event for a low volume subscriber who placed only three calls for the call date, but whose previous daily high water mark was 2 calls placed in one day. Accordingly, if the present call count does not exceed the predetermined minimum amount the service flows to step S459 and the next call threshold check is initiated.

If, however, the present call count exceeds the predetermined minimum amount, the service, at step S449, tests whether the present daily call count exceeds the one-day high water mark. If the one-day high water mark is not exceeded, the service flows to step S459 and the next call threshold check is initiated.

If, however, the one-day high water mark is exceeded by the present daily call count, the service, at step S451, resets the one-day high water mark to the present daily call count, and then, at step S453, generates a daily call threshold event by recording the event type, "threshold event," and the event subtype "1 day velocity," along with specific information particular to this call in the events database for this particular subscriber ID.

Next, at step S455, the event context data structure is built with information specific to this event, as discussed above. The event context data structure for this service has the event type, "threshold event," and event subtype, "1 day velocity."

Next, at step S457, the service sends the event context data structure previously built at step S455 to the alert manager 115 to signal the alert manager that a new event has been generated and to provide a reference for locating the newly generated event in the events database.

Next, at step S459, the service initiates the five-day moving average threshold check. As illustrated in FIG. 3I, both the five-day and ten-day checks are nearly identical to the daily check, except that the high water marks for five-day and ten-day periods, respectively, are used, and the event subtypes are "5 day average velocity" and "10 day average velocity," respectively. Consequently, no further discussion of these checks is believed to be necessary.

Figures 1, 3J:
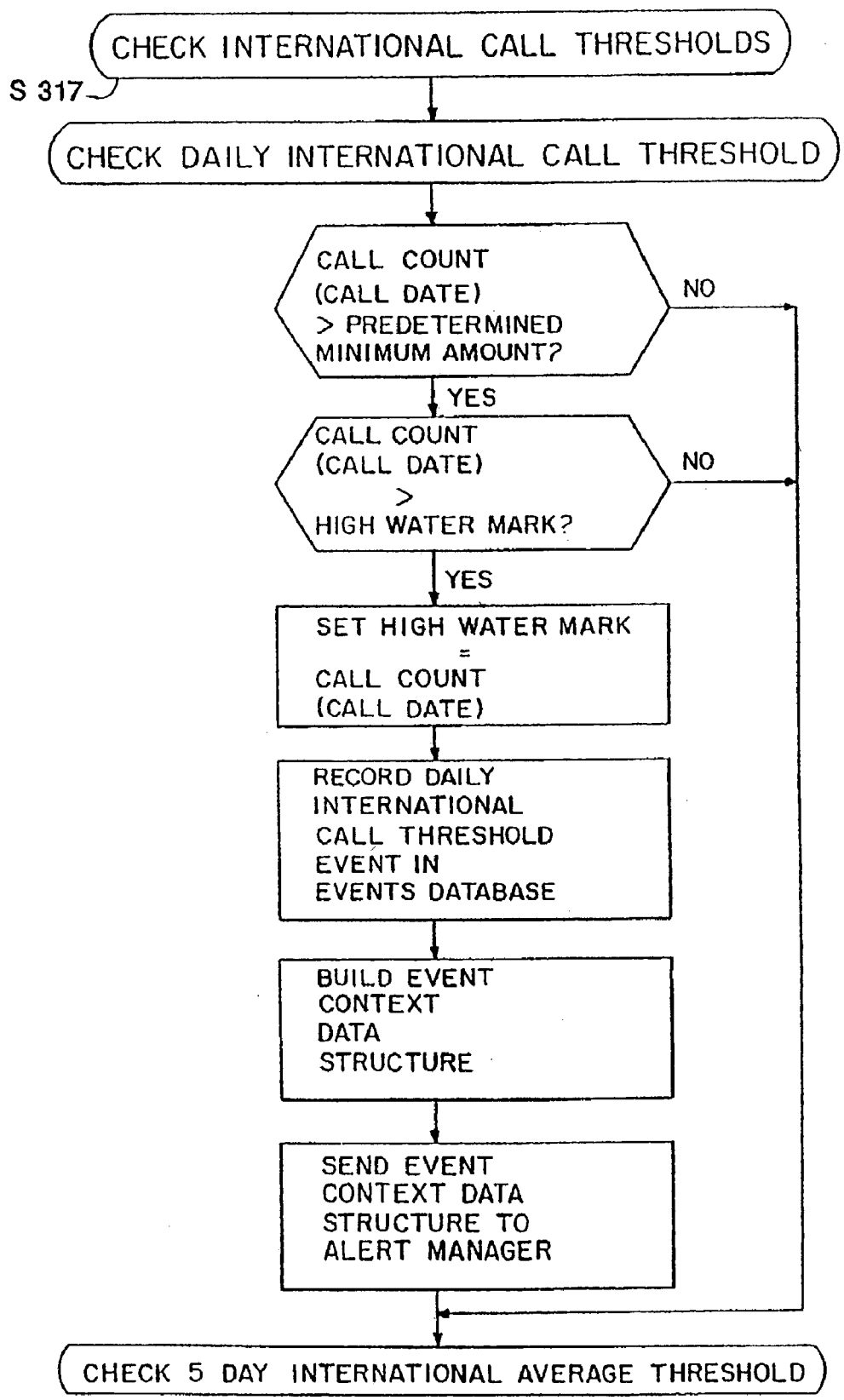
Figures 2, 3J:
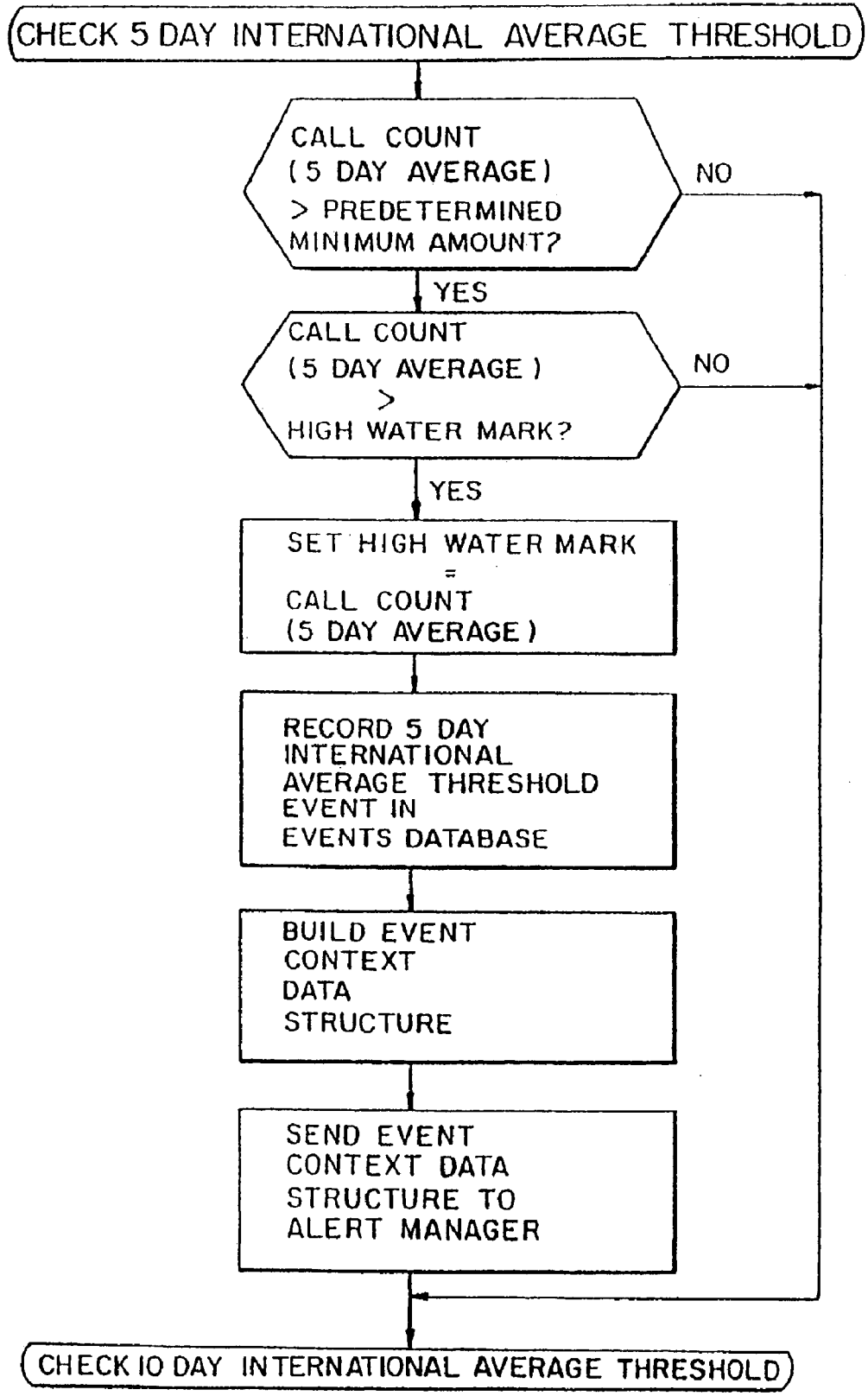
Figures 3, 3J:
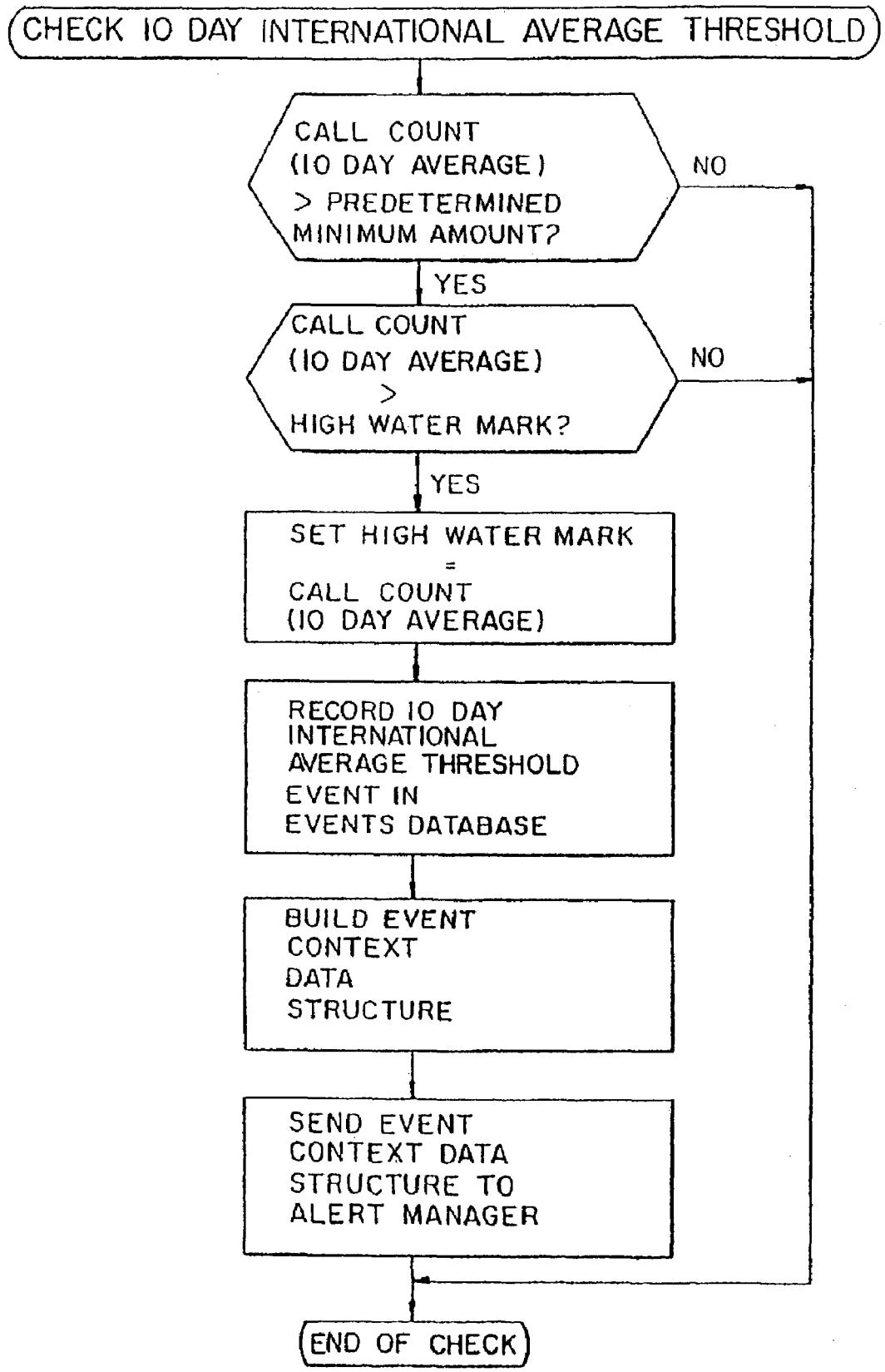

As illustrated in FIG. 3J, the service for Check International Call Thresholds is nearly identical to the service for Check Call Thresholds, except the event manager maintains a separate subscriber-specific pattern for international call thresholds against which the CCF record is checked, and the events subtypes are "1 day international velocity," "5 day average international velocity," or "10 day average international velocity," as appropriate. Due to the near identity of this service with the Check Call Thresholds service, no further discussion is believed necessary.

Figure 3K:
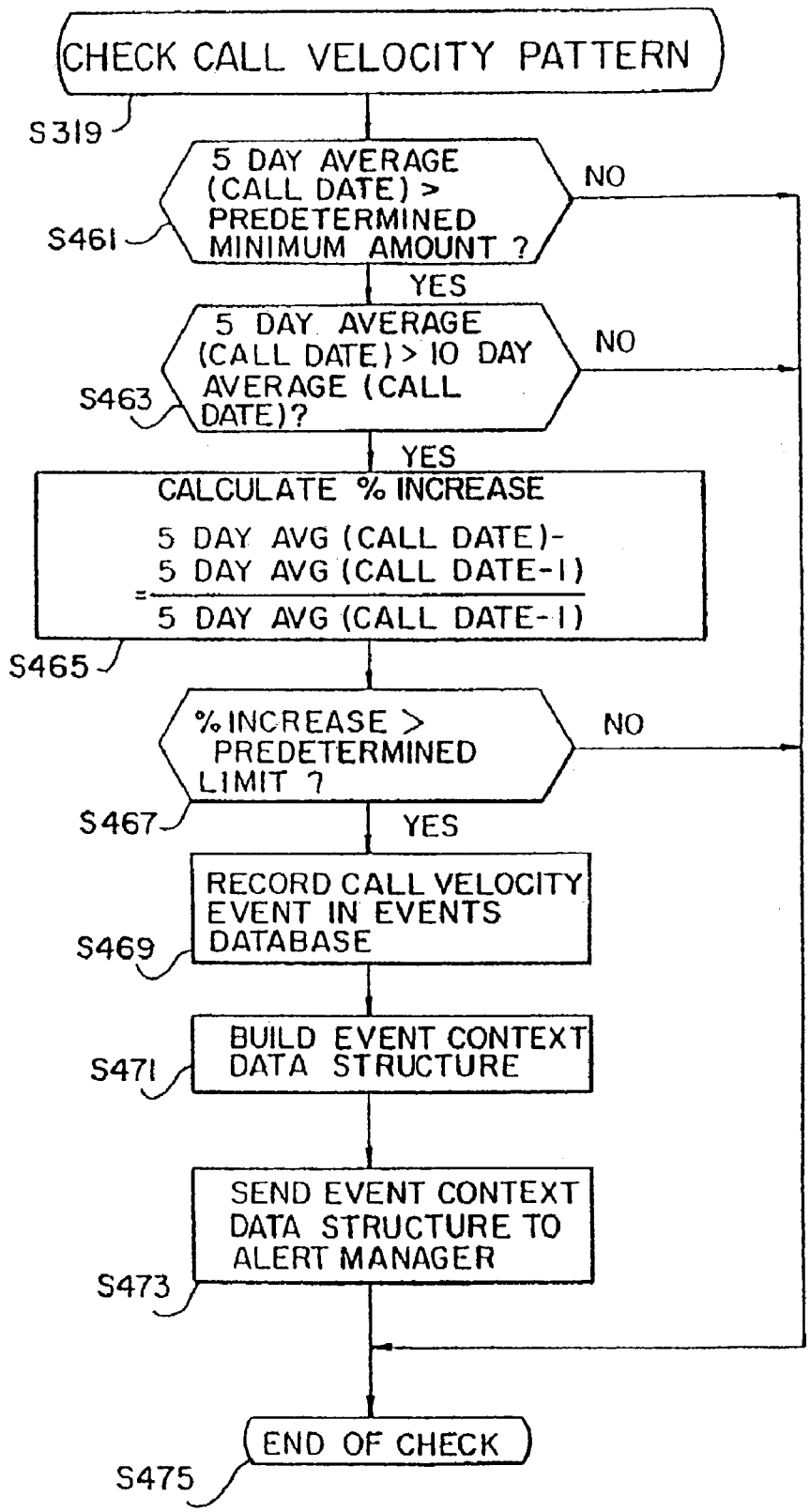

Referring to FIG. 3K, the Check Call Velocity Pattern service S319 is responsible for determining if a particular subscriber's call velocity is increasing at a rate which makes it suspect for fraudulent activity. The trend being examined is a five-day moving average increasing over a ten-day moving average for a prolonged period of time. This trend shows a marked increase in the number of calls a subscriber is willing to place. The theory is that users who do not intend to pay for their telephone services (for example, cloning fraud users) will not be concerned with the quantity of their calls. This service expects the previously calculated five-day and ten-day call velocity moving averages as arguments.

First, at step S461, the service tests whether the five-day moving average call velocity calculated for the call date is greater than a predetermined minimum amount. This step ensures that fluctuations in usage for low volume users do not generate an abnormal number of events. For example, if a subscriber whose five-day moving average call velocity was 2 calls/day on the day before the call date increased to 3 calls/day on the call date, a 50% increase would be calculated, even though the actual usage change is as insignificant as one call. If the five-day moving average call velocity calculated for the call date is less than the predetermined amount, therefore, a call velocity pattern check would likely generate false alerts and should not be performed. Accordingly, the service flows to step S475 which marks the completion of the check.

If, however, the five-day moving average call velocity is greater than the predetermined minimum amount, the service, at step S463, tests whether the five-day moving average call velocity for the call date is greater than the ten-day moving average call velocity for the same date. If it is not greater, the service flows to step S475 which marks the completion of the check.

If the five-day moving average call velocity for the call date is greater than the ten-day moving average call velocity for the same date, the service, at step S465, calculates the percentage increase between the five-day moving average call velocity for the call date and the five-day moving average call velocity for the day before the call date.

Next, at step S467, the service tests whether the percentage increase calculated at step S465 is greater than a predetermined limit. If the predetermined limit is not exceeded it indicates that the average call velocity for the particular subscriber ID under consideration is not increasing at an abnormal rate and there is no reason to suspect fraud on the basis of the call velocity trend. Accordingly, the service flows to step S475 which marks the completion of the check.

If, however, the percentage increase exceeds the predetermined limit, it indicates that call velocity for the particular subscriber ID under consideration is increasing at an abnormal rate. Accordingly, at step S469, the service generates a "call velocity pattern event" by recording the event type, "average event," and the event subtype, "velocity," along with specific information particular to this call in the events database for this particular subscriber ID.

Next, the service flows to step S471 where the event context data structure is built with information specific to this event, as discussed above. The event context data structure for this service has the event type, "average event," and event subtype, "velocity."

Next, at step S473, the service sends the event context data structure previously built at step S471 to the alert manager 115 to signal the alert manager that a new event has been generated and to provide a reference for locating the newly generated event in the events database.

Lastly, the service flows to step S475, where the call velocity pattern check is completed and the next check in the event manager procedure is initiated.

Figure 3L:
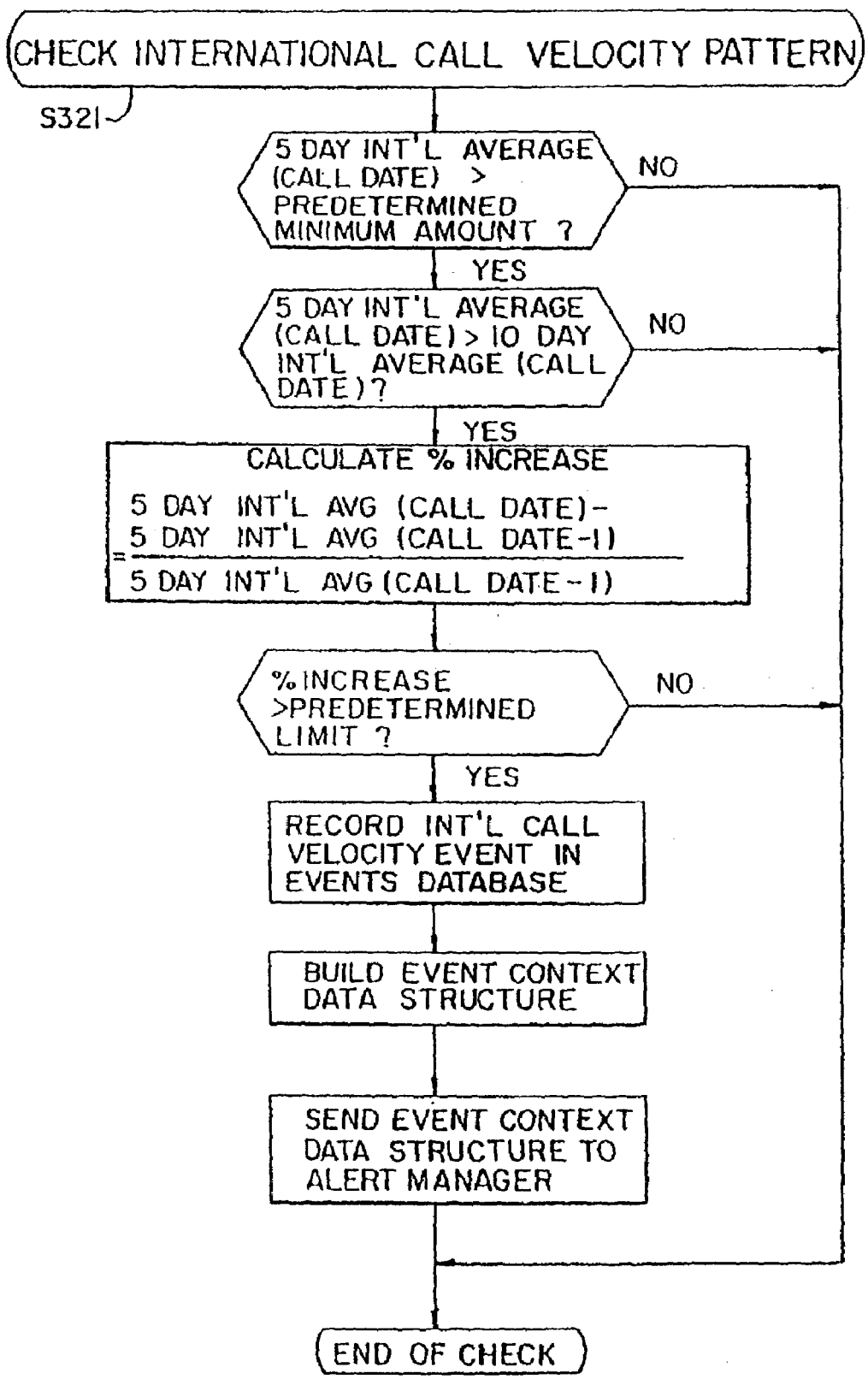

As illustrated in FIG. 3L, the service for Check International Call Velocity Pattern is nearly identical to the service for Check Call Velocity Pattern, except the event manager maintains a separate subscriber-specific pattern for international call velocity against which the CCF record is checked, and the event subtype is "international velocity." Due to the near identity of this service with the Check Call Velocity Pattern service, no further discussion is felt necessary.

Once all of the event manager checks have been performed, the event manager procedure is complete for the particular CCF record under consideration as indicated by step S323 in FIG. 3A. If a new event was not generated for the present CCF record, the fraud detection system procedure is complete for that CCF record. Accordingly, the fraud detection system 107 waits for the next CCF record to be input into the switch interface 111.

Figure 4A:
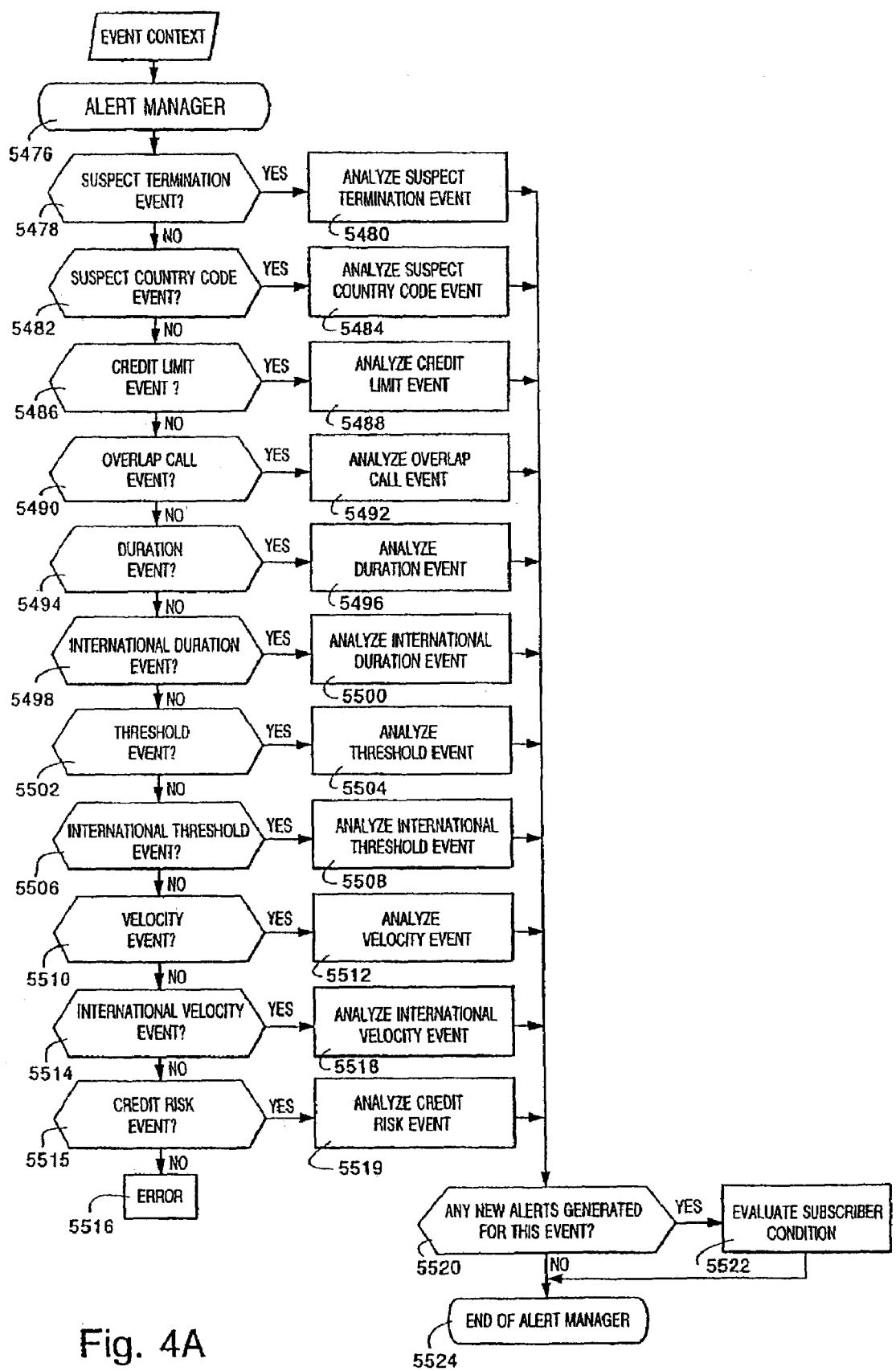

However, if one or more events were generated for the present CCF record, each corresponding event context data structure is passed to the alert manager 115, the procedure for which is illustrated by a flowchart in FIG. 4A. The function of the alert manager 115 is to receive each event generated by the event manager 113 and "analyze" that event, to determine if an "alert" should be generated. Depending upon a predetermined set of rules, either a single alert or a specific combination of alerts may generate an "alert-state" which is then passed to the user interface 117 to signal the system operator 119 that the particular subscriber ID for which an alert-state was generated is suspected of being used fraudulently. It should be noted that a single CCF record may generate multiple events, each of which is individually analyzed by the alert manager 115. Accordingly, the alert manager procedure, described below, may be performed multiple times for a single CCF record. More specifically, the alert manager procedure will be performed once for each event generated by the event manager 113.

Referring to FIG. 4A, the alert manager procedure initiates at step S476 where the alert manager receives an event context data structure for the particular event to be analyzed by one of the eleven different analysis services. The eleven different analysis services, represented by flowcharts in FIGS. 4B-4K and FIG. 4M, will be described in detail with reference to the appropriate figures.

Next, the alert manager determines the type of event to be analyzed by examining the event type field in the event context data structure received from the event manager. At step S478, if the event type is a suspect termination event, the alert manager procedure flows to step S480 where the Analyze Suspect Termination Event service analyzes the incoming event.

Figure 4B:
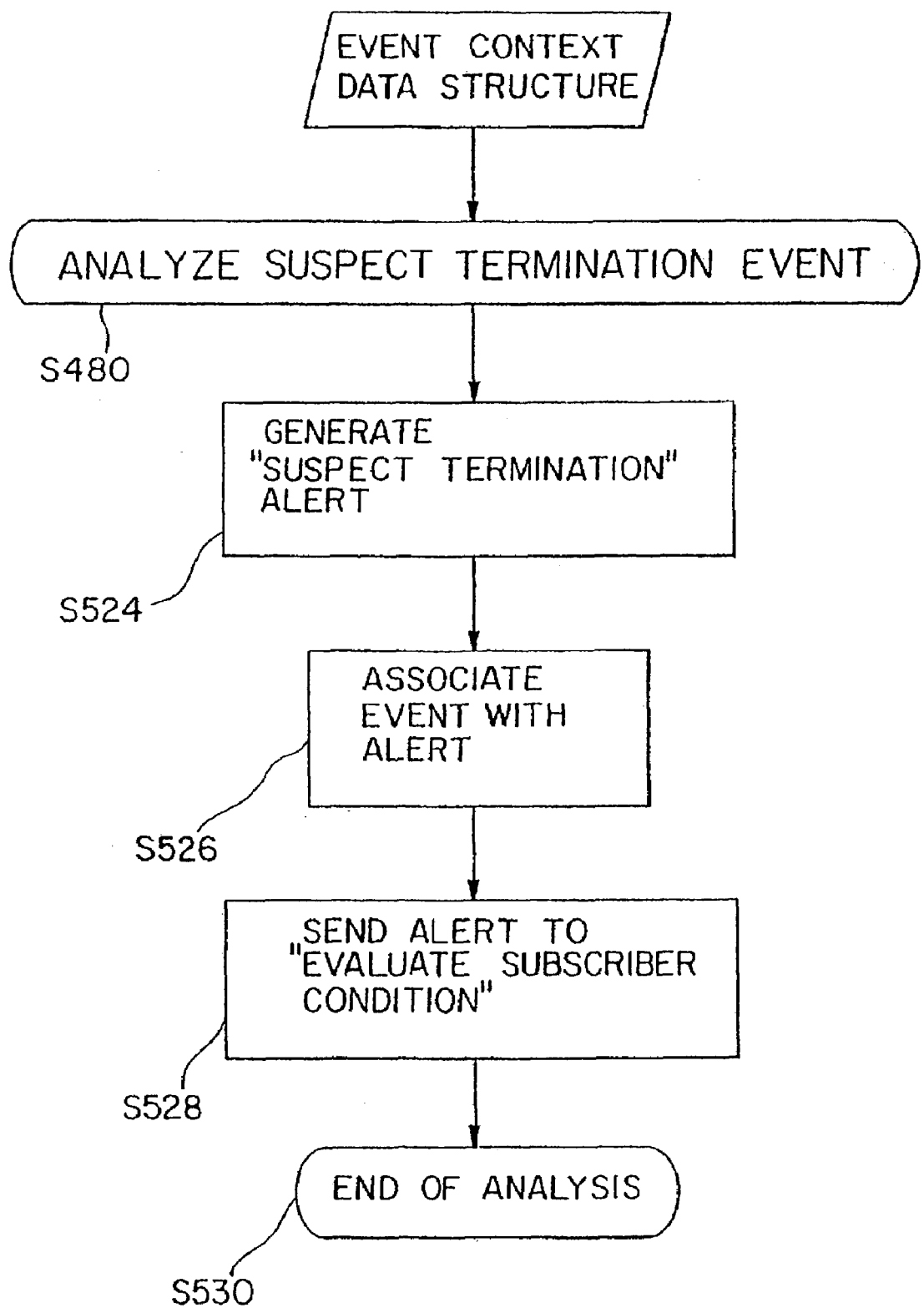

Referring to FIG. 4B, the Analyze Suspect Termination Event service S480 generates a new suspect termination alert for every incoming suspect termination event. Upon receiving the event context data structure as an argument, the service generates a "suspect termination" alert at step S524 by adding a new entry to the alerts database for this particular subscriber ID. An entry into the alerts database includes the following information: (1) subscriber ID (particular subscriber ID for which this alert was generated); (2) alert type ("suspect termination" in this case); (3); alert date (date that alert was generated); and (4) call date (date indicated in orig date field 229 for the CCF record which generated the event being analyzed).

Next, at step S526, the service "associates" the event under consideration with the newly generated alert. This is performed by adding a new entry to a database—the alert-events database—containing all previously generated alerts, and the associated events which triggered the specific alert, for each particular subscriber. The purpose of the alert-events database is to provide a system operator investigating a particular alert with a list of the specific event, or events, responsible for triggering the alert under investigation.

Next, at step S528, the service sends the alert generated at step S524 to the Evaluate Subscriber Condition service S522, described below.

Lastly, the service flows to step S530 which marks the completion of the analysis for the present event and the alert manager procedure flows to step S520 (see FIG. 4A) to determine whether the subscriber's condition needs to be evaluated, as discussed below.

Referring to FIG. 4A, if the event type did not match at step S478, the alert manager procedure flows to step S482. At this step, if the event type is a suspect country code event, the procedure flows to step S484 where the Analyze Suspect Country Code Event service analyzes the incoming event.

Referring to FIG. 4C, the Analyze Suspect Country Code Event service S484 is responsible for collecting country code event information and determining whether a newly received event should trigger an alert.

Upon receiving the event context data structure as an argument, the service, at step S532, counts the number of events presently recorded in the events database which meet each of the following three conditions: (1) the database event has the same subscriber ID as the present event; (2) the database event type is "country event"; and (3) the date of the database event is the same as the call date.

At step S534, if the number of database events counted at step S532 is less than a predetermined limit set by the telecommunications service provider, the service flows to step S542 which marks completion of the analysis. If, however, the number of database events counted exceeds the predetermined limit, the service flows to step S536 where a suspect country code alert is generated by adding a new entry with alert type "suspect country code" to the alerts database for this particular subscriber ID. The function of step S534 is to prevent generating an alert every time a suspect country code is called. The theory is that not every user who calls the suspect country a few times is a fraudulent user.

Next, at step S538, the service associates the event under consideration with the newly generated alert by adding a new entry to the alert-events database for this particular subscriber ID.

Next, at step S540, the service sends the alert generated at step S536 to the Evaluate Subscriber Condition service S522, described below.

Lastly, the service flows to step S542 which marks the completion of the analysis for the present event and the alert manager procedure flows to step S520 (see FIG. 4A) to determine whether the subscriber's condition needs to be evaluated, as discussed below.

Referring to FIG. 4A, if the event type did not match at step S482, the alert manager procedure flows to step S486. At this step, if the event type is a credit limit event, the procedure flows to step S488 where the Analyze Credit Limit Event service analyzes the incoming event.

Figure 4D:
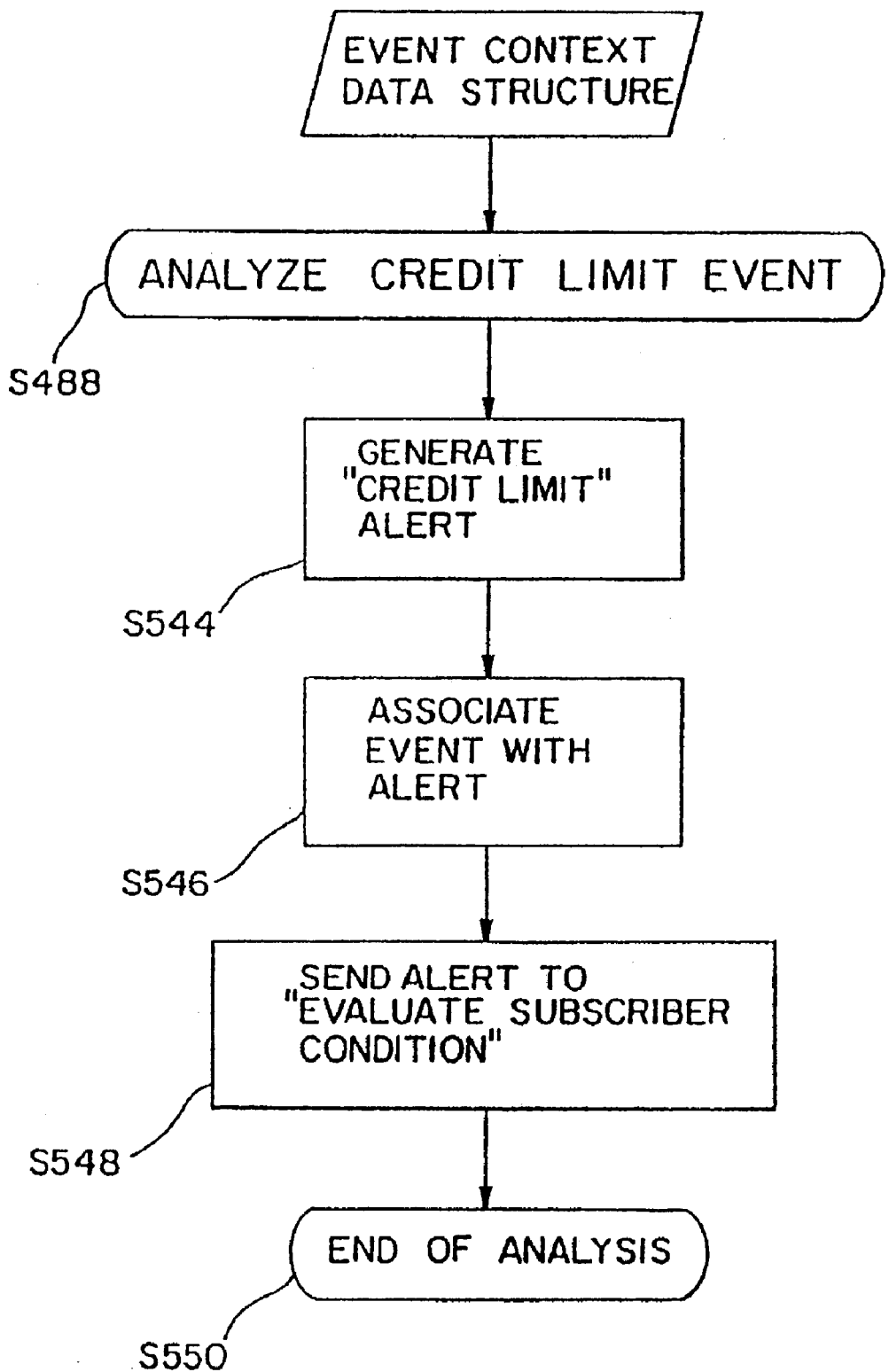

Referring to FIG. 4D, the Analyze Credit Limit Event service S488 generates a new credit limit alert for every incoming credit limit event. Upon receiving the event context data structure as an argument, the service generates a "credit limit" alert at step S544 by adding a new entry with alert type "credit limit" to the alerts database for this particular subscriber ID.

Next, at step S546, the service associates the event under consideration with the newly generated alert by adding a new entry to the alert-events database.

Next, at step S548, the service sends the alert generated at step S544 to the Evaluate Subscriber Condition service S522, described below.

Lastly, the service flows to step S550 which marks the completion of the analysis for the present event and the alert manager procedure flows to step S520 (see FIG. 4A) to determine whether the subscriber's condition needs to be evaluated, as discussed below.

Referring to FIG. 4A, if the event type did not match at step S486, the alert manager procedure flows to step S490. At this step, if the event type is an overlap call event, the procedure flows to step S492 where the Analyze Call Overlap Event service analyzes the incoming event.

Figure 4E:
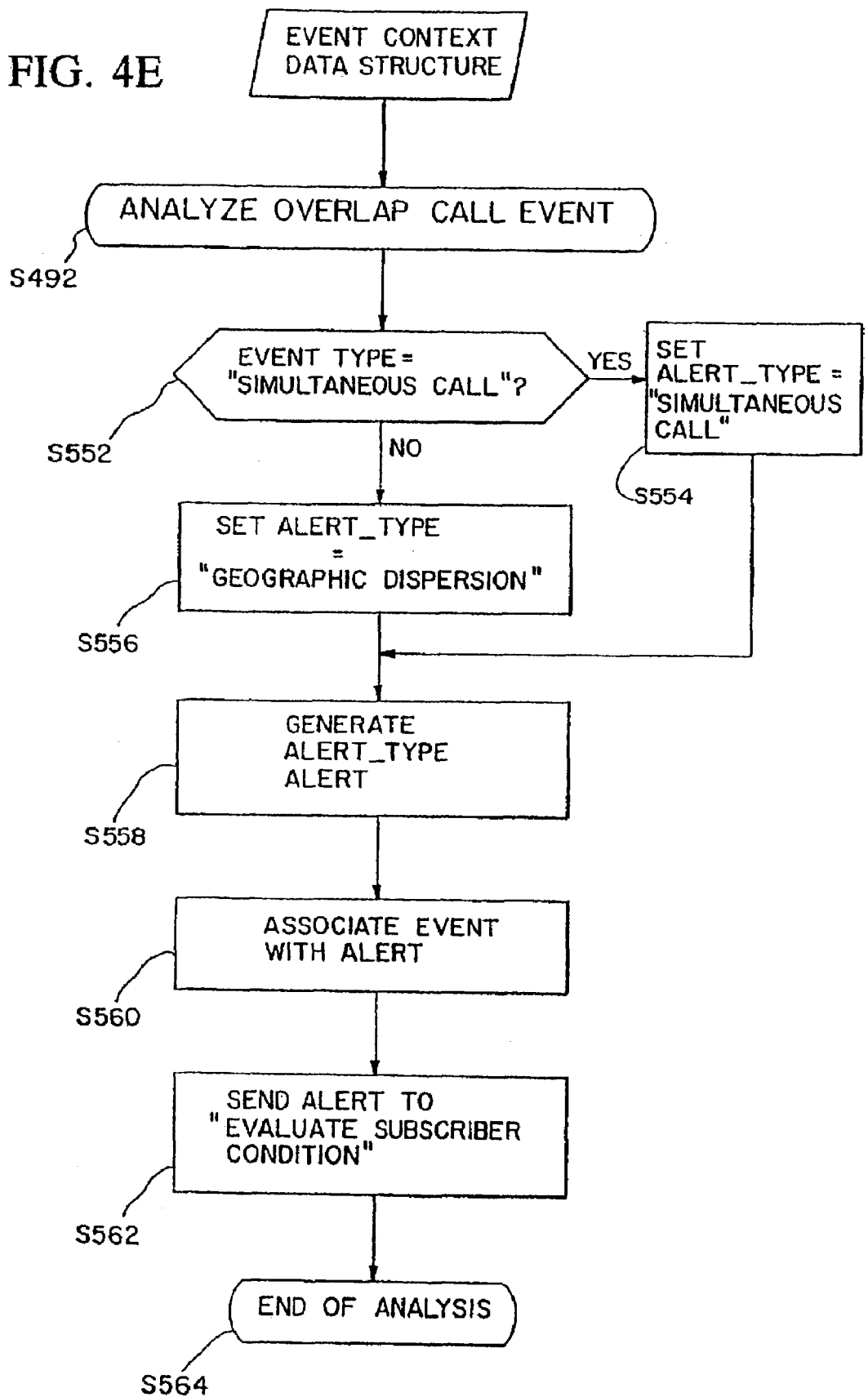

Referring to FIG. 4E, the Analyze Call Overlap Event service S492 generates a new overlap call alert for each incoming overlap call event. The alert type will be either "simultaneous call" or "geographic dispersion" depending upon the subtype of the incoming event.

Upon receiving the event context data structure as an argument, the service, at step S552, determines the subtype of the incoming event. If the event subtype is "simultaneous call" the service flows to step S554 where a variable, alert_type, is set to "simultaneous call"; otherwise alert_type is set to "geographic dispersion."

In either case, after the alert type has been determined, the service, at step S558, generates an alert by adding a new entry with an alert type equal to the value held in the alert_type variable to the alerts database for this particular subscriber ID.

Next, at step S560, the service associates the event under consideration with the newly generated alert by adding a new entry to the alert-events database.

Next, at step S562, the service sends the alert generated at step S558 to the Evaluate Subscriber Condition service S522, described below.

Lastly, the service flows to step S564 which marks the completion of the analysis for the present event and the alert manager procedure flows to step S520 (see FIG. 4A) to determine whether the subscriber's condition needs to be evaluated, as discussed below.

Referring to FIG. 4A, if the event type did not match at step S490, the alert manager procedure flows to step S494. At this step, if the event type is a duration event, the procedure flows to step S496 where the Analyze Duration Event service analyzes the incoming event.

Figures 1, 4F:
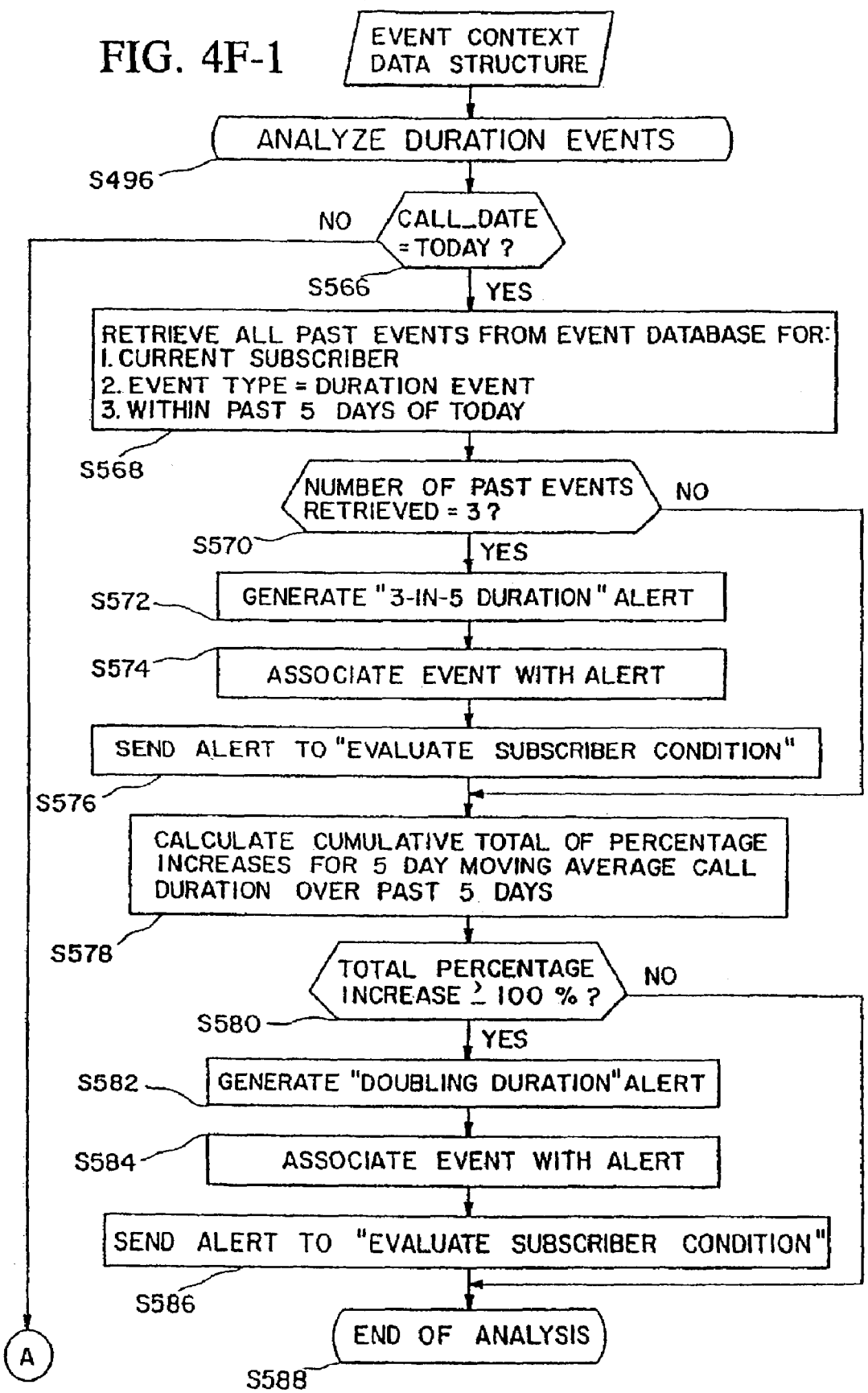
Figures 2, 4F:
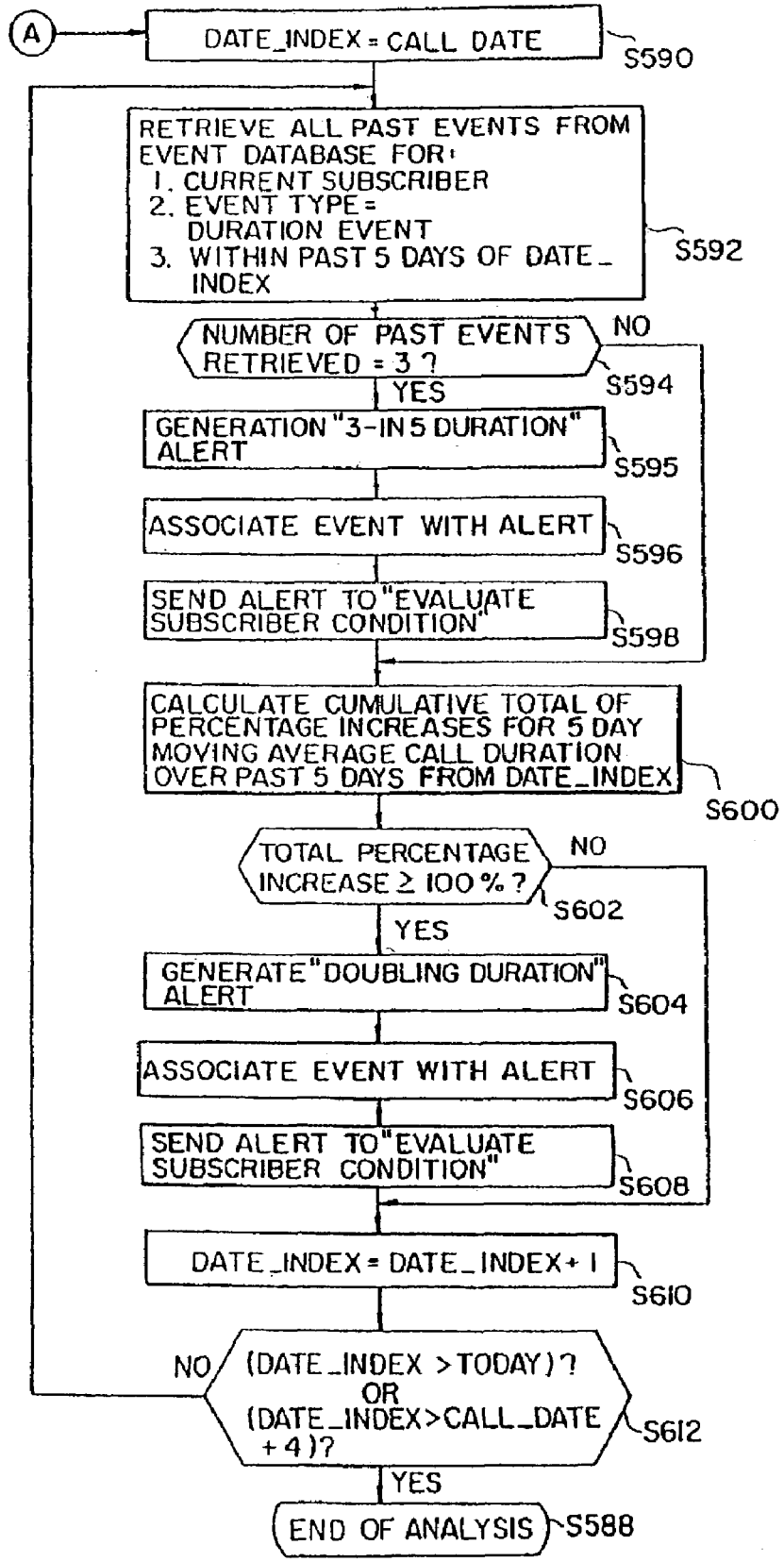

Referring to FIG. 4F, the Analyze Duration Event service S496 is responsible for collecting incoming duration event information and determining whether a newly received event should trigger an alert.

Upon receiving the event context data structure as an argument, the service, at step S566, determines whether the call date is the same as today's date—that is, the date on which the CCF record is being processed.

If the call date is today, no historical analysis needs to be performed to determine whether the newly received event affects the subscriber's condition on days other than the call date; accordingly, the service flows to step S568. Otherwise, the service flows to step S590.

At step S568, the service retrieves all past events from the events database that satisfy each of the following three conditions: (1) the retrieved event has the same subscriber ID as the event being analyzed; (2) the retrieved event is a duration-type event; and (3) the retrieved event has a call date within five days of the call date of the event being analyzed.

At step S570, the service tests whether the number of events retrieved at step S568 is equal to three. If the number of retrieved events is not equal to three, no alert is generated and the service flows to step S578.

If, however, the number of retrieved events is equal to three, the service flows to step S572 where an alert is generated by adding a new entry, with alert type "3 in 5 Duration," to the alerts database for this particular subscriber ID. A "3 in 5 Duration" alert indicates a suspect increase in call duration because exactly three duration-type events have occurred for this particular subscriber ID within the last five days. Although one embodiment of the present invention utilizes the particular values three for the number of events, and five for the number of days, other values that prove useful may be used for this step.

At step S574 the service associates the event under consideration with the newly generated alert by adding a new entry to the alert-events database.

Next, at step S576, the service sends the alert generated at step S572 to the Evaluate Subscriber Condition service S522, described below.

Next, at step S578, the service accumulates the percentage increases of the five-day call duration moving averages to obtain a total increase in the average over the past five days for each event retrieved at step S568.

Next, at step S580, if the total percentage increase as calculated at step S578 is greater than or equal to 100%—indicating a suspect increase in call duration because the five-day moving average call duration has doubled in the last five days—the service flows to step S582 and an alert is generated by adding a new entry, with alert type "Doubling Duration," to the alerts database for this particular subscriber ID. If the total percentage increase is less than 100', no alert is generated and the service flows to step S588 which marks its completion.

Assuming an alert was generated, the service, at step S584, associates the present event with the newly generated alert by adding a new entry to the alert-events database.

Then, at step S586, the service sends the alert generated at step S572 to the Evaluate Subscriber Condition service S522, described below.

Lastly, the service flows to step S588 which marks the completion of the analysis for the present event and the alert manager procedure flows to step S520 (see FIG. 4A) to determine whether the subscriber's condition needs to be evaluated, as discussed below.

If, at step S566, the service determined that the call date of the event being analyzed was before today's date, a historical analysis needs to be performed to determine whether the newly received event affects the subscriber's condition on days other than the call date. More specifically, the event being analyzed needs to be applied to the next four days (or up to today's date) as well as the call date to determine if the event being considered has made any changes to the alert status and subscriber condition for those days. Accordingly, the service flows from step S566 to step S590, where a place-holding variable, date_index, is initially set to the call date of the event being analyzed.

As illustrated in FIG. 4F, steps S592 through S608 are identical to steps S568 through S586, described above in detail, so that no further discussion of these steps is necessary. The service performs steps S592 through S608 once for each different value of date_index. After the date_index variable is iteratively incremented by one at step S610, steps S592 through S608 are repeated up to a maximum of five iterations as long as the current value of date_index is on or before today's date, as determined at step S612. It should be noted that either or both a "3 in 5 Duration" alert or a "Doubling Duration" alert may be generated for each separate value of date_index.

Once the date_index loop is complete, the service flows to step S588 which marks the completion of the analysis for the present event and the alert manager procedure flows to step S520 (see FIG. 4A) to determine whether the subscriber's condition needs to be evaluated, as discussed below.

Referring to FIG. 4A, if the event type did not match at step S494, the alert manager procedure flows to step S498. At this step, if the event type is an international duration event, the procedure flows to step S500 where the Analyze International Duration Event service analyzes the incoming event.

Figures 1, 4G:
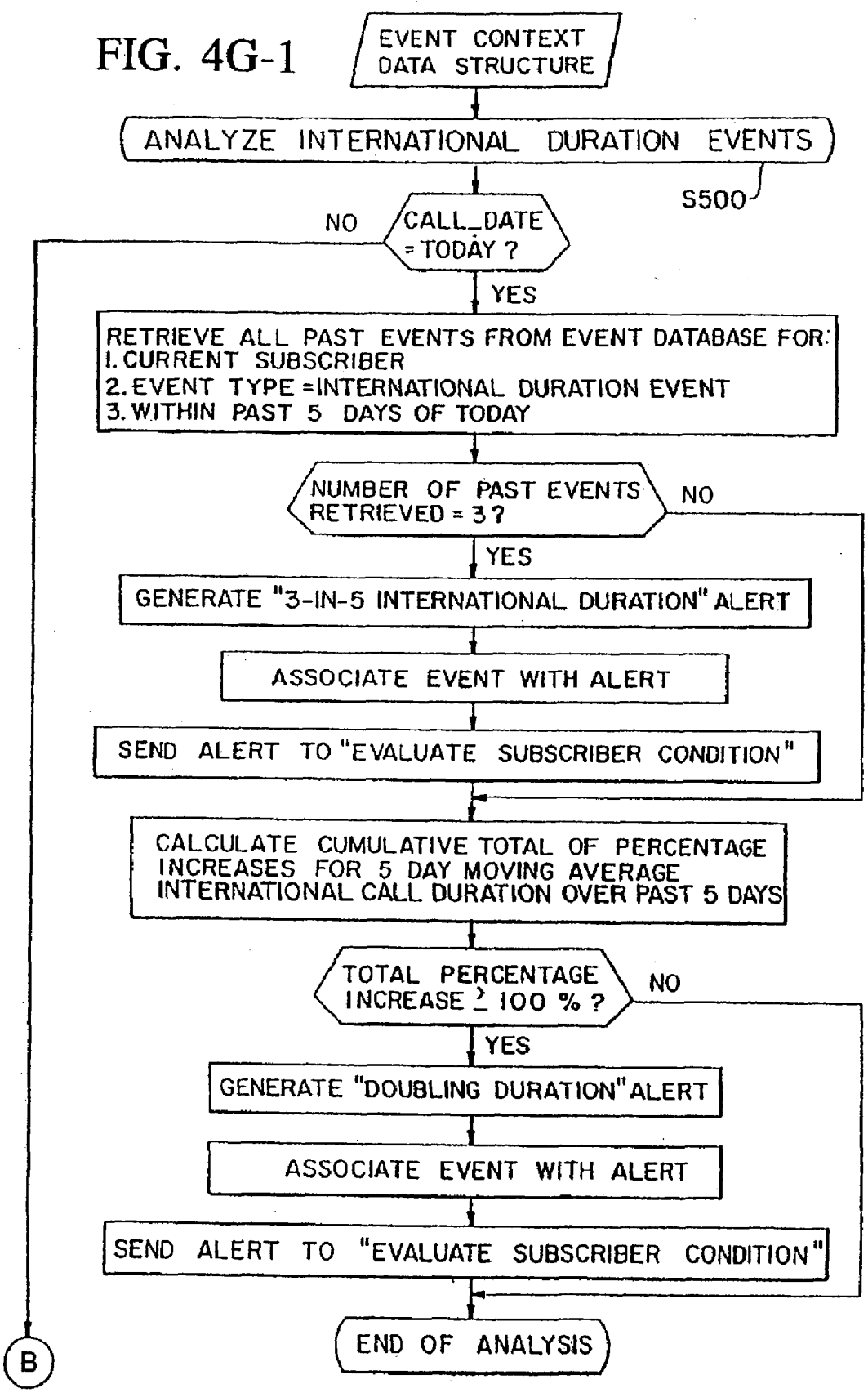
Figures 2, 4G:
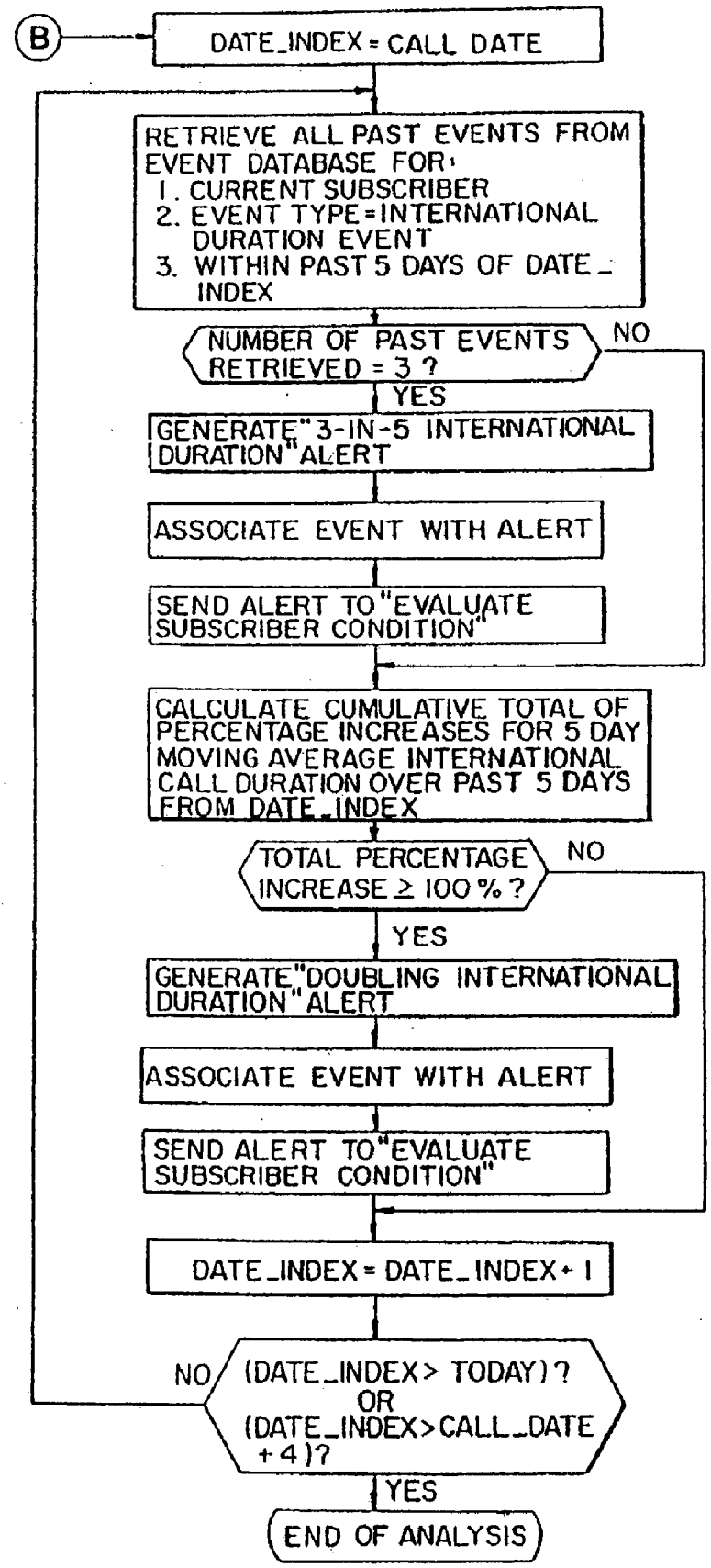

The Analyze International Duration Event service S500 is responsible for collecting incoming international duration event information and determining whether a newly received event should trigger an alert. Because this service, illustrated in FIG. 4G, is nearly identical to the Analyze Duration Event Service S496, discussed above in detail, except the event database is searched for international duration events and the possible alert types are "3 in 5 International Duration" and "Doubling International Duration," no further discussion of this service is felt to be necessary.

Referring to FIG. 4A, if the event type did not match at step S498, the alert manager procedure flows to step S502. At this step, if the event type is a threshold event, the procedure flows to step S504 where the Analyze Threshold Event service analyzes the incoming event.

Figures 1, 4H:
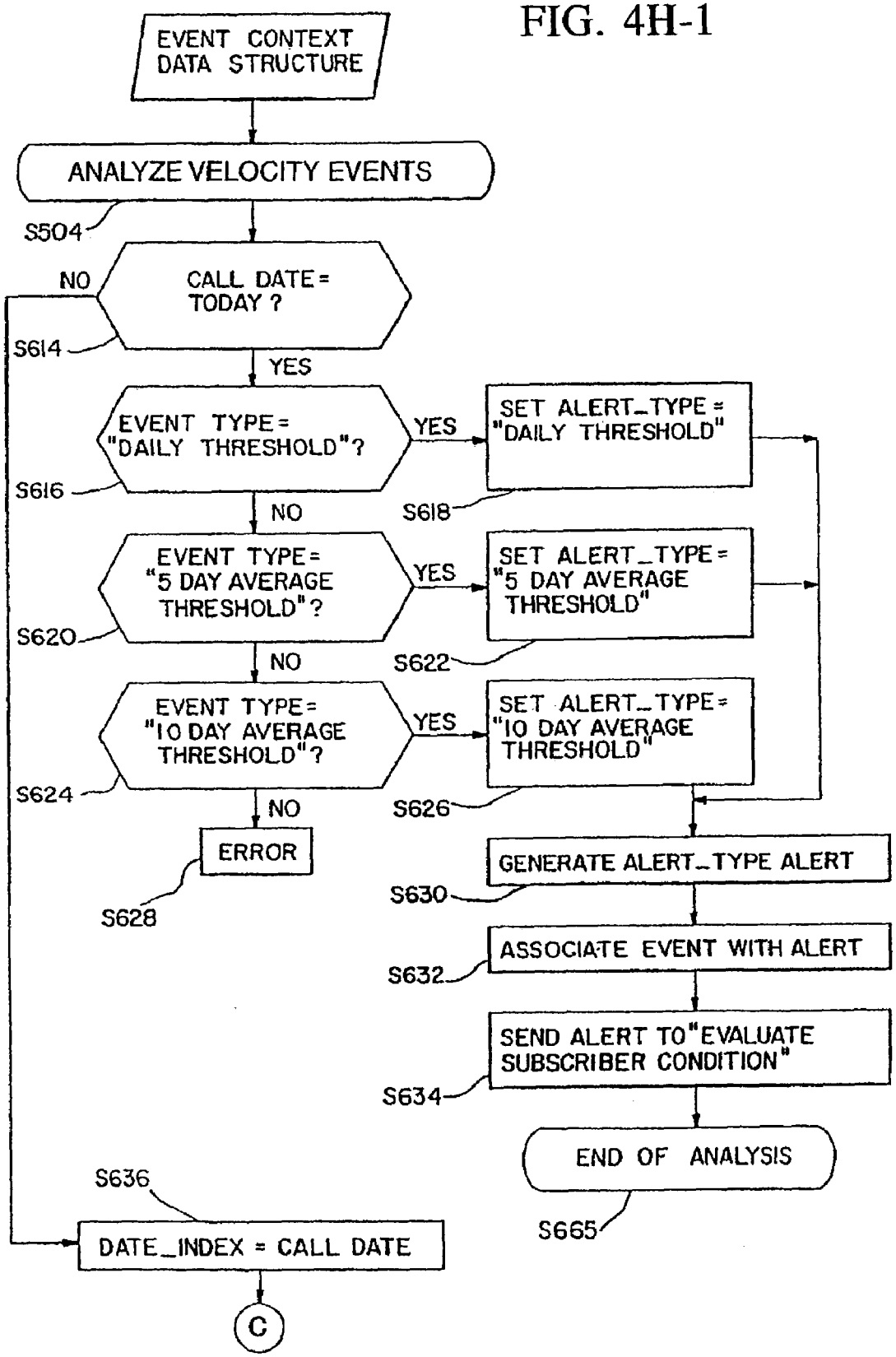
Figures 2, 4H:
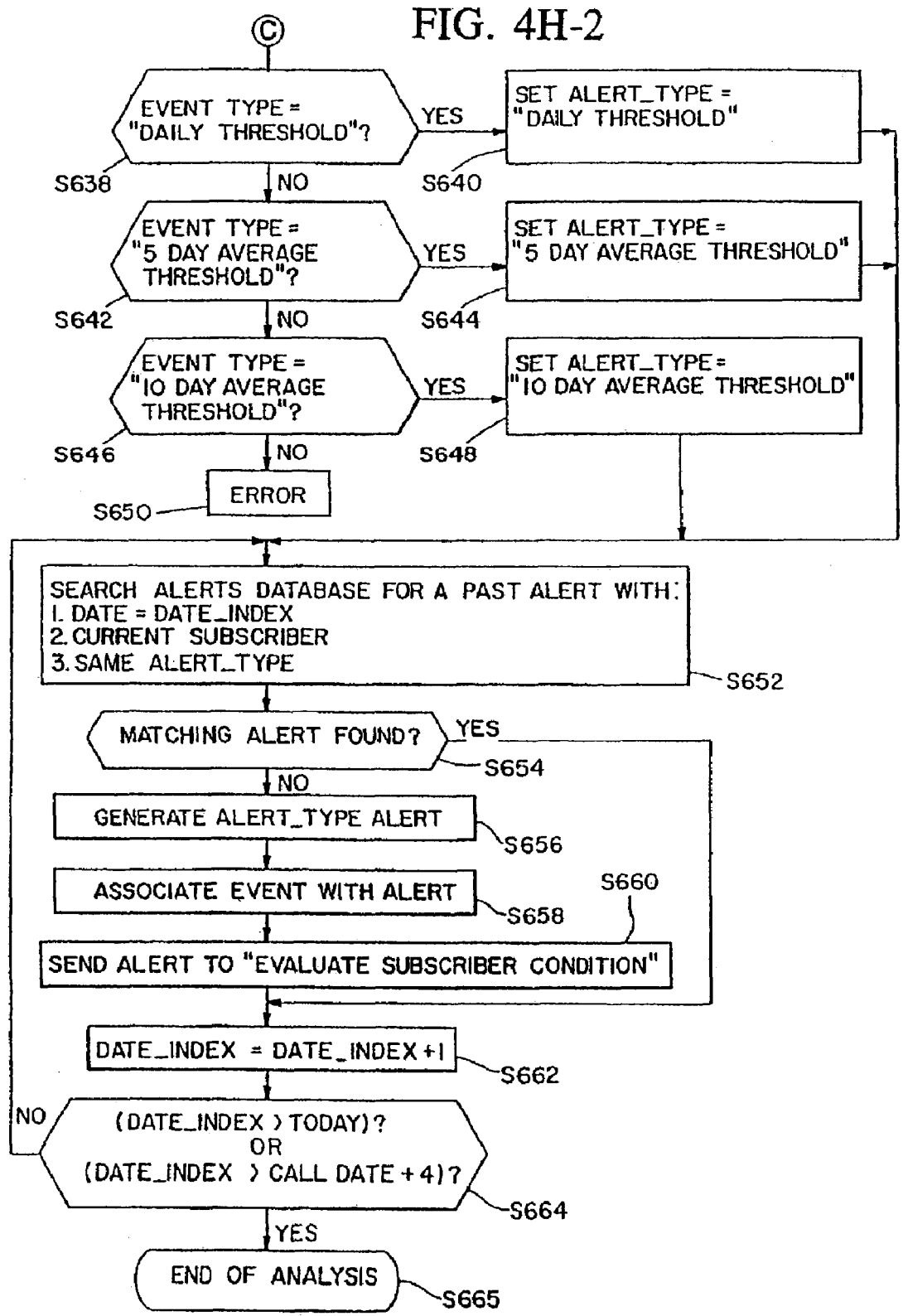

Referring to FIG. 4H, the Analyze Threshold Event service S504 generates a threshold alert for each incoming threshold event. The type of alert generated corresponds to the type of event being analyzed (daily, five-day moving average, or ten-day moving average).

Upon receiving the event context data structure as an argument, the service, at step S614, determines whether the call date is the same as today's date—that is, the date on which the CCF record is being processed.

If the call date is today no historical analysis needs to be performed to determine whether the newly received event affects the subscriber's condition on days other than the call date; accordingly, the service flows to step S616. Otherwise, the service flows to step S636.

At steps S616 through S624, the service determines the event type of the event being analyzed and, as appropriate sets a temporary value-holder variable, alert_type, in one of steps S618, S622, or S626, to "Daily Threshold," "5 Day Average Threshold," or "10 Day Average Threshold," respectively.

If the event type was not recognized, an inconsistency in the system has been encountered, and the service flows to step S628 where an error is logged to the error handling server.

Assuming the event type was recognized, and the alert_type variable has been set as appropriate, the service flows to step S630, where an alert is generated by adding a new entry, with an alert type equal to the value held in the alert_type variable, to the alerts database for this particular subscriber ID.

The service flows next to step S632 where the event being analyzed is associated with the newly generated alert by adding a new entry to the alert-events database.

Then, at step S634, the service sends the alert generated at step S630 to the Evaluate Subscriber Condition service S522, described below.

Lastly, the service flows to step S665 which marks the completion of the analysis for the present event and the alert manager procedure flows to step S520 (see FIG. 4A) to determine whether the subscriber's condition needs to be evaluated, as discussed below.

If, at step S614, the service determined that the call date of the event being analyzed was before today's date, a historical analysis needs to be performed to determine whether the newly received event affects the subscriber's condition on days other than the call date. More specifically, the event being analyzed needs to be applied to the next four days (or up to today's date) as well as the call date to determine if the event being considered has made any changes to the alert status and subscriber condition for those days. Accordingly, the service flows from step S614 to step S636, where a place-holding variable, date_index, is initially set to the call date of the event being analyzed.

As illustrated in FIG. 4H, steps S638 through S650 are identical to steps S616 through S628, described above in detail, so that no further discussion of these steps is necessary.

After the service has determined the event type, and set the alert_type variable as appropriate at steps S638 through S648, the service flows to step S652 where the service searches the alerts database for a past alert which satisfies each of the following three conditions: (1) the retrieved alert call date is the same as the date held by date_index; (2) the retrieved alert has the same subscriber ID as the event being analyzed; and (3) the retrieved alert type is the same as the value of the alert_type variable, as determined at steps S638 through S648.

If a matching alert is found during the search at step S652, it indicates that the appropriate alert has already been generated for this particular subscriber ID and there is no need to generate a duplicate alert. Accordingly, the service flows to step S662 where the date_index variable is incremented by one.

If, however, no matching alerts are found during the alerts database search at step S652, the service flows to step S656 where an alert is generated by adding a new entry with an alert type equal to the value held in the alert_type variable to the alerts database for this particular subscriber ID.

The service flows next to step S658 where the event being analyzed is associated with the newly generated alert by adding a new entry to the alert-events database.

Then, at step S650, the service sends the alert generated at step S630 to the Evaluate Subscriber Condition service S522, described below.

The service performs steps S652 through S662 once for each different value of date_index. After the date_index variable is iteratively incremented by one at step S662, steps S652 through S662 are repeated up to a maximum of five iterations as long as the current value of date_index is on or before today's date, as determined at step S664. It should be noted that a separate threshold alert of the type held in the alert_type variable may be generated for each separate value of date_index.

Once the date_index loop is complete, the service flows to step S665 which marks the completion of the analysis for the present event and the alert manager procedure flows to step S520 (see FIG. 4A) to determine whether the subscriber's condition needs to be evaluated, as discussed below.

Referring to FIG. 4A, if the event type did not match at step S502, the alert manager procedure flows to step S506. At this step, if the event type is an international threshold event, the procedure flows to step S508 where the Analyze International Event service analyzes the incoming event.

Figures 1, 4I:
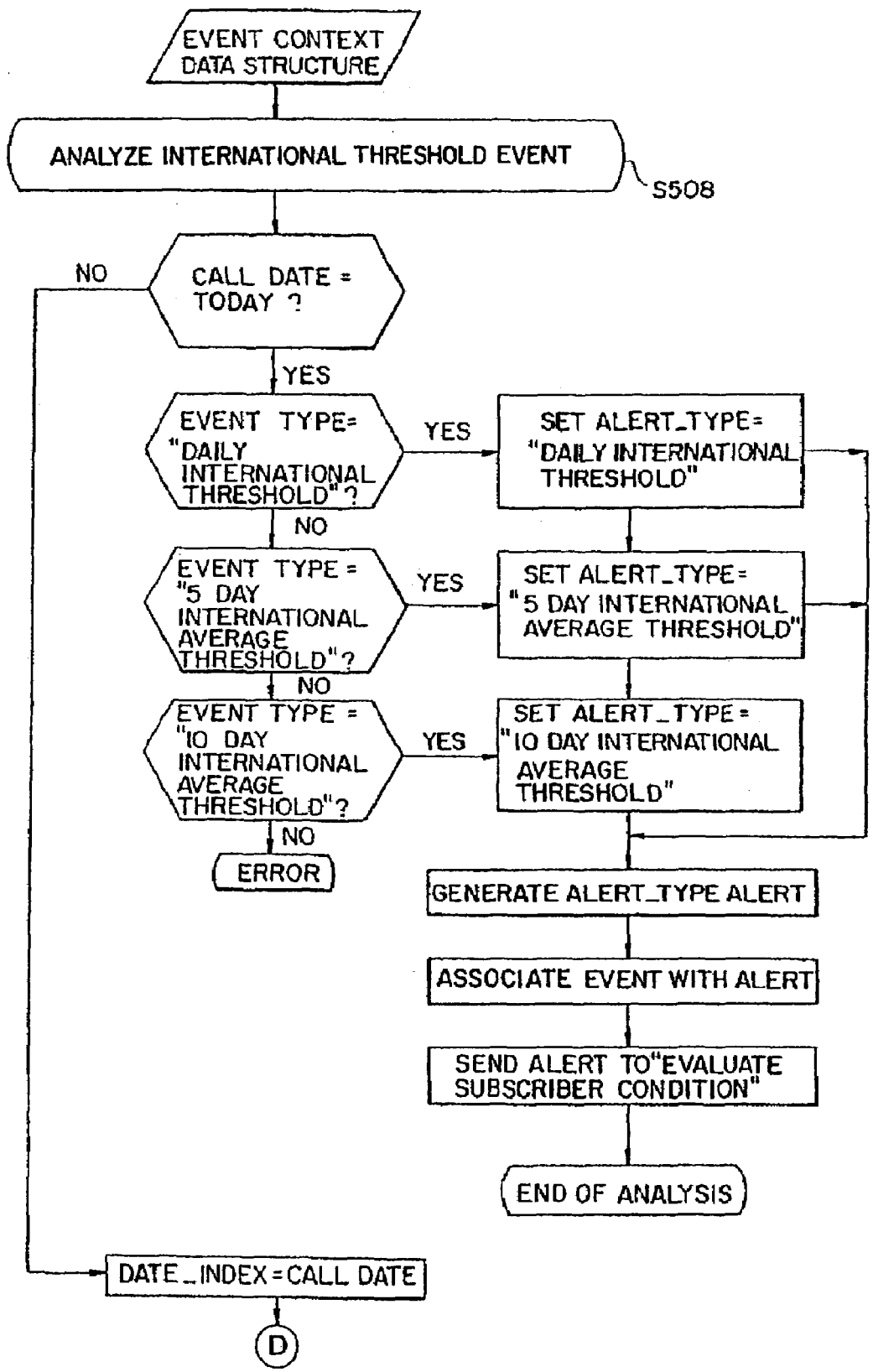
Figures 2, 4I:
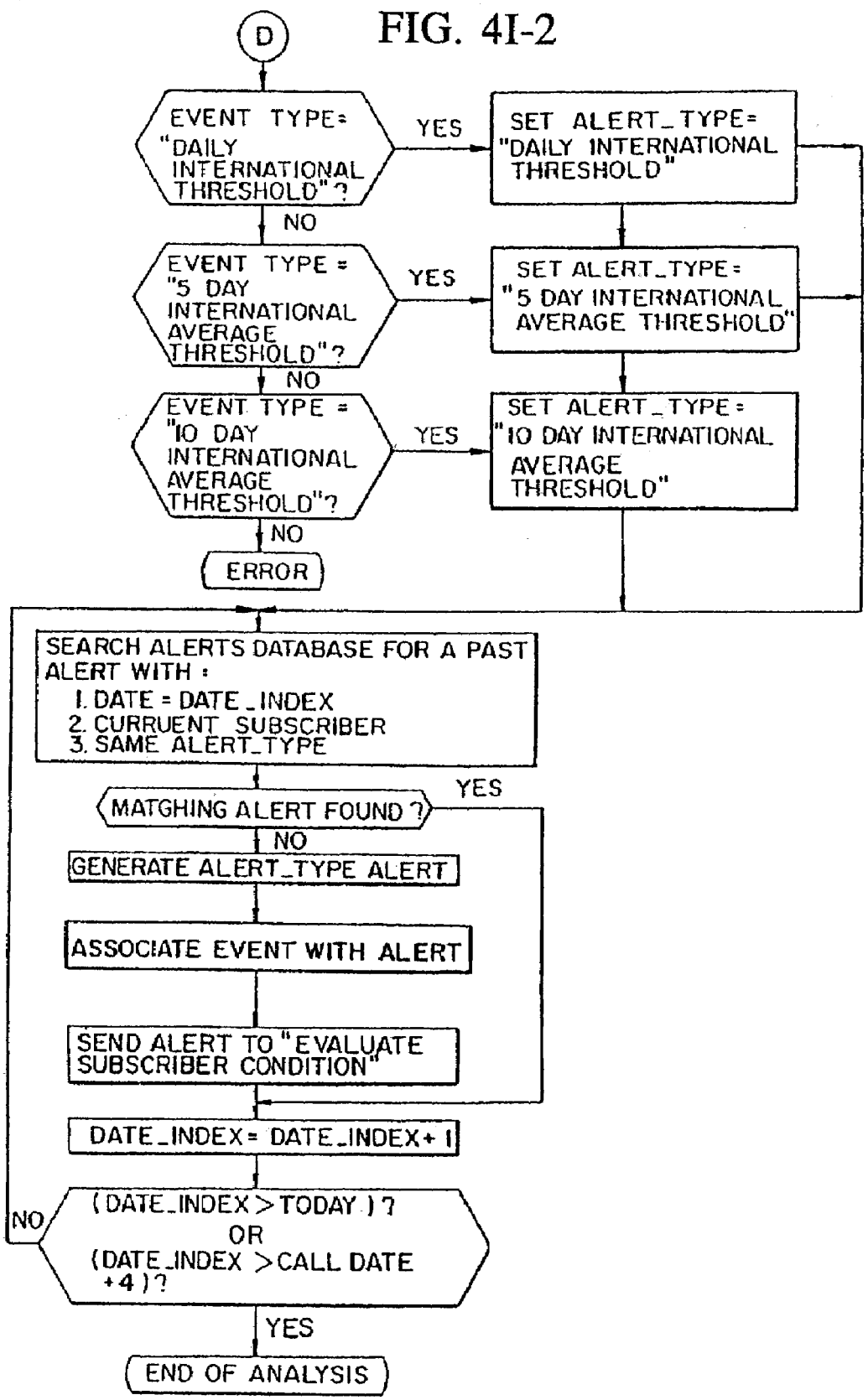

The Analyze International Threshold Event service S508 generates a threshold event for each incoming international threshold event. The type of alert generated corresponds to the type of event being analyzed (daily international, five-day international moving average, or ten-day international moving average). Because this service, illustrated in FIG. 4I, is nearly identical to the Analyze Threshold Event Service S504, discussed above in detail, except the event database is searched for international threshold events and the possible alert types are "Daily International Threshold," "5 Day International Average Threshold," and "10 Day International Average Threshold," no further discussion of this service is believed necessary.

Referring to FIG. 4A, if the event type did not match at step S506, the alert manager procedure service flows to step S510. At this step, if the event type is a velocity event, the procedure flows to step S512 where the Analyze Velocity Event service analyzes the incoming event.

Figures 1, 4J:
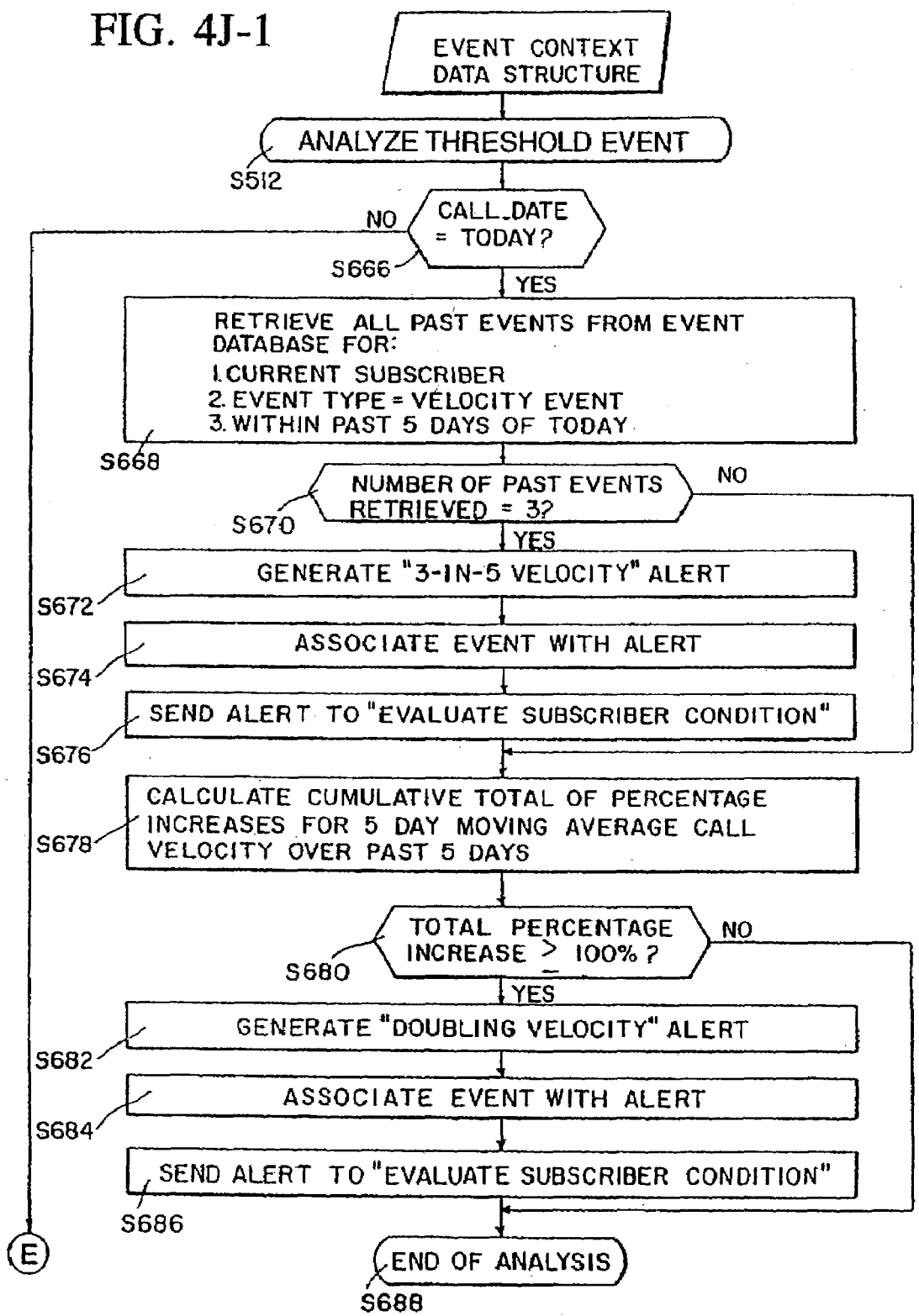
Figures 2, 4J:
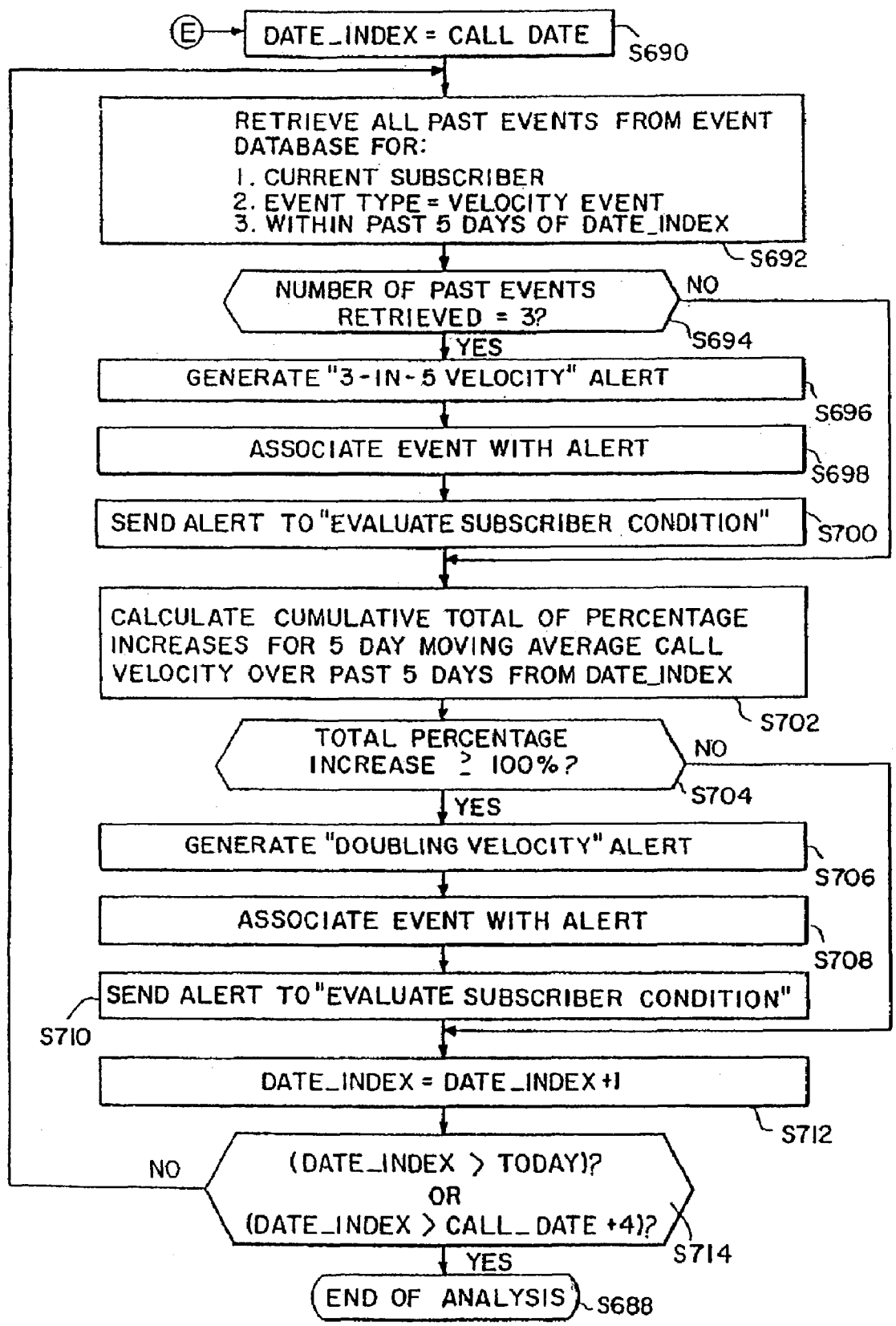

Referring to FIG. 4J, the Analyze Velocity Event service S512 is responsible for collecting incoming velocity event information and determining whether a newly received event should trigger an alert.

Upon receiving the event context data structure as an argument, the service, at step S666, determines whether the call date is the same as today's date—that is, the date on which the CCF record is being processed.

If the call date is today no historical analysis needs to be performed to determine whether the newly received event affects the subscriber's condition on days other than the call date; accordingly, the service flows to step S668. Otherwise, the service flows to step S690.

At step S668, the service retrieves all past events from the events database which satisfy each of the following three conditions: (1) the retrieved event has the same subscriber ID as the event being analyzed; (2) the retrieved event is a velocity-type event; and (3) the retrieved event has a call date within five days of the call date of the event being analyzed.

At step S670, the service tests whether the number of events retrieved at step S668 is equal to three. If the number of retrieved events is not equal to three, no alert is generated and the service flows to step S678.

If, however, the number of retrieved events is equal to three, the service flows to step S672 where an alert is generated by adding a new entry with alert type "3 in 5 Velocity" to the alerts database for this particular subscriber ID. A "3 in 5 Velocity" alert indicates a suspect increase in call velocity because exactly three velocity-type events have occurred for this particular subscriber ID within the last five days. Although one embodiment of the present invention utilizes the particular values three for the number of events, and five for the number of days, other values that prove useful may be used for this step.

At step S674 the service associates the event under consideration with the newly generated alert by adding a new entry to the alert-events database.

Next, at step S676, the service sends the alert generated at step S672 to the Evaluate Subscriber Condition service S522, described below.

Next, at step S678, the service accumulates the percentage increases of the five-day call velocity moving averages to obtain a total increase in the average over the past five days for each event retrieved at step S668.

Next, at step S680, if the total percentage increase as calculated at step S678 is greater than or equal to 100%—indicating a suspect increase in call velocity because the five-day moving average call velocity has doubled in the last five days—the service flows to step S682 where an alert is generated by adding a new entry, with alert type "Doubling Velocity," to the alerts database for this particular subscriber ID. If the total percentage increase is less than 100%, no alert is generated and the service flows to step S688 which marks its completion.

If an alert was generated, the service flows next to step S684 where the event being analyzed is associated with the newly generated alert by adding a new entry to the alert-events database.

Then, at step S686, the service sends the alert generated at step S672 to the Evaluate Subscriber Condition service S522, described below.

Lastly, the service flows to step S688 which marks the completion of the analysis for the present event and the alert manager procedure flows to step S520 (see FIG. 4A) to determine whether the subscriber's condition needs to be evaluated, as discussed below.

If, at step S666, the service determined that the call date of the event being analyzed was before today's date, a historical analysis needs to be performed to determine whether the newly received event affects the subscriber's condition on days other than the call date. More specifically, the event being analyzed needs to be applied to the next four days (or up to today's date) as well as the call date to determine if the event being considered has made any changes to the alert status and subscriber condition for those days. Accordingly, the service flows from step S666 to step S690, where a place-holding variable, date_index, is initially set to the call date of the event being analyzed.

As illustrated in FIG. 4F, steps S692 through S708 are identical to steps S668 through S686, described above in detail, so that no further discussion of these steps is thought necessary. The service performs steps S692 through S708 once for each different value of date_index. After the date_index variable is iteratively incremented by one at step S710, steps S692 through S708 are repeated up to a maximum of five iterations as long as the current value of date_index is on or before today's date, as determined at step S712. It should be noted that either or both a "3 in 5 Velocity" alert or a "Doubling Velocity" alert may be generated for each separate value of date_index.

Once the date_index loop is complete, the service flows to step S688 which marks the completion of the analysis for the present event and the alert manager procedure flows to step S520 (see FIG. 4A) to determine whether the subscriber's condition needs to be evaluated, as discussed below.

Referring to FIG. 4A, if the event type did not match at step S510, the alert manager procedure flows to step S514. At this step, if the event type is an international velocity event, the procedure flows to step S518 where the Analyze International Velocity Event service analyzes the incoming event.

Figures 1, 4K:
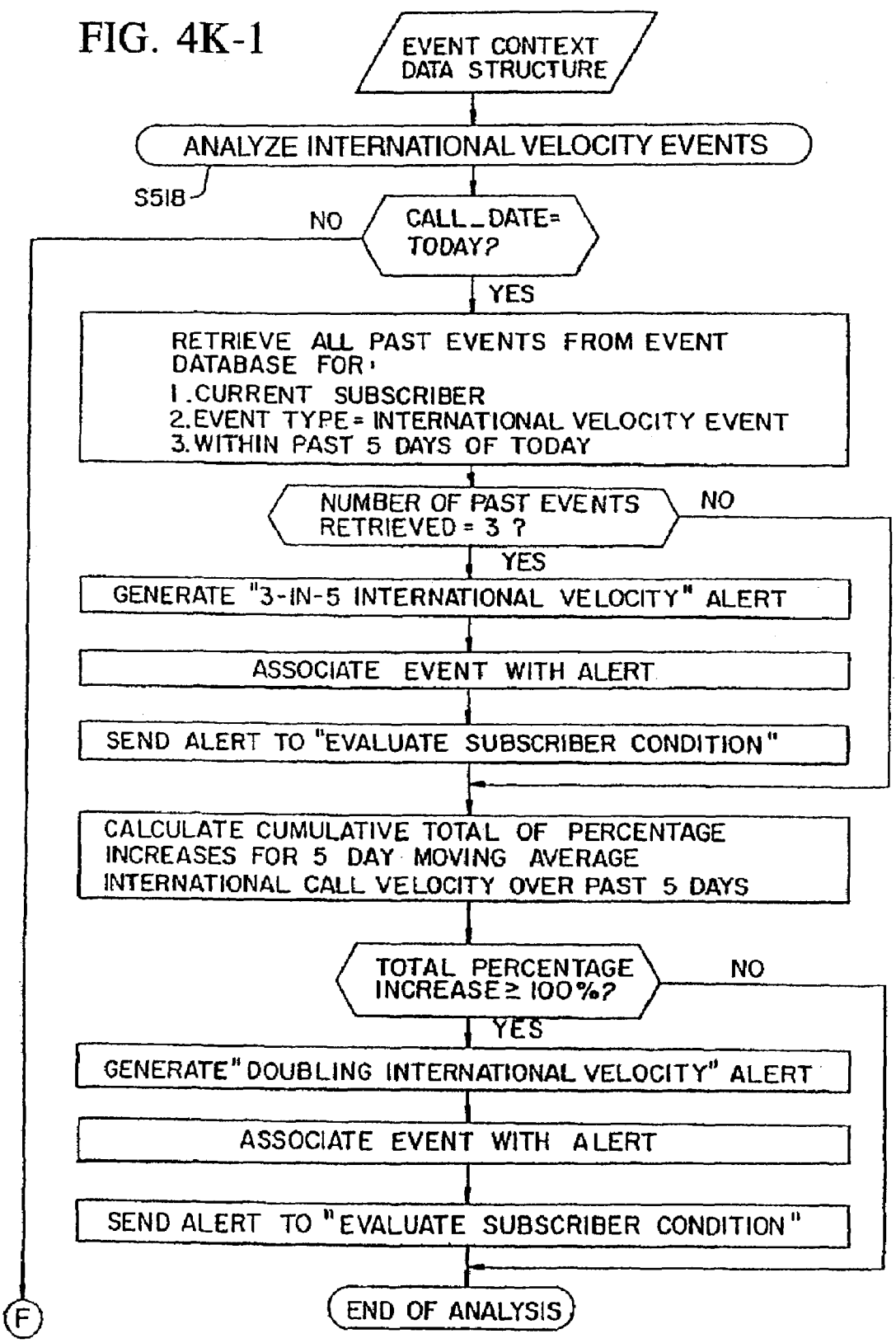
Figures 2, 4K:
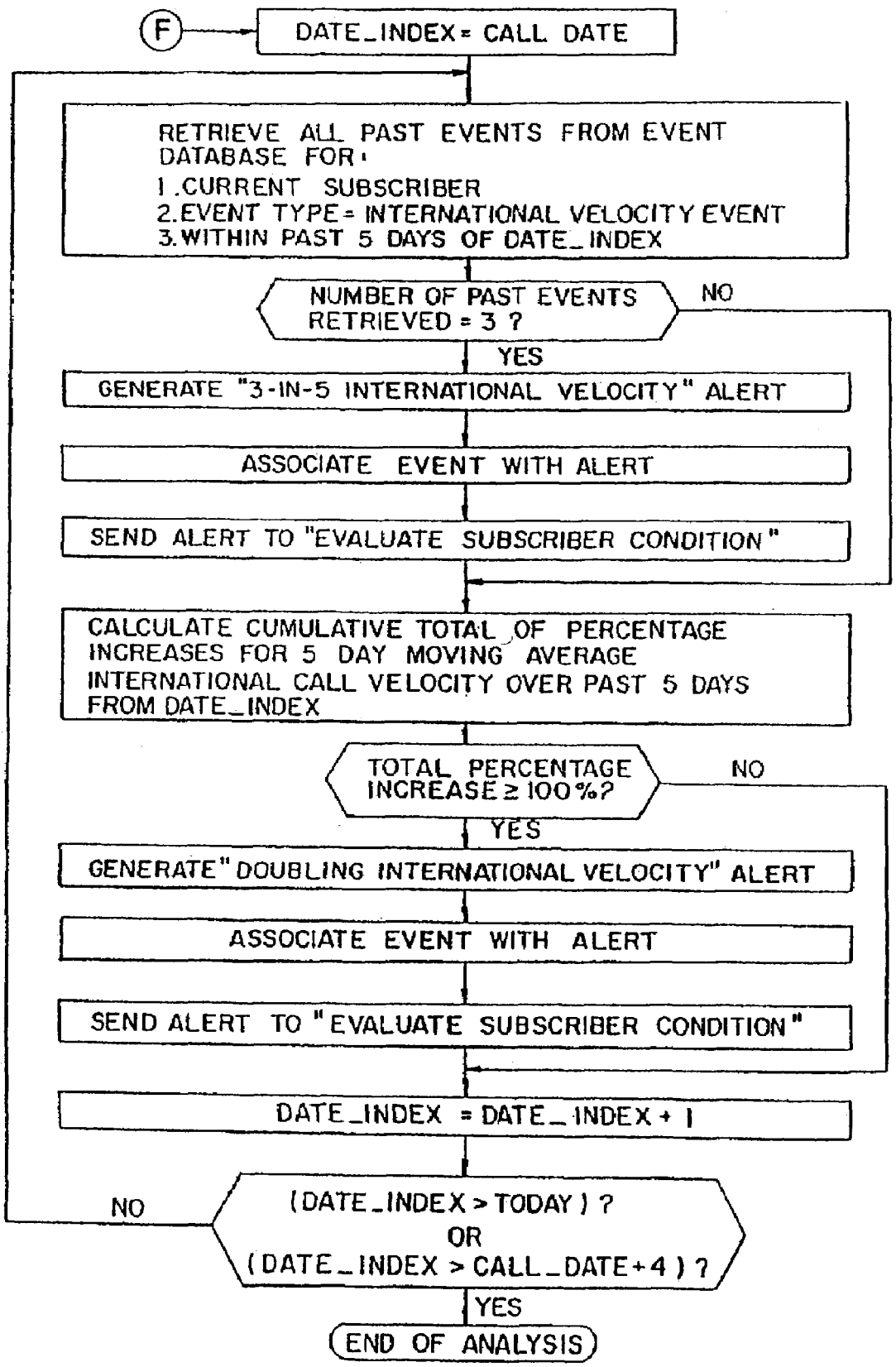

The Analyze International Velocity Event service S518 is responsible for collecting incoming international velocity event information and determining whether a newly received event should trigger an alert. Because this service, illustrated in FIG. 4K, is nearly identical to the Analyze Velocity Event Service S512, discussed above in detail, except the event database is searched for international velocity events and the possible alert types are "3 in 5 International Velocity" and "Doubling International Velocity," no further discussion of this service is believed to be necessary.

Referring to FIG. 4A, if the event type did not match at step S514, the alert manager procedure flows to step S515. At this step, if the event type is an credit risk event, the procedure flows to step S519 where the Analyze Credit Risk Event service analyzes the incoming event.

Referring to FIG. 4M, the Analyze Credit Risk Event service S900 generates a new credit limit alert for every incoming credit limit event. Upon receiving the event context data structure as an argument, the service generates a "credit risk" alert at step S902 by adding a new entry with alert type "credit risk" to the alerts database for this particular subscriber ID.

Next, at step S904, the service associates the event under consideration with the newly generated alert by adding a new entry to the alert-events database.

Next, at step S906, the service sends the alert generated at step S902 to the Evaluate Subscriber Condition service S522, described below.

Lastly, the service flows to step S908 which marks the completion of the analysis for the present event and the alert manager procedure flows to step S520 (see FIG. 4A) to determine whether the subscriber's condition needs to be evaluated, as discussed below.

Referring to FIG. 4A, if the event type did not match at step S515, the alert manager procedure flows to step S516. At this step, because the alert manager has failed to identify a recognizable event type in any of the steps S478 through S515, an inconsistency in the system has been encountered and an error is logged to the error handling server. If, however, the event type matched in one of the alert manager procedure steps S478 through S515, and an analysis was performed as described above, the alert manager procedure, at step S520, tests whether one or more new alerts were generated for the particular event being analyzed. If the present event did not generate any new alerts, the particular subscriber's condition remains unchanged and the procedure flows to step S524 which marks the completion of the alert manager procedure. Accordingly, the alert manager procedure returns to step S476 to await arrival of the next event context data structure.

Turning again to step S520, if at least one new alert was generated for the present event, the procedure flows to step S522 to evaluate the present subscriber's condition.

Figures 1, 4L:
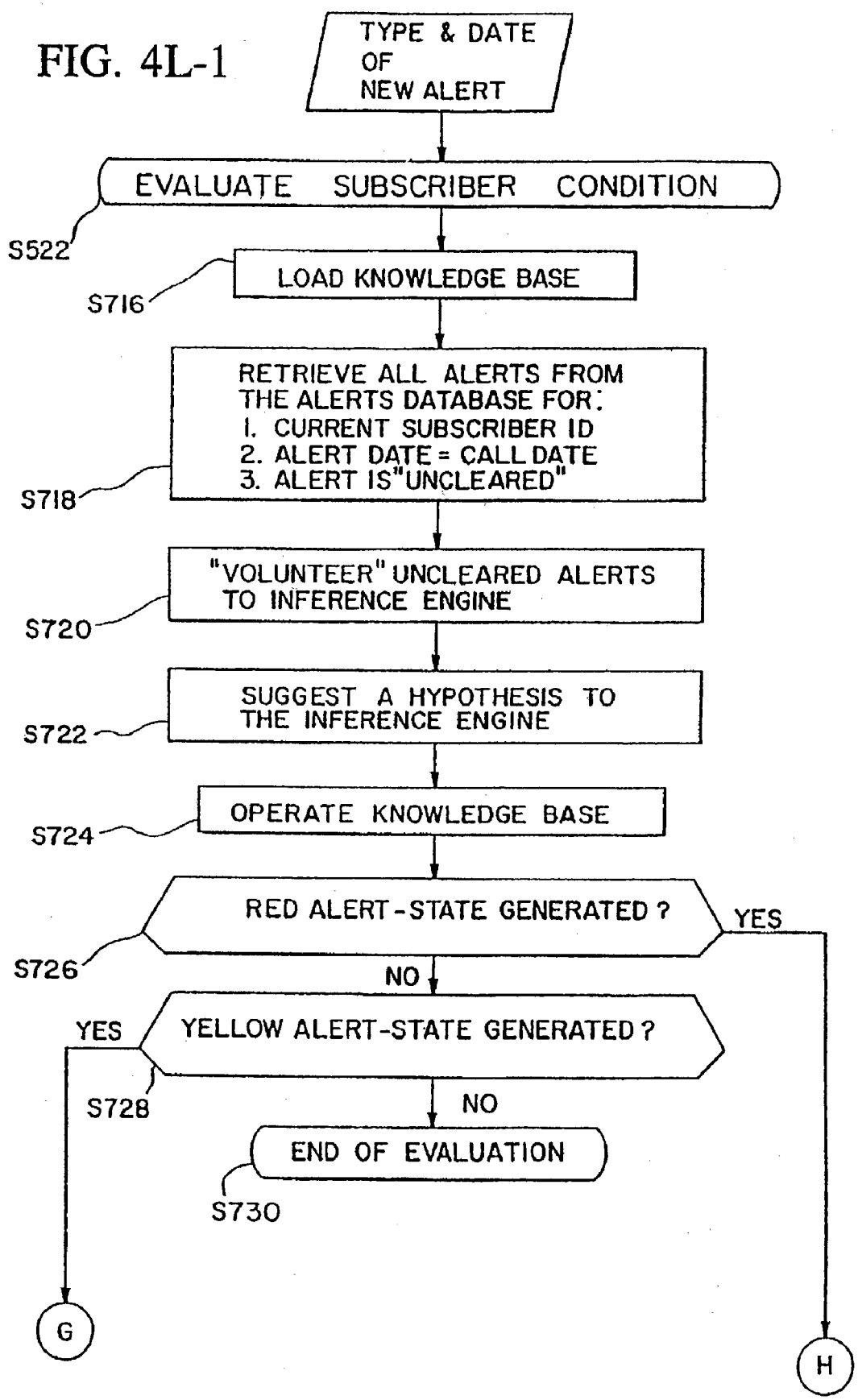
Figures 2, 4L:
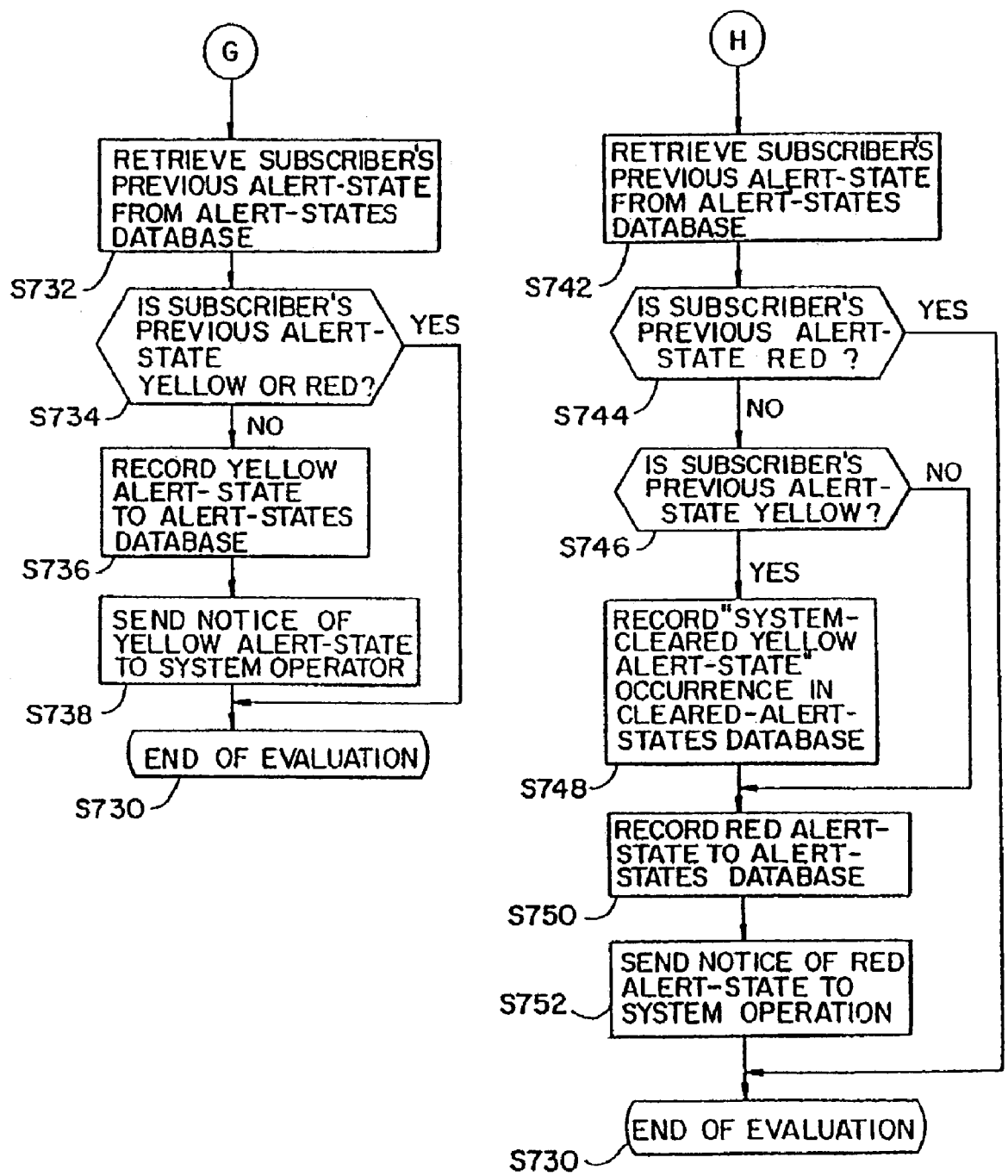

Referring to FIG. 4L, the Evaluate Subscriber Condition service S522 is responsible for collecting all past alert information from the alerts database related by date to the newly generated alert. Using both the past and present alert information, the service, using an "inference engine" evaluates a particular subscriber's condition based on a predetermined set of rules.

Upon receiving as input information that describes the type and date of the newly generated alert, the service, at step S716 loads the knowledge base—that is, the predetermined set of rules used to decide whether a particular alert or combination of alerts for a particular subscriber ID should trigger an alert-state to be generated—into the a work space for the service. For one embodiment of the present invention the predetermined rules are listed in Table I (see Appendix A).

Next, at step S718, the service retrieves all past alerts from the alerts database which satisfy each of the following three conditions: (1) the retrieved alert has the same subscriber ID as the newly generated alert; (2) the call date of retrieved alert is the same as the call date of the newly generated alert; and (3) the retrieved alert is "uncleared"—that is, the alert has not been investigated by a system operator and marked as "cleared" in the alerts database.

Next, at step S720, for each of the uncleared alerts retrieved at step S718, a corresponding alert-type is "volunteered"—or offered as information—to the inference engine. The twenty available alert-types are as follows: (1) suspect termination, (2) suspect country code, (3) credit limit, (4) simultaneous call, (5) geographic dispersion, (6) daily threshold, (7) daily international threshold, (8) five-day average threshold, (9) international five-day average threshold, (10) ten-day average threshold, (11) international ten-day average threshold, (12) 3-in-5 velocity, (13) doubling velocity, (14) 3-in-5 international velocity, (15) doubling international velocity, (16) 3-in-5 duration, (17) doubling duration, (18) 3-in-5 international duration, (19) doubling international duration, and (20) credit risk.

Next, at step S722, a "hypothesis," or answer, is suggested to the inference engine. This directs the search for the current alert-state of the subscriber along a path associated with the newly generated alert, rather than allowing the inference engine to search the entire knowledge base. The hypothesis suggested is that an alert-state exists that is related to the alert-type of the newly generated alert.

Next, at step S724, the service "operates" the knowledge base—that is, the inference engine is run against the volunteered information and the suggested hypothesis. The inference engine will prove the suggested hypothesis to be either "true" or "false."

After the inference engine has been run, the service, at steps S726 and S728 determines whether a "red" alert-state, a "yellow" alert state, or no alert-state at all was generated. A "red" alert-state corresponds to the most severe indication of possible fraudulent telecommunication activity that the fraud detection system registers. A "yellow" alert-state similarly indicates the possibility of fraudulent telecommunications activity, but to a lesser extent than a red alert-state. If no alert-state was generated, the subscriber's alert-state is left unchanged and no additional processing is necessary. Accordingly, the service flows to step S730 which marks the completion of the evaluation. If, at step S726, the service determines that a red alert-state was generated by this run of the inference engine, the service flows to step S742 where the subscriber's previous alert-state,—that is, before the present alert-state was generated—is retrieved from the alert-states database.

Next, at step S744, the service tests whether the subscriber's previous alert-state was red. If so, there is no need to generate an additional red alert-state, and the service flows to step S730 which marks completion of the evaluation.

If, however, the subscriber's previous alert-state was other than red, the service, at step S736, tests whether the subscriber's previous alert-state was yellow. If so, the service flows to step S748 where an occurrence of a "system-cleared yellow alert state" is recorded in a database—the cleared-alert-states database. If the subscriber's previous alert-state was normal, step S748 is skipped and the service flows directly to step S750.

At step S750, the newly generated red alert-state is recorded in the alert-states database for this particular subscriber ID.

After notice of the newly generated and recorded red alert-state is sent to the system operator at step S752, the service flows to step S730 which marks the completion of the evaluation.

If, at step S728, the service determines that a yellow alert-state was generated by this run of the inference engine, the service flows to step S732 where the subscriber's previous alert-state,—that is, before the present alert-state was generated—is retrieved from the alert-states database.

Next, at step S734, the service tests whether the subscriber's previous alert-state was either yellow or red. If so, there is no need to generate an additional yellow alert-state, and the service flows to step S730 which marks completion of the evaluation.

If, however, the subscriber's previous alert-state was neither yellow nor red—i.e., a "normal" alert-state—the service flows to step S736 where the newly generated yellow alert-state is recorded in the alert-states database for this particular subscriber ID.

After notice of the newly generated and recorded yellow alert-state is sent to the system operator at step S738, the service flows to step S730 which marks the completion of the evaluation.

Figure 6:
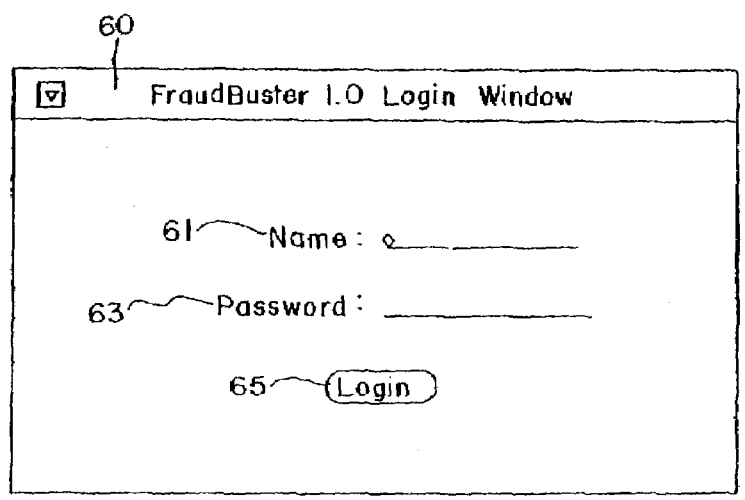
FIG. 6 is a screen display of the Login Window of the User Interface in one embodiment of the present invention.
Figure 9:
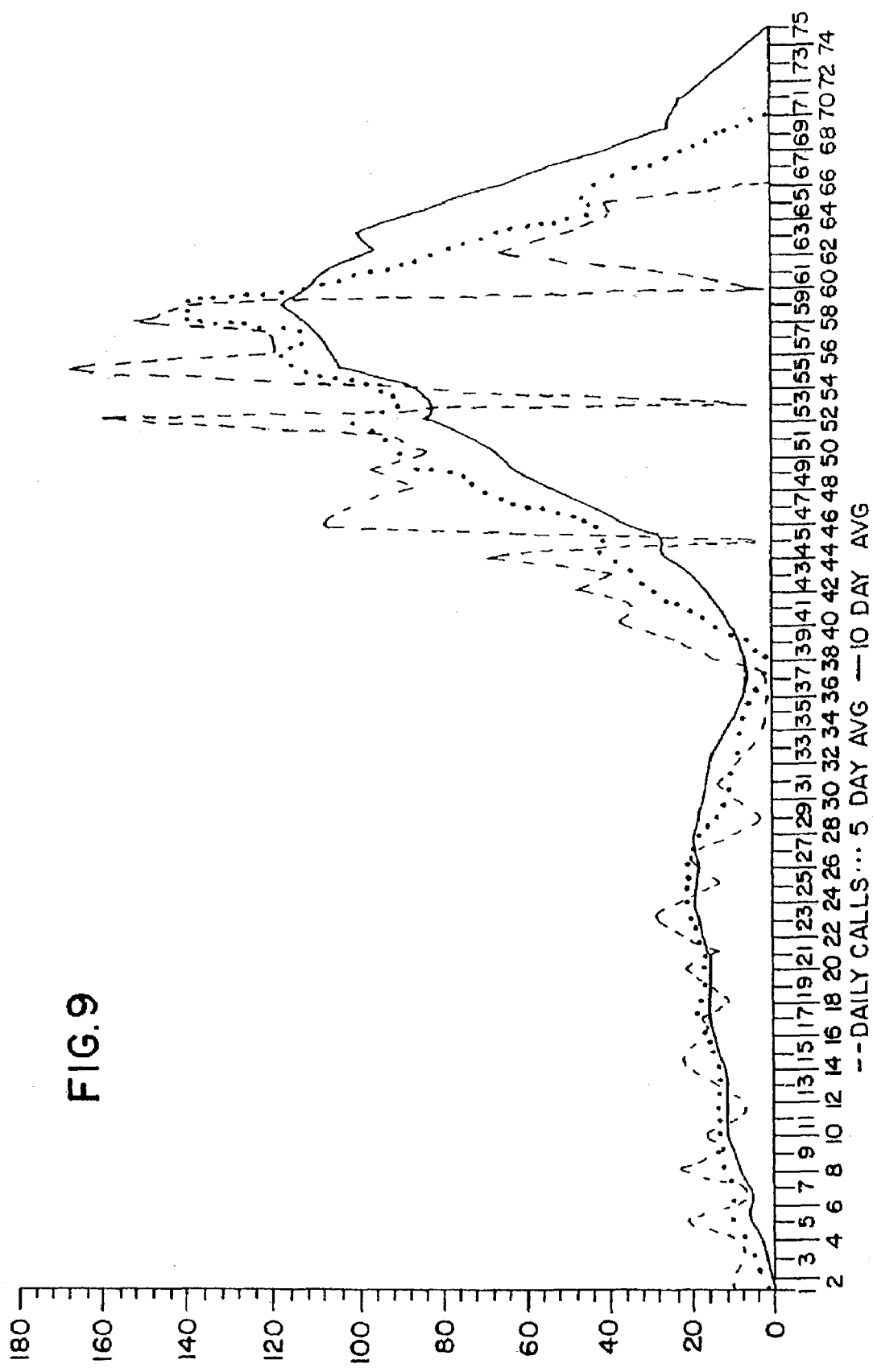
FIG. 9 is a graph showing call velocity fluctuations for a typical cloning fraud user.
Figure 11:
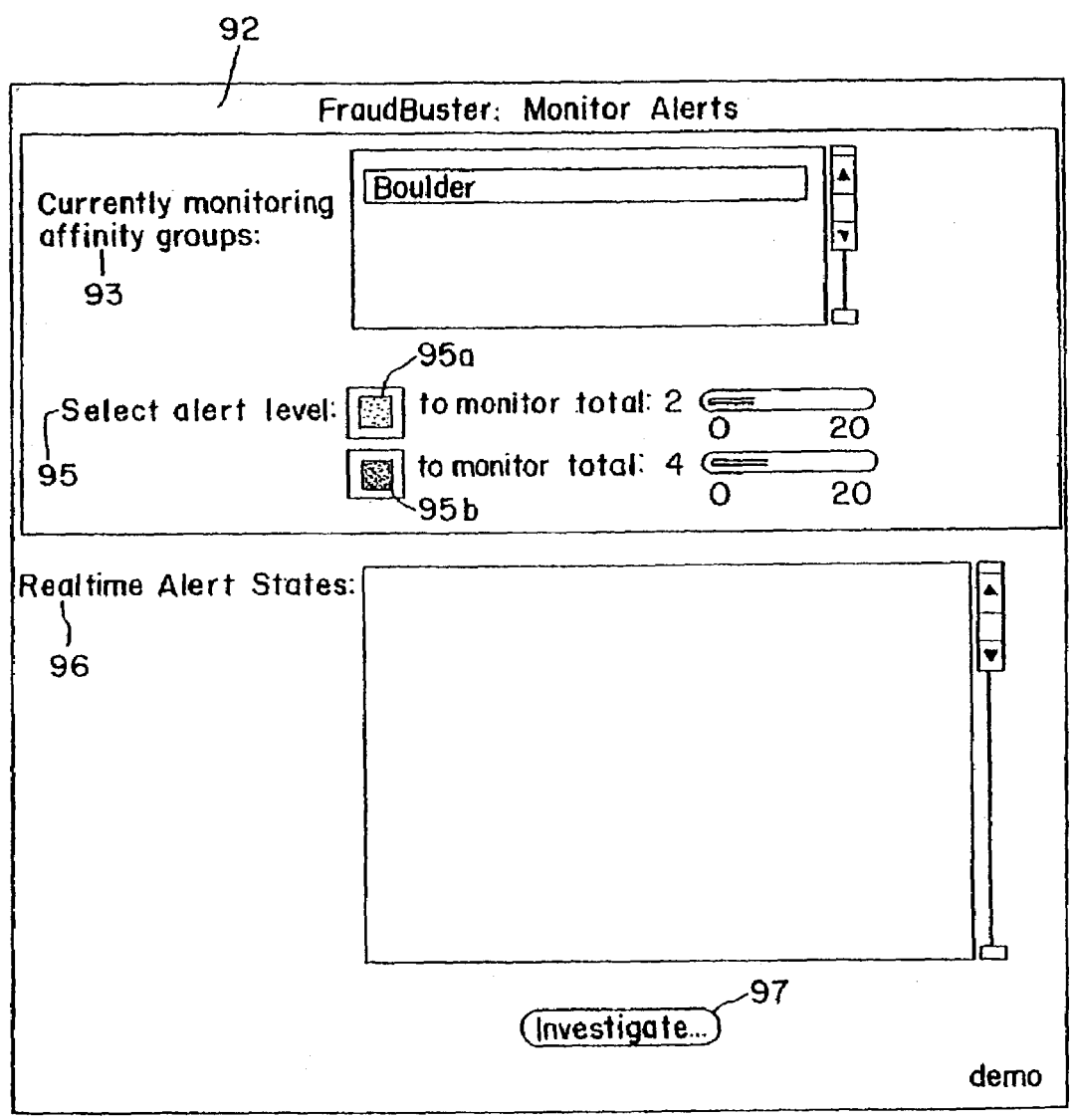
FIG. 11 is a screen display of the Monitor Alerts Window of the User Interface in one embodiment of the present invention.

If the Evaluate Subscriber Condition service S522 generates a new alert-state which differs from the subscriber's present alert-state, the system operator is notified via the user interface 117. The user interface 117 is a user-friendly Graphical User Interface (GUI) which communicates and receives several items and types of information to and from a system operator using words, sounds, graphs, pictures, icons, pull-down and pop-up menus, variable-sized windows and the like. The system operator communicates information back to the user interface using various input devices such as a keyboard, mouse, touchscreen, trackball, voice-input, and related devices. As shown in FIGS. 6, 9, and 11, the information communicated to the system operator includes information regarding a subscriber's vital statistics, alert-states, history of alerts and events, and a graph of call velocity for a particular subscriber. A system operator can selectively choose which item or items of information he or she wishes to view, and in what portion of the screen and in what format the information is to be viewed. Additionally, a system operator may control system functions of the underlying digital computer on which the fraud detection system is operating using the user interface 117.

Figure 5A:
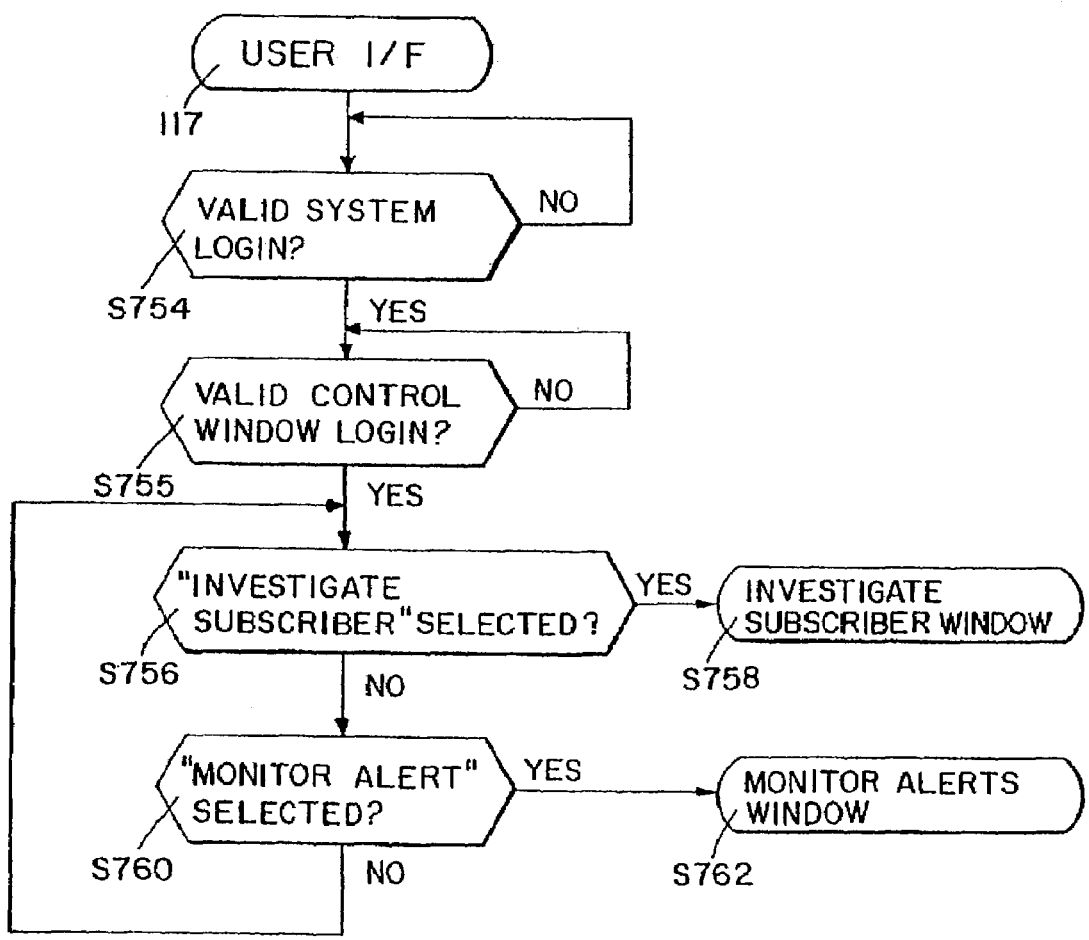

Initially, referring to FIG. 5A, before the user interface may be accessed, the system operator must perform a successful System login, as indicated at step S754. A typical System Login Window 60, illustrated in FIG. 6, requires an operator to enter both a login name 61 and a password 63, and then click the login button 65.

Once a System login has been performed, the system operator must subsequently login into the Control Window 70 as shown at step S755 in FIG. 5A. Depending on the system privileges of the particular system operator, which are set at the time of login to the Control Window 70, the system operator may have several options, including performing computer system maintenance and administrative functions (Provision 71, Admin 72, and Diagnostics 74) in addition to the Monitor Alerts 77, Investigate Subscriber 78, and Select Affinity Groups 79 functions.

Figure 5B:
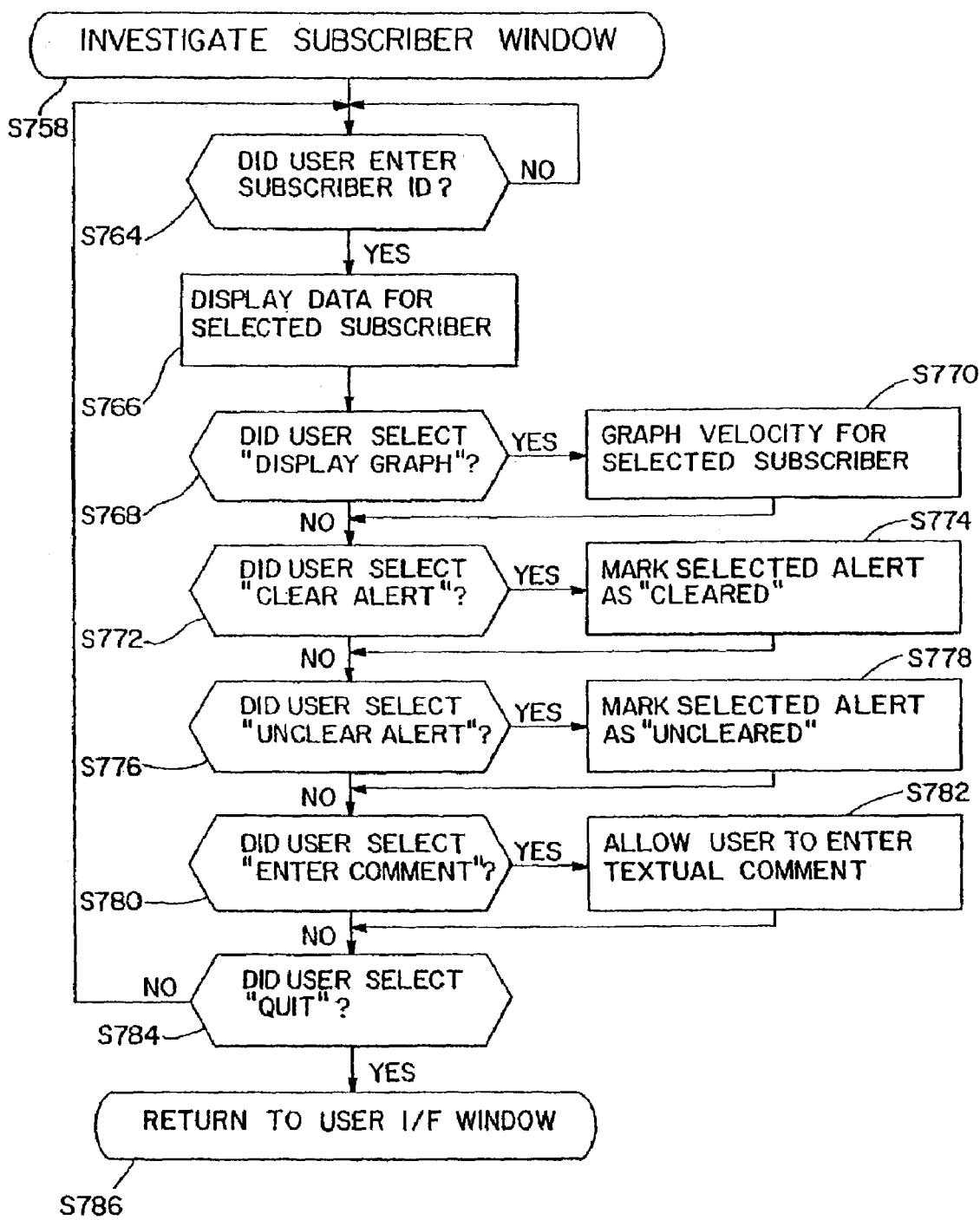
Figure 7:
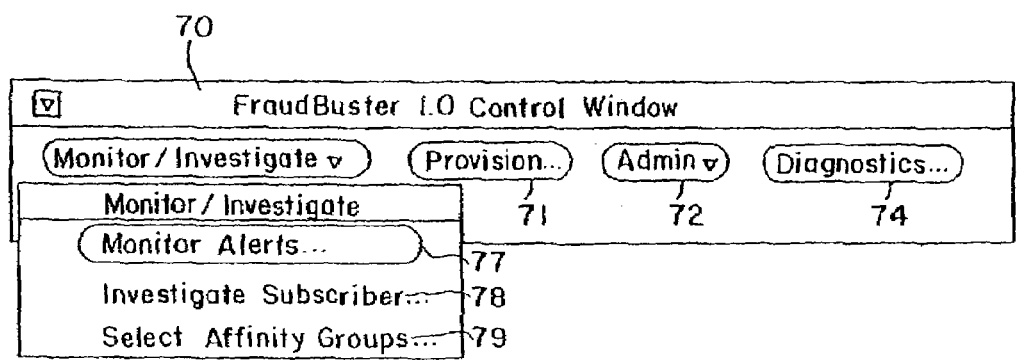
FIG. 7 is a screen display of the Control Window of the User Interface in one embodiment of the present invention.

When the system operator selects Investigate Subscriber 78 in the Control Window 70 (see FIG. 7), the user interface, at step S758, initiates the Investigate Subscriber Window 80, a flowchart for which is shown in FIG. 5B. Upon initiation, the Investigate Subscriber Window 80, at step S764, prompts the system operator to enter a subscriber ID to be investigated.

As shown in the Investigate Subscriber Window 80 in FIG. 8, when a subscriber ID is selected from the select subscriber list 81, the Investigate Subscriber Window 80 displays the particular subscriber's status data, that is, certain information specific to the subscriber selected. This information includes the subscriber's name 82a, address 82b, MIN 82c, MSN 82d, alert states 83a, associated alerts 83b, associated events 83c, information regarding usage parameters—indicated generally at 84, and any subscriber comments 85 input by the system operator regarding a particular subscriber ID.

Additionally, a system operator may identify a subscriber to be investigated by entering a MSN 82c or a MIN 82d in the Investigate Subscriber Window 80. If a partial MIN is entered, a select subscriber list displays a scrolled list of all subscribers having MINs that match the inputted partial MIN. The system operator may select one or more of the subscribers identified by the user interface for investigation.

The system operator has several options under the Investigate Subscriber Window 80, as indicated by steps S768 through S784 in FIG. 5B, including the following: graphing the call velocity of a particular subscriber (see FIG. 9); marking a selected alert as "cleared"; marking a selected alert as "uncleared"; allowing the system operator to enter a textual comment in the alert field for a particular subscriber; and quitting the Investigate Subscriber Window 80. Several of these options are represented as buttons at the bottom of the Investigate Subscriber Window 80 in FIG. 8.

If the system operator clicks the Graphs button 86 in the Investigate Subscriber Window 80, a graph of call velocity for the selected subscriber is displayed. A typical velocity graph for a single subscriber is shown in FIG. 9. Referring to FIG. 9, the vertical axis represents number of calls placed and the horizontal axis represents time, with each number corresponding to a separate day. As shown in the legend, the solid line indicates the ten-day moving average call velocity, the dotted line indicates the five-day moving average velocity, and the dashed line indicates daily call velocity for the selected subscriber ID. The usage trends represented by the three lines in FIG. 9 indicate telecommunications usage typical of a fraudulent user. For example, at day 58 the five-day moving average call velocity (138) is greater than the ten-day moving average call velocity (112) and shows an increase of almost 28% over the five-day moving average call velocity at day 57 (108). The usage at day 58, therefore, would be likely to generate a call velocity event for this particular subscriber based on the subscriber's pattern of past usage. Depending upon the occurrence of other events generated for the same subscriber, as discussed above, an alert, and consequently an alert-state, may also be generated for this particular subscriber, thereby indicating the possibility of fraudulent telecommunications usage.

If the system operator clicks the Clear Alert State button 87b in the Investigate Subscribers Window 80, the selected alert-state will be marked as "cleared" in the alert-states database. Accordingly, all of the underlying alerts which triggered the selected alert-state will be marked as "cleared" in the alerts database and will no longer be considered by the evaluate subscriber condition service in generating alert-states for the selected subscriber.

If the system operator clicks the Unclear Alert State button 87a in the Investigate Subscribers Window 80, the clearing operation described above is undone and the underlying alerts which generated the selected alert-state once again become available to the evaluate subscriber condition service in generating alert-states for a particular subscriber.

If the system operator clicks the Comment button 88 in the Investigate Subscribers Window 80, the user interface accepts and saves a textual comment, possibly regarding the status and results of an investigation performed for the selected subscriber ID, in the Subscriber Comments field 85 of the Investigate Subscriber Window 80.

Lastly, if the system operator wishes to quit, the Investigator Subscribers Window 80 is terminated.

Figure 10:
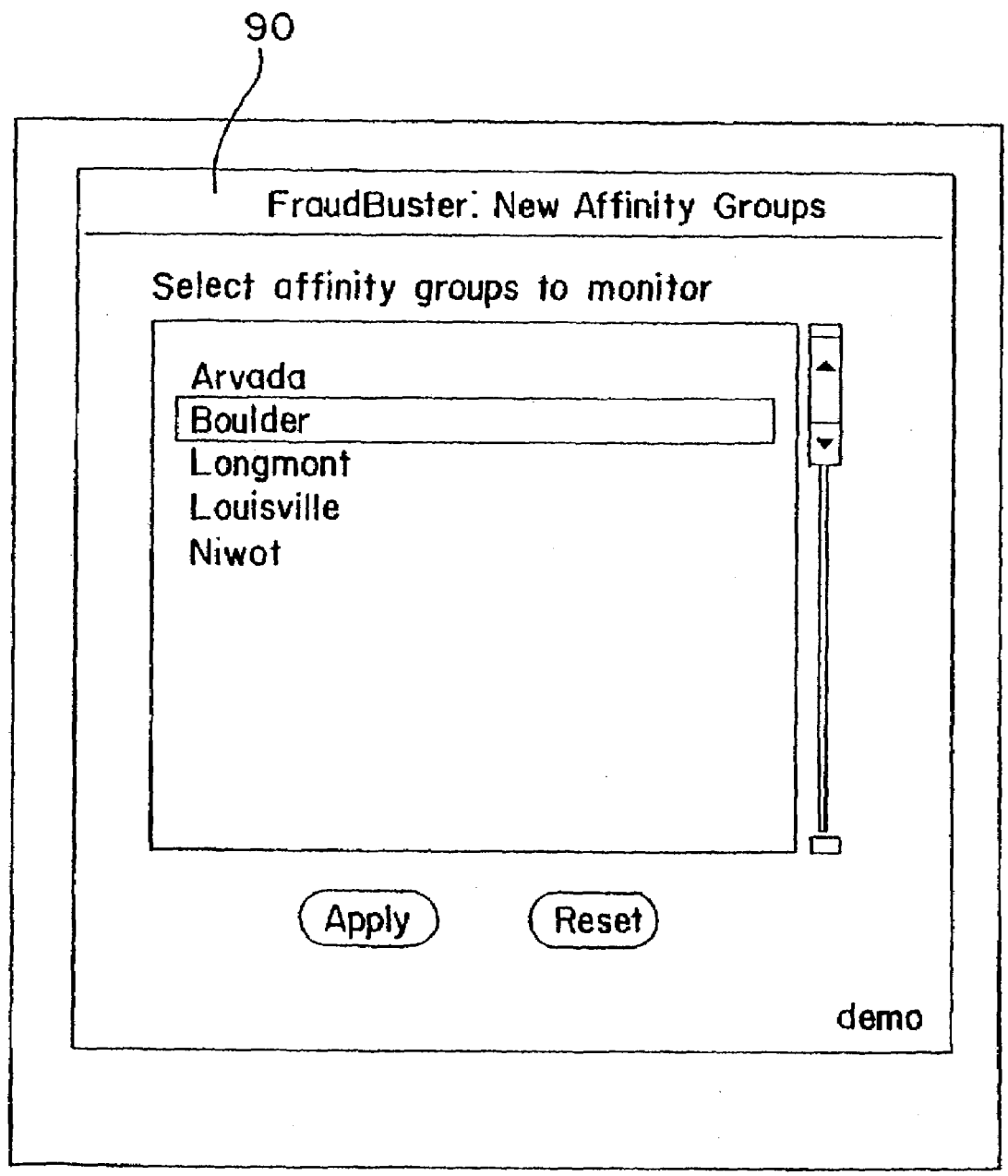
FIG. 10 is a screen display of the Monitor New SID(s) Window of the User Interface in one embodiment of the present invention.

When the system operator selects Monitor Alerts 77 in the Control Window 70 (see FIG. 7), the user interface, at step S762, initiates the Monitor Alerts Window 92 (see FIG. 11), a flowchart for which is shown in FIG. 5C. If the system operator wishes to select a New Affinity Group to be monitored, the operator selects Affinity Groups Option 79 in the Control Window, displaying Window 90, as shown in FIG. 10, and the operator selects the appropriate Affinity Group or Groups corresponding to combinations of npa and nxx for a geographic region that the system operator wishes to monitor. The selected Affinity Groups are displayed in the top-half of the Monitor Alerts Window 92 depicted in FIG. 11 under the heading Currently monitoring Affinity Groups 93. The selection of Affinity Groups to be monitored may be further changed by selecting the Select Affinity Groups option 79 in the Control Window 70 (see FIG. 7).

Next, at step S792, the operator has the option to select the alert-state level to be monitored. At step S794, the operator selects a new alert-state level (either yellow 95*a* or red 95*b*) to monitor, as shown in the Monitor Alerts Window 92 in FIG. 11 under the heading Select alert level 95.

Next, at step S796, the Window displays a scrolled list of alert-states in the bottom-half of the Monitor Alerts Window 92, under the heading Realtime Alert States 96, corresponding to the alert-state level selected and the Affinity Groups selected.

At step S798, if the operator chooses to investigate a specific alert-state displayed in the scrolled list by clicking the Investigate button 97 at the bottom of the Monitor Alerts Window 92, the subscriber-specific information is displayed as shown in FIG. 8. Effectively, this operation invokes the Investigate Subscriber Window 80 directly from the Monitor Alerts Window 92 for a single subscriber ID.

Additionally, the system operator may request a report to be generated and printed at steps S802 and S804, or quit from the Monitor Alerts Window 92 at steps S810 and S786.

Thus, a fraud detection system is provided which possesses several features and advantages. Initially, it should be noted that although the fraud detection system was described from the perspective of a single CCF record processed in serial fashion, in actual operation the fraud detection system can process multiple CCF records in parallel, thereby resulting in increased through-put and shorter overall processing time.

Second, the present fraud detection system detects potentially fraudulent activity on a subscriber-specific basis rather than on a system-wide basis. Because the present invention operates by detecting, for each individual subscriber, an abnormal deviation in call activity as compared with that particular subscriber's typical call activity, an individualized fraud detection system is provided that performs with equal success regardless of whether a subscriber is typically a low, medium or high volume user.

Third, the present fraud detection system is capable of indicating potentially fraudulent activity by detecting an abnormal deviation in usage without regard to the type of fraudulent activity involved, whether it be cloning fraud, tumbling fraud, tumbling-clone fraud, calling card fraud, subscriber fraud, stolen cellular telephone fraud, etc.

Fourth, the present invention provides an apparatus and method for detecting potentially fraudulent telecommunications activity based solely on normal usage parameters such as call duration, call velocity, call overlap, and the number called. Because the fraud detection system of the present invention operates merely by connecting the system to existing network facilities, and requires no modification of the either the telecommunications network equipment or the individual cellular telephones, the present fraud detection system is compatible with most, if not all, existing telecommunications systems.

Fifth, the fraud detection system of the present invention is not limited merely to detecting potentially fraudulent activity in cellular telecommunications systems. The present fraud detection system is adaptable to detect potentially fraudulent usage in other telecommunications systems that utilize a unique identifier for each individual subscriber to limit access to the telecommunications system. In such a system, a legitimate subscriber, intending to pay for services used, will tend to use the services more sparingly than a fraudulent user who has no intention of ever paying for services used. Once a fraudulent user had misappropriated an otherwise legitimate subscriber identifier to gain access to the service-providing system, an abnormal increase or other deviation in activity for the particular misappropriated subscriber identifier would tend to result. Therefore, by detecting an abnormal increase or other abnormal behavior in the service usage patterns for a particular subscriber identifier, the present fraud detection system can detect potentially fraudulent activity based on normal usage parameters in the telecommunications system to which it is connected.

One example, inter alia, is a telephone calling card system, wherein each subscriber has a unique calling card number which permits a subscriber to place toll calls which are subsequently billed to the subscriber assigned to the calling card number used to place the calls. Each use of the calling card calling card number generates a separate record containing substantially the same information as a cellular telephone system CDR record. The switch interface of the present fraud detection system can be easily modified to accept call data records in differing formats. Therefore, upon inputting calling card call data records into the present fraud detection system, potentially fraudulent calling card activity would be detected in the manner described above.

Sixth, the fraud detection system of the present invention provides an interactive GUI display system that allows a system operator to view several items of information concurrently, such as the history of alerts and events which led to an alert-state for a particular subscriber; information specific to each subscriber; and a graph of call velocity for a particular subscriber. In this way, the present fraud detection system conveniently provides the system operator with all the relevant information that triggered the fraud detection system to indicate that a particular subscriber ID is potentially suspected of fraudulent activity.

Further, and among other advantages, because several of the fraud detection parameters—such as the maximum percentage increases in call duration and call velocity allowed before an event is generated, subscriber-specific credit limits, and the list of suspect numbers and country codes—are easily modified by a system operator, the present fraud detection system can be readily tailored to satisfy the unique requirements of any telecommunications system to which it is attached.

Although the invention has been described in detail, it should be understood that various changes, substitutions and alterations can be made herein without departing from the spirit and scope of the invention as defined by the appended claims.

APPENDIX A

TABLE I:

RULE : Rule 1
If
    red_condition is precisely equal to 1
Then alerts_complete
    is confirmed.

RULE : Rule 2
If
    there is evidence of eval_country_code_rules
    And red_condition is precisely equal to 1
Then country_code_red_condition
    is confirmed.

RULE : Rule 3
If
    there is evidence of eval_credit_limit_rules
    And red_condition is precisely equal to 1
Then credit_limit_red_condition
    is confirmed.

RULE : Rule 4
If
    there is evidence of eval_daily_intl_thresh_rules
    And red_condition is precisely equal to 1
Then daily_intl_thresh_red_condition
    is confirmed.

RULE : Rule 5
If
    there is evidence of eval_daily_thresh_rules
    And red_condition is precisely equal to 1
Then daily_thresh_red_condition
    is confirmed.

RULE : Rule 6
If
    there is evidence of eval_duration_rules
    And red_condition is precisely equal to 1
Then duration_red_condition
    is confirmed.

RULE : Rule 7
If
    suspect_country_code_alert is precisely equal to 1
    And intl_velocity_alert is precisely equal to 1
Then eval_country_code_rules
    is confirmed.
    And 1 is assigned to red_condition RULE    :   Rule 8
If
            credit_limit_alert is precisely equal to 1
Then    eval_credit_limit_rules
            is confirmed.
            And 1 is assigned to red_condition RULE    :   Rule 9
If
            daily_intl_thresh_alert is precisely equal to 1
            And intl_velocity_alert is precisely equal to 1
Then    eval_daily_intl_thresh_rules
            is confirmed.
            And 1 is assigned to red_condition RULE    :   Rule 10
If
            daily_thresh_alert is precisely equal to 1
            And velocity_alert is precisely equal to 1
Then    eval_daily_thresh_rules
            is confirmed.
            And 1 is assigned to red_condition RULE    :   Rule 11
If
            duration_alert is precisely equal to 1
            And velocity_alert is precisely equal to 1
Then    eval_duration_rules
            is confirmed.
            And 1 is assigned to red_condition RULE    :   Rule 12
If
            five_day_intl_thresh_alert is precisely equal to 1
            And intl_velocity_alert is precisely equal to 1
Then    eval_five_day_intl_thresh_rules
            is confirmed.
            And 1 is assigned to red_condition RULE    :   Rule 13
If
            five_day_thresh_alert is precisely equal to 1
            And velocity_alert is precisely equal to 1
Then    eval_five_day_thresh_rules
            is confirmed.
            And 1 is assigned to red_condition RULE    :   Rule 14
If
            geographic_dispersion_alert is precisely equal to 1
Then    eval_geographic_disp_rules
            is confirmed.
            And 1 is assigned to red_condition RULE : Rule 15
If
    intl_duration_alert is precisely equal to 1
    And intl_velocity_alert is precisely equal to 1
Then   eval_intl_duration_rules
    is confirmed.
    And 1 is assigned to red_condition RULE : Rule 22
If
    intl_velocity_alert is precisely equal to 1
    And suspect_term_alert is precisely equal to 1
Then   eval_intl_velocity_rules
    is confirmed.
    And 1 is assigned to red_condition RULE : Rule 21
If
    intl_velocity_alert is precisely equal to 1
    And suspect_country_code_alert is precisely equal to 1
Then   eval_intl_velocity_rules
    is confirmed.
    And 1 is assigned to red_condition RULE : Rule 20
If
    intl_velocity_alert is precisely equal to 1
    And daily_intl_thresh_alert is precisely equal to 1
Then   eval_intl_velocity_rules
    is confirmed.
    And 1 is assigned to red_condition RULE : Rule 19
If
    intl_velocity_alert is precisely equal to 1
    And five_day_intl_thresh_alert is precisely equal to 1
Then   eval_intl_velocity_rules
    is confirmed.
    And 1 is assigned to red_condition RULE : Rule 18
If
    intl_velocity_alert is precisely equal to 1
    And ten_day_intl_thresh_alert is precisely equal to 1
Then   eval_intl_velocity_rules
    is confirmed.
    And 1 is assigned to red_condition RULE : Rule 17
If
    intl_velocity_alert is precisely equal to 1
    And velocity_alert is precisely equal to 1
Then   eval_intl_velocity_rules
    is confirmed.
    And 1 is assigned to red_condition RULE    :    Rule 16
If
        intl_velocity_alert is precisely equal to 1
        And intl_duration_alert is precisely equal to 1
Then    eval_intl_velocity_rules
        is confirmed.
        And 1 is assigned to red_condition RULE    :    Rule 23
If
        simultaneous_call_alert is precisely equal to 1
Then    eval_simultaneous_call_rules
        is confirmed.
        And 1 is assigned to red_condition RULE    :    Rule 25
If
        suspect_term_alert is precisely equal to 1
        And velocity_alert is precisely equal to 1
Then    eval_suspect_term_rules
        is confirmed.
        And 1 is assigned to red_condition RULE    :    Rule 24
If
        suspect_term_alert is precisely equal to 1
        And intl_velocity_alert is precisely equal to 1
Then    eval_suspect_term_rules
        is confirmed.
        And 1 is assigned to red_condition RULE    :    Rule 26
If
        ten_day_intl_thresh_alert is precisely equal to 1
        And intl_velocity_alert is precisely equal to 1
Then    eval_ten_day_intl_thresh_rules
        is confirmed.
        And 1 is assigned to red_condition RULE    :    Rule 27
If
        ten_day_thresh_alert is precisely equal to 1
        And velocity_alert is precisely equal to 1
Then    eval_ten_day_thresh_rules
        is confirmed.
        And 1 is assigned to red_condition RULE    :    Rule 33
If
        velocity_alert is precisely equal to 1
        And suspect_term_alert is precisely equal to 1
Then    eval_velocity_rules
        is confirmed.
        And 1 is assigned to red_condition RULE : Rule 32
If
    velocity_alert is precisely equal to 1
    And daily_thresh_alert is precisely equal to 1
Then eval_velocity_rules
    is confirmed.
    And 1 is assigned to red_condition RULE : Rule 31
If
    velocity_alert is precisely equal to 1
    And five_day_thresh_alert is precisely equal to 1
Then eval_velocity_rules
    is confirmed.
    And 1 is assigned to red_condition RULE : Rule 30
If
    velocity_alert is precisely equal to 1
    And ten_day_thresh_alert is precisely equal to 1
Then eval_velocity_rules
    is confirmed.
    And 1 is assigned to red_condition RULE : Rule 29
If
    velocity_alert is precisely equal to 1
    And intl_velocity_alert is precisely equal to 1
Then eval_velocity_rules
    is confirmed.
    And 1 is assigned to red_condition RULE : Rule 28
If
    velocity_alert is precisely equal to 1
    And duration_alert is precisely equal to 1
Then eval_velocity_rules
    is confirmed.
    And 1 is assigned to red_condition RULE : Rule 34
If
    there is evidence of eval_five_day_intl_thresh_rules
    And red_condition is precisely equal to 1
Then five_day_intl_thresh_red_condition
    is confirmed.

RULE : Rule 35
If
    there is evidence of eval_five_day_thresh_rules
    And red_condition is precisely equal to 1
Then five_day_thresh_red_condition
    is confirmed.

RULE : Rule 36
If
there is evidence of eval_geographic_disp_rules
And red_condition is precisely equal to 1
Then geographic_disp_red_condition
is confirmed.

RULE : Rule 37
If
Set Strategy to @PWTRUE=FALSE;@PWFALSE=FALSE;@PWNOTKNOWN=FALSE;@PFACTIONS=FALSE;@PTGAT
Then initialize_strategy
is confirmed.

RULE : Rule 38
If
there is evidence of eval_intl_duration_rules
And red_condition is precisely equal to 1
Then intl_duration_red_condition
is confirmed.

RULE : Rule 39
If
there is evidence of eval_intl_velocity_rules
And red_condition is precisely equal to 1
Then intl_velocity_red_condition
is confirmed.

RULE : Rule 40
If
there is evidence of eval_simultaneous_call_rules
And red_condition is precisely equal to 1
Then simultaneous_call_red_condition
is confirmed.

RULE : Rule 41
If
there is evidence of eval_suspect_term_rules
And red_condition is precisely equal to 1
Then suspect_term_red_condition
is confirmed.

RULE : Rule 42
If
there is evidence of eval_ten_day_intl_thresh_rules
And red_condition is precisely equal to 1
Then ten_day_intl_thresh_red_condition
is confirmed.

RULE : Rule 43
If
there is evidence of eval_ten_day_thresh_rules
And red_condition is precisely equal to 1
Then ten_day_thresh_red_condition
is confirmed.

RULE    :       Rule 44
If
            there is evidence of eval_velocity_rules
            And red_condition is precisely equal to 1
Then    velocity_red_condition
            is confirmed.

RULE    :       Rule 45
If
            alert_count is greater than 2
            And red_condition is precisely equal to 0
Then    yellow_condition_set
            is confirmed.
            And 1 is assigned to yellow condition

APPENDIX B

DETERMINATION OF AIRLINE DISTANCES

1. Long Distance Message Telecommunications Service

To determine the rate distance between any two MSCs proceed as follows:

a. Obtain the "V" and "H" coordinates for each MSC. "V," the vertical coordinate, is equivalent to longitude; "H," the horizontal coordinate, is equivalent to latitude.

b. Obtain the difference between the "V" coordinates o the two MSCs. Obtain the difference between the "H" coordinates.

Note: The difference is always obtained by subtracting the smaller coordinate from the larger coordinate.

c. Divide each of the differences obtained in b. by three, rounding each quotient to the nearer integer.

d. Square these two integers and add the two squares. If the sum of the squares is greater than 1777, divide the integers obtained in c. by three and repeat step d. Repeat this process until the sum of the squares obtained in d. is less than 1778.

e. The number of successive divisions by three in steps c. and d. determines the value of "N". Multiply the final sum of the two squares obtained in step d. by the multiplier specified in the following table for this value of "N" preceding:

| N | Multiplier | Minimum Rate Mileage |
|---|---|---|
| 1 | 0.9 | - |
| 2 | 8.1 | 41 |
| 3 | 72.9 | 121 |
| 4 | 656.1 | 361 |
| 5 | 5,904.9 | 1,081 |
| 6 | 53,144.1 | 3,241 | f. Obtain square root of product in e. and, with resulting fraction, round up to next higher integer. This is the message rate mileage except that when the mileage so obtained is less than the minimum rate mileage shown in e. preceding, the minimum rate mileage corresponding to the "N" value is applicable.

Example:

The message rate distance is required between Detroit, Michigan and Madison, Wisconsin.

| | | V | H |
|---|---|---|---|
| (a) | Detroit, Michigan | 5536 | 2828 |
| | Madison, Wisconsin | 5887 | 3796 |
| (b) | difference | 351 | 968 |

(c1) dividing each difference by three and rounding to nearer integer = 117 and 323

(d1) squaring integers and adding,  117X117 = 13,689
323X323 = 104,329
sum of squared integers  118,018 sum of squared integers is greater than 1777, so divide integers in (c1) by three and repeat (d1)

(c2) dividing integers in (c1) by three and rounding = 39 and 108

(d2) squaring integers and adding,  39X39 = 1,521
108X108 = 11,664
sum of squared integers  13,185 sum of squared integers is greater than 1777, so divide integers in (c2) by three and repeat (d2)

(c3) dividing integers in (c2) by three and rounding = 13 and 16

(d3) squaring integers and adding,  13X13 = 169
36X36 = 1,296
sum of squared integers  1,465

This sum of squared integers is less than 1778 and was obtained after three successive divisions by three, therefore, "N" = 3.

(e) Multiply final sum of squared integers  1,465
by factor 72.9 (corresponding to "N" = 3)  X  72.9
= 106,798.5

(f) Square root of 106,798.5 = 326 and a fraction, which is rounded up to 327 miles (fractional miles being considered full miles). The 327 miles is larger than the minimum of 121 rate miles applicable when "N" = 3, so the message rate mileage is 327 miles.

2. <u>Interexchange Distances</u>

To determine the rate distance between any two MSCs proceed as follows:

a. Obtain the "V" and "H" coordinates for each MSC.
b. Obtain the difference between the "V" coordinates of the two MSCs. Obtain the difference between the "H" coordinates.

Note: The Difference is always obtained by subtracting the smaller coordinate from the larger coordinate.

c. Square each difference obtained in b. above.
d. Add the squares of the "V" difference and the "H" difference obtained in c. above.
e. Divide the sum of the squares obtained in d. above by 10. Round to the next higher whole number if any fraction is obtained.
f. Obtain the square root of the result obtained in e. above. This is the rate distance in miles. (Fractional miles being considered as whole miles).

Example:

The rate distance is required between St. Paul, Minnesota and Osceola, Wisconsin.

|  | V | H |
|---|---|---|
| St. Paul, Minnesota | 5776 | 4498 |
| Osceola, Wisconsin | 5677 | 4477 |
| difference | 99 | 21 |
| squared | 9,801 + | 441 = 10,242 |

$$\frac{10,242}{10} = 1,024.2$$

square root of 1,025 = 32.01 = 33 airline miles

3. <u>Intraexchange Distances</u>

To determine the rate distance between any two MSCs proceed as follows:

a. Obtain the "V" and "H" coordinates for each MSC.
b. Obtain the difference between the "V" coordinates of the two MSCs. Obtain the difference between the "H" coordinates.

Note: The Difference is always obtained by subtracting the smaller coordinate from the larger coordinate.

c. Square each difference obtained in b. above.
d. Add the squares of the "V" difference and the "H" difference obtained in c. above.
e. Divide the sum of the squares obtained in d. above by 10.
f. Obtain the square root of the result obtained in e. above.
Express this result with two decimal places. This is the distance in miles. Fractions are rounded to the next higher half mile.

Example:

The rate distance is required between two MSCs in the Orange, New Jersey exchange.

| NPA | NXX | V | H |
|---|---|---|---|
| 201 | 675 (East Orange) | 5015 | 1440 |
| 201 | 736 (West Orange) | 5014 | 1448 |
|  | difference | 1 | 8 |
|  | squared | 1 | 64 = 65 |

$$\frac{65}{10} = 6.5$$

square root of 6.5 = 2.55 = 3 airline miles

What is claimed is:

1. A method comprising:
communicating repeatedly with a credit information source to obtain a credit score and at least one subsequent, updated credit score associated with a particular telecommunications subscriber,
using the credit score and at least said updated credit score to establish a credit limit and at least one updated credit limit, respectively, for the particular telecommunications subscriber,
receiving at least one call information record for calls involving the particular telecommunications subscriber,
using said at least one call information record to compare call usage of the particular telecommunications subscriber to at least one said updated credit limit, and
generating an indication based on whether the call usage exceeds the updated credit limit.

2. A method according to claim 1, where each said updated credit limit is established after a predetermined period of time, and
the method further includes
using at least one said one updated credit score to change the predetermined period of time.

3. A computer product disposed on a computer readable medium, the computer product having instructions for causing a processor to:
communicate repeatedly with a credit information source to obtain a credit score and at least one subsequent, updated credit score associated with a particular telecommunications subscriber,
use the credit score and at least said updated credit score to establish a credit limit and at least one updated credit limit, respectively, for the particular telecommunications subscriber,
receive at least one call information record for calls involving the particular telecommunications subscriber,
use said at least one call information record to compare call usage of the particular telecommunications subscriber to at least one said updated credit limit, and
generate an indication based on whether the call usage exceeds the updated credit limit.

4. A computer product according to claim 3, where each said updated credit limit is established after a predetermined period of time, and the computer product further includes instructions to
use at least one said updated credit score to change the predetermined period of time.

* * * * *